United States Patent
Kodama et al.

(10) Patent No.: US 12,252,642 B2
(45) Date of Patent: Mar. 18, 2025

(54) METHOD FOR PRODUCING CHOLESTERIC LIQUID CRYSTAL LAYER, CHOLESTERIC LIQUID CRYSTAL LAYER, OPTICALLY ANISOTROPIC BODY, AND REFLECTIVE FILM

(71) Applicant: FUJIFILM Corporation, Tokyo (JP)

(72) Inventors: Keisuke Kodama, Minamiashigara (JP); Yuko Suzuki, Minamiashigara (JP); Shunya Katoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 266 days.

(21) Appl. No.: 17/698,775

(22) Filed: Mar. 18, 2022

(65) Prior Publication Data
US 2022/0204850 A1    Jun. 30, 2022

Related U.S. Application Data

(63) Continuation of application No. PCT/JP2020/033780, filed on Sep. 7, 2020.

(30) Foreign Application Priority Data

Sep. 20, 2019 (JP) ................. 2019-172344

(51) Int. Cl.
*C09K 19/20* (2006.01)
*G02F 1/1335* (2006.01)
(Continued)

(52) U.S. Cl.
CPC .... *C09K 19/2007* (2013.01); *G02F 1/133541* (2021.01); *G02F 1/133553* (2013.01);
(Continued)

(58) Field of Classification Search
None
See application file for complete search history.

(56) References Cited

U.S. PATENT DOCUMENTS 11,275,271 B2 * 3/2022 Yanai .................. G03B 21/62
2018/0164480 A1 6/2018 Yoshida
(Continued)

FOREIGN PATENT DOCUMENTS

EP    0 296 710 A2    12/1988
JP    64-35478 A       2/1989
(Continued)

OTHER PUBLICATIONS

Japanese Notice of Reasons for Refusal for corresponding Japanese Application No. 2021-546616, dated Mar. 22, 2023, with an English translation.
(Continued)

*Primary Examiner* — Richard H Kim
(74) *Attorney, Agent, or Firm* — Birch, Stewart, Kolasch & Birch, LLP

(57) ABSTRACT

An object of the present invention is to provide a method for producing a cholesteric liquid crystal layer, which is capable of freely controlling a tilt angle of an arrangement direction of bright portion and dark portion derived from a cholesteric liquid crystalline phase with respect to a normal line of a main surface of the cholesteric liquid crystal layer; a cholesteric liquid crystal layer; an optically anisotropic body; and a reflective film.
The method for producing a cholesteric liquid crystal layer according to the present invention includes a step X of forming a cholesteric liquid crystal layer A in which a liquid crystal compound is aligned into a state of a cholesteric liquid crystalline phase, satisfying all of the conditions 1 to 3, and a step Y of carrying out a treatment to increase or decrease a helical pitch of the cholesteric liquid crystalline
(Continued)

phase in the cholesteric liquid crystal layer A obtained by the step X to increase or decrease a tilt angle of an arrangement direction of bright portion and dark portion derived from the cholesteric liquid crystalline phase, as observed in a cross-section perpendicular to a main surface of the cholesteric liquid crystal layer A, with respect to a normal direction of the main surface of the cholesteric liquid crystal layer A.

12 Claims, 12 Drawing Sheets

(51) Int. Cl.
    *G02F 1/13363*     (2006.01)
    *G02F 1/1337*     (2006.01)
    *G02F 1/137*     (2006.01)

(52) U.S. Cl.
    CPC .... *G02F 1/13363* (2013.01); *G02F 1/133788* (2013.01); *G02F 1/13718* (2013.01); *C09K 2019/2078* (2013.01)

(56) References Cited

U.S. PATENT DOCUMENTS

| | | | |
|---|---|---|---|
| 2020/0102500 A1 | 4/2020 | Kodama et al. | |
| 2020/0110202 A1 | 4/2020 | Kodama et al. | |
| 2020/0183214 A1* | 6/2020 | Katoh | C09K 19/56 |
| 2020/0271839 A1 | 8/2020 | Saitoh et al. | |
| 2020/0409202 A1 | 12/2020 | Kodama et al. | |
| 2021/0116615 A1 | 4/2021 | Kodama et al. | |

FOREIGN PATENT DOCUMENTS

| | | |
|---|---|---|
| WO | WO 2016/194961 A1 | 12/2016 |
| WO | WO 2017/030176 A1 | 2/2017 |
| WO | WO 2019/013284 A1 | 1/2019 |
| WO | WO 2019/013292 A1 | 1/2019 |
| WO | WO 2019/035449 A1 | 2/2019 |
| WO | WO 2019/093228 A1 | 5/2019 |
| WO | WO 2019/181247 A1 | 9/2019 |
| WO | WO 2019/182052 A1 | 9/2019 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/033780, dated Mar. 31, 2022.
International Search Report (Form PCT/ISA/210) for International Application No. PCT/JP2020/033780, dated Nov. 24, 2020, with English translation.

* cited by examiner

METHOD FOR PRODUCING CHOLESTERIC LIQUID CRYSTAL LAYER, CHOLESTERIC LIQUID CRYSTAL LAYER, OPTICALLY ANISOTROPIC BODY, AND REFLECTIVE FILM

CROSS-REFERENCE TO RELATED APPLICATIONS

This application is a Continuation of PCT International Application No. PCT/JP2020/033780 filed on Sep. 7, 2020, which claims priority under 35 U.S.C. § 119(a) to Japanese Patent Application No. 2019-172344 filed on Sep. 20, 2019. The above application is hereby expressly incorporated by reference, in its entirety, into the present application.

BACKGROUND OF THE INVENTION

1. Field of the Invention

The present invention relates to a method for producing a cholesteric liquid crystal layer, a cholesteric liquid crystal layer, an optically anisotropic body, and a reflective film.

2. Description of the Related Art

A cholesteric liquid crystal layer is known as a layer having properties of selectively reflecting either dextrorotatory circularly polarized light or levorotatory circularly polarized light in a specific wavelength range. Therefore, such a layer in which the cholesteric liquid crystalline phase is fixed has been developed for various applications, and for example, it is used as a projected image display member (for example, a reflecting element) such as a projection screen.

In addition, recently, attempts have been made to impart reflection anisotropy to a cholesteric liquid crystal layer. In a case where the cholesteric liquid crystal layer has reflection anisotropy, for example, in a case where light is incident from a normal direction of the cholesteric liquid crystal layer, the light is reflected in a direction different from the normal direction.

As an optical element having such reflection anisotropy, for example, WO2019/093228A discloses "an optical element including a first optically anisotropic layer which is a cured layer of a liquid crystal composition containing a first disk-like liquid crystal compound, in which an optical axis of the first disk-like liquid crystal compound is parallel to the surface of the first optically anisotropic layer, the first optically anisotropic layer is a liquid crystal alignment pattern arranged along at least one direction in the plane of the first optically anisotropic layer, the direction of the optical axis of the first disk-like liquid crystal compound has a liquid crystal alignment pattern which is continuously changed by rotation, and the direction of the optical axis is rotated by 180° in a period of 0.5 µm to 5 µm. WO2019/093228A discloses that the first disk-like liquid crystal compound is cholesterically aligned in a thickness direction in the first optically anisotropic layer (that is, the first optically anisotropic layer is a cholesteric liquid crystal layer).

SUMMARY OF THE INVENTION

On the other hand, in the related art, there was no method that can easily control an angle formed by a reflecting surface derived from a cholesteric liquid crystalline phase in a cholesteric liquid crystal layer and a main surface of the cholesteric liquid crystal layer (in other words, a tilt angle of an arrangement direction of bright portion and dark portion derived from the cholesteric liquid crystalline phase with respect to a normal line of the main surface of the cholesteric liquid crystal layer, in a cross-section perpendicular to the main surface of the cholesteric liquid crystal layer observed by a scanning electron microscope). In a case where the above angle can be easily controlled, an angle at which the reflected light is emitted can be freely controlled, which makes it possible to be applied easily to various applications.

In addition, as a result of studying the optical element (cholesteric liquid crystal layer) disclosed in WO2019/093228A, the present inventors have found that there is room for further increasing a circular polarization degree of the light reflected by the cholesteric liquid crystal layer (reflected light).

An object of the present invention is to provide a method for producing a cholesteric liquid crystal layer, which is capable of freely controlling a tilt angle of an arrangement direction of bright portion and dark portion derived from a cholesteric liquid crystalline phase with respect to a normal line of a main surface of the cholesteric liquid crystal layer, in a cross-section perpendicular to the main surface of the cholesteric liquid crystal layer observed by a scanning electron microscope.

Another object of the present invention is to provide a cholesteric liquid crystal layer having a higher circular polarization degree of reflected light.

Another object of the present invention is to provide an optically anisotropic body and a reflective film, each of which includes a cholesteric liquid crystal layer having a higher circular polarization degree of reflected light.

As a result of extensive studies to achieve the foregoing objects, the present inventors have found that the foregoing objects can be achieved by the following configurations.

[1] A method for producing a cholesteric liquid crystal layer, including a step X of forming a cholesteric liquid crystal layer A that satisfies all of conditions 1 to 3 and in which a liquid crystal compound is aligned into a state of a cholesteric liquid crystalline phase; and a step Y of carrying out a treatment to increase or decrease a helical pitch of the cholesteric liquid crystalline phase in the cholesteric liquid crystal layer A obtained by the step X to increase or decrease a tilt angle of an arrangement direction of bright portion and dark portion derived from the cholesteric liquid crystalline phase, as observed in a cross-section perpendicular to a main surface of the cholesteric liquid crystal layer A, with respect to a normal direction of the main surface of the cholesteric liquid crystal layer A.

Condition 1: The cholesteric liquid crystal layer A has a liquid crystal alignment pattern in which a direction of a molecular axis derived from the liquid crystal compound changes while continuously rotating along at least one in-plane direction.

Condition 2: The molecular axis of the liquid crystal compound is tilted with respect to the main surface of the cholesteric liquid crystal layer A on both main surfaces of the cholesteric liquid crystal layer A.

Condition 3: The arrangement direction of bright portion and dark portion derived from the cholesteric liquid crystalline phase is tilted with respect to a normal line of the main surface of the cholesteric liquid crystal layer A, in the cross-section perpendicular to the main surface of the cholesteric liquid crystal layer A observed by a scanning electron microscope.

[2] The method for producing a cholesteric liquid crystal layer according to [1], in which the cholesteric liquid crystal layer A contains a chiral agent, the chiral agent includes any chiral agent selected from the group consisting of a chiral agent whose helical twisting power changes upon irradiation with light and a chiral agent whose helical twisting power changes upon a change of temperature, in a case where the chiral agent is the chiral agent whose helical twisting power changes upon irradiation with light, the treatment to increase or decrease the helical pitch of the cholesteric liquid crystalline phase is a treatment of irradiating the cholesteric liquid crystal layer A with light, and in a case where the chiral agent is the chiral agent whose helical twisting power changes upon a change of temperature, the treatment to increase or decrease the helical pitch of the cholesteric liquid crystalline phase is a treatment of subjecting the cholesteric liquid crystal layer A to a change of temperature.

[3] The method for producing a cholesteric liquid crystal layer according to [1] or [2], in which the step X has a step X1 of forming a composition layer satisfying the following condition 4, the following condition 5, or the following condition 6 on a substrate, using a liquid crystal composition containing a liquid crystal compound and a chiral agent, and a step X2 of subjecting the composition layer to a treatment of cholesterically aligning the liquid crystal compound of the composition layer to form the cholesteric liquid crystal layer A.

Condition 4: At least a part of the liquid crystal compound in the composition layer is tilt-aligned with respect to a substrate surface Condition 5: The liquid crystal compound is aligned such that a tilt angle of the liquid crystal compound in the composition layer continuously changes along a thickness direction Condition 6: At least a part of the liquid crystal compound in the composition layer is vertically aligned with respect to the substrate surface

[4] The method for producing a cholesteric liquid crystal layer according to [3], in which an absolute value of a weighted average helical twisting power of the chiral agent is 0.0 to 1.5 $\mu m^{-1}$, in the composition layer of the step X1.

[5] The method for producing a cholesteric liquid crystal layer according to [3] or [4], in which the liquid crystal composition contains a photosensitive chiral agent whose helical twisting power changes upon irradiation with light, the treatment of cholesterically aligning the liquid crystal compound in the step X2 is a treatment of irradiating the composition layer with light, and the treatment of increasing or decreasing the helical pitch of the cholesteric liquid crystalline phase in the step Y is a treatment of irradiating the cholesteric liquid crystal layer A with light.

[6] The method for producing a cholesteric liquid crystal layer according to [5], in which the liquid crystal composition contains a photosensitive chiral agent whose helical twisting power changes upon irradiation with two types of light, and a wavelength of the light of a light irradiation treatment in the step X2 and a wavelength of the light of a light irradiation treatment in the step Y are different from each other.

[7] The method for producing a cholesteric liquid crystal layer according to [5], in which the liquid crystal composition contains a photosensitive chiral agent whose helical twisting power begins to increase upon irradiation with light and whose helical twisting power decreases upon continuous irradiation with light, and a wavelength of the light of a light irradiation treatment in the step X2 and a wavelength of the light of a light irradiation treatment in the step Y are the same as each other.

[8] The method for producing a cholesteric liquid crystal layer according to any one of [5] to [7], in which the photosensitive chiral agent contains a partial structure selected from the group consisting of an isosorbide partial structure, an isomannide partial structure, and a binaphthyl partial structure.

[9] The method for producing a cholesteric liquid crystal layer according to any one of [5] to [8], in which the photosensitive chiral agent has a double bond exhibiting a photoisomerization reaction or a photodimerization reaction in a molecule thereof.

[10] The method for producing a cholesteric liquid crystal layer according to [9], in which the double bond exhibiting a photoisomerization reaction or a photodimerization reaction has a cis structure.

[11] The method for producing a cholesteric liquid crystal layer according to any one of [5] to [10], in which the photosensitive chiral agent contains a partial structure selected from the group consisting of stilbene, chalcone, and cinnamoyl.

[12] A cholesteric liquid crystal layer in which a liquid crystal compound is aligned into a state of a cholesteric liquid crystalline phase, the cholesteric liquid crystal layer has a liquid crystal alignment pattern in which a direction of a molecular axis derived from the liquid crystal compound changes while continuously rotating along at least one in-plane direction, the molecular axis of the liquid crystal compound is tilted with respect to a main surface of the cholesteric liquid crystal layer on both main surfaces of the cholesteric liquid crystal layer, and an arrangement direction of bright portion and dark portion derived from the cholesteric liquid crystalline phase is tilted by 31° or more with respect to a normal line of the main surface of the cholesteric liquid crystal layer, in a cross-section perpendicular to the main surface of the cholesteric liquid crystal layer observed by a scanning electron microscope.

[13] The cholesteric liquid crystal layer according to [12], in which, in a case where a length that the direction of the molecular axis derived from the liquid crystal compound rotates by 180° is defined as one period Λ, in the liquid crystal alignment pattern, the one period Λ is 1 μm or less.

[14] The cholesteric liquid crystal layer according to [12] or [13], in which the one period Λ is 0.5 μm or less.

[15] The cholesteric liquid crystal layer according to any one of [12] to [14], in which a helical pitch of the cholesteric liquid crystal layer changes in at least one direction of an in-plane direction or a film thickness direction.

[16] The cholesteric liquid crystal layer according to any one of [12] to [15], in which the cholesteric liquid crystal layer further contains a chiral agent, and the chiral agent contains a chiral compound that induces a right-handed helix and a chiral compound that induces a left-handed helix.

[17] The cholesteric liquid crystal layer according to any one of [12] to [16], in which a chiral agent contains a partial structure selected from the group consisting of an isosorbide partial structure, an isomannide partial structure, and a binaphthyl partial structure.

[18] An optically anisotropic body including the cholesteric liquid crystal layer according to any one of [12] to [17].

[19] A reflective film including the cholesteric liquid crystal layer according to any one of [12] to [17].

According to an aspect of the present invention, it is possible to provide a method for producing a cholesteric liquid crystal layer, which is capable of freely controlling a tilt angle of an arrangement direction of bright portion and dark portion derived from a cholesteric liquid crystalline phase with respect to a normal line of a main surface of the cholesteric liquid crystal layer, in a cross-section perpendicular to the main surface of the cholesteric liquid crystal layer observed by a scanning electron microscope.

According to another aspect of the present invention, it is possible to provide a cholesteric liquid crystal layer having a higher circular polarization degree of reflected light.

According to another aspect of the present invention, it is possible to provide an optically anisotropic body and a reflective film, each of which includes a cholesteric liquid crystal layer having a higher circular polarization degree of reflected light.

DESCRIPTION OF THE PREFERRED EMBODIMENTS

Figure 1A:
FIG. 1A is a schematic diagram showing a state before increasing or decreasing a helical pitch of a cholesteric liquid crystalline phase in a cholesteric liquid crystal layer A.

Hereinafter, the present invention will be described in detail.

The description of configuration requirements described below may be made based on representative embodiments of the present invention, but the present invention is not limited to such embodiments.

Any numerical range expressed by using "to" in the present specification means a range including the numerical values before and after the "to" as a lower limit value and an upper limit value, respectively.

In addition, in the present specification, the term "(meth)acrylate" is a notation representing both acrylate and meth-acrylate, the term "(meth)acryloyl group" is a notation representing both an acryloyl group and a methacryloyl group, and the term "(meth)acrylic" is a notation representing both acrylic and methacrylic.

In a case where substitution or non-substitution is not explicitly indicated in the description of a group (a group of atoms) in the present specification, the group includes both a group having no substituent and a group having a substituent. For example, the term "alkyl group" includes not only an alkyl group having no substituent (unsubstituted alkyl group) but also an alkyl group having a substituent (substituted alkyl group).

In the present specification, in a case where it is simply referred to as a substituent, examples of the substituent include Substituent T shown below.

(Substituent T)

Examples of the Substituent T include a halogen atom (such as a fluorine atom, a chlorine atom, a bromine atom, or an iodine atom), an alkyl group, a cycloalkyl group, an alkenyl group, a cycloalkenyl group, an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an amino group (including an alkylamino group and an anilino group), an acylamino group, an aminocarbonylamino group, an alkoxycarbonylamino group, an aryloxycarbonylamino group, a sulfamoylamino group, an alkylsulfonylamino or arylsulfonylamino group, a mercapto group, an alkylthio group, an arylthio group, a heterocyclic thio group, a sulfamoyl group, a sulfo group, an alkylsulfinyl or arylsulfinyl group, an alkylsulfonyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, and a group containing a polymerizable group.

The bonding direction of a divalent group described in the present specification is not limited unless otherwise specified. For example, in a case where M is —OCO—C(CN)=CH— in a compound represented by General Formula of "L-M-N", M may be *1-OCO—C(CN)=CH—*2 or may be *1-CH=C(CN)—OCO—*2, assuming that the position bonded to the L side is *1 and the position bonded to the N side is *2. In addition, for example, in a case where M is —COO—, M may be *1-OCO—*2 or may be *1-OCO—*2, assuming that the position bonded to the L side is *1 and the position bonded to the N side is *2.

In the present specification, the term "same" includes an error range generally accepted in the art. In addition, in the present specification, the "same" with respect to an angle means that a difference from an exact angle is within a range of less than 5 degrees unless otherwise specified. The difference from an exact angle is preferably less than 4 degrees and more preferably less than 3 degrees.

The "light" in the present specification means an actinic ray or radiation, for example, an emission line spectrum of a mercury lamp, a far ultraviolet ray typified by an excimer laser, an extreme ultraviolet ray (EUV light), an X-ray, an ultraviolet ray, or an electron beam (EB). Among them, an ultraviolet ray is preferable.

The "increase or decrease in helical twisting power" in the present specification represents an increase or decrease in helical twisting power in a case where an initial helical direction (helical direction before light irradiation) of each of chiral agents is defined as "positive". Therefore, even in a case where the helical twisting power of a chiral agent continues to decrease and goes below zero upon irradiation with light and then the helical direction becomes "negative" (that is, even in a case where a chiral agent induces a helix in a helical direction opposite to an initial helical direction (helical direction before light irradiation)), such a chiral agent also corresponds to the "chiral agent whose helical twisting power decreases".

[Method for Producing Cholesteric Liquid Crystal Layer]

The method for producing a cholesteric liquid crystal layer according to the embodiment of the present invention includes the following step X and the following step Y.

Step X: a step of forming a cholesteric liquid crystal layer A that satisfies all of conditions 1 to 3 and is such that a liquid crystal compound is aligned into a state of a cholesteric liquid crystalline phase Step Y: a step of carrying out a treatment to increase or decrease a helical pitch of the cholesteric liquid crystalline phase in the cholesteric liquid crystal layer A obtained by the step X to increase or decrease a tilt angle (hereinafter, also simply referred to as "specific tilt angle") of an arrangement direction of bright portion and dark portion derived from the cholesteric liquid crystalline phase, as observed in a cross-section perpendicular to a main surface of the cholesteric liquid crystal layer A, with respect to a normal direction of the main surface of the cholesteric liquid crystal layer A Condition 1: The cholesteric liquid crystal layer A has a liquid crystal alignment pattern in which a direction of a molecular axis derived from the liquid crystal compound changes while continuously rotating along at least one in-plane direction.

Condition 2: The molecular axis of the liquid crystal compound is tilted with respect to the main surface of the cholesteric liquid crystal layer A on both main surfaces of the cholesteric liquid crystal layer A.

Condition 3: An arrangement direction of bright portion and dark portion derived from the cholesteric liquid crystalline phase is tilted with respect to a normal line of the main surface of the cholesteric liquid crystal layer A, in a cross-section perpendicular to the main surface of the cholesteric liquid crystal layer A observed by a scanning electron microscope.

Now, the present inventors have clarified that, in a case where the step Y is carried out after the step X, a period length of a liquid crystal alignment pattern once formed in the plane of the cholesteric liquid crystal layer A by the step X (a length in which a direction of a molecular axis derived from a liquid crystal compound is rotated by 180° (one period $\Lambda$)) is kept substantially constant regardless of the change in the helical pitch of the cholesteric liquid crystalline phase in the step Y. Further, the present inventors have clarified that, in the step Y, the cholesteric liquid crystalline phase of the cholesteric liquid crystal layer A changes the helical pitch while maintaining the period length, so that tilt angles of lines formed by bright portions and lines formed by dark portions (hereinafter, collectively referred to as "bright and dark lines") derived from the cholesteric liquid crystalline phase, observed by a scanning electron microscope, with respect to the main surface of the cholesteric liquid crystal layer are changed to maintain a stable state.

That is, in a case where the step Y is carried out after the step X, the length (one period $\Lambda$) in which the direction of the molecular axis derived from the liquid crystal compound in the liquid crystal alignment pattern in the cholesteric liquid crystal layer A is rotated by 180° does not change substantially, and only the tilt angle of the arrangement direction of the bright and dark lines derived from the cholesteric liquid crystalline phase with respect to the normal line of the main surface of the cholesteric liquid crystal layer is increased or decreased.

Figure 1B:
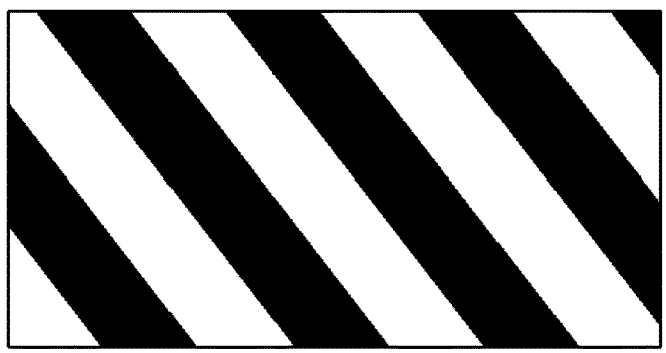
FIG. 1B is a schematic diagram showing a change in a case where the helical pitch of the cholesteric liquid crystalline phase in the cholesteric liquid crystal layer A shown in FIG. 1A is increased.

More specifically, in a case where the step of increasing the helical pitch of the cholesteric liquid crystalline phase is carried out in the step Y, the tilt angle of the arrangement direction of the bright and dark lines derived from the cholesteric liquid crystalline phase with respect to the normal line of the main surface of the cholesteric liquid crystal layer is increased, as shown in FIGS. 1A and 1B. It should be noted that FIG. 1A shows a state before the step Y is carried out, and FIG. 1B shows a state after the helical pitch is increased.

Figure 2A:
FIG. 2A is a schematic diagram showing a state before increasing or decreasing the helical pitch of the cholesteric liquid crystalline phase in the cholesteric liquid crystal layer A.
Figure 2B:
FIG. 2B is a schematic diagram showing a change in a case where the helical pitch of the cholesteric liquid crystalline phase in the cholesteric liquid crystal layer A shown in FIG. 2A is decreased.

In addition, in a case where the step of decreasing the helical pitch of the cholesteric liquid crystalline phase is carried out in the step Y, the tilt angle of the arrangement direction of the bright and dark lines derived from the cholesteric liquid crystalline phase with respect to the normal line of the main surface of the cholesteric liquid crystal layer is decreased, as shown in FIGS. 2A and 2B. It should be noted that FIG. 2A shows a state before the step Y is carried out, and FIG. 2B shows a state after the helical pitch is decreased.

The specific procedure of the step Y will be described in detail later, and examples thereof include a method of increasing or decreasing an absolute value of a weighted average helical twisting power of a chiral agent in the cholesteric liquid crystal layer A.

[Cholesteric Liquid Crystal Layer A]

Next, the cholesteric liquid crystal layer A formed in the above-mentioned step X will be described in detail.

Figure 3:
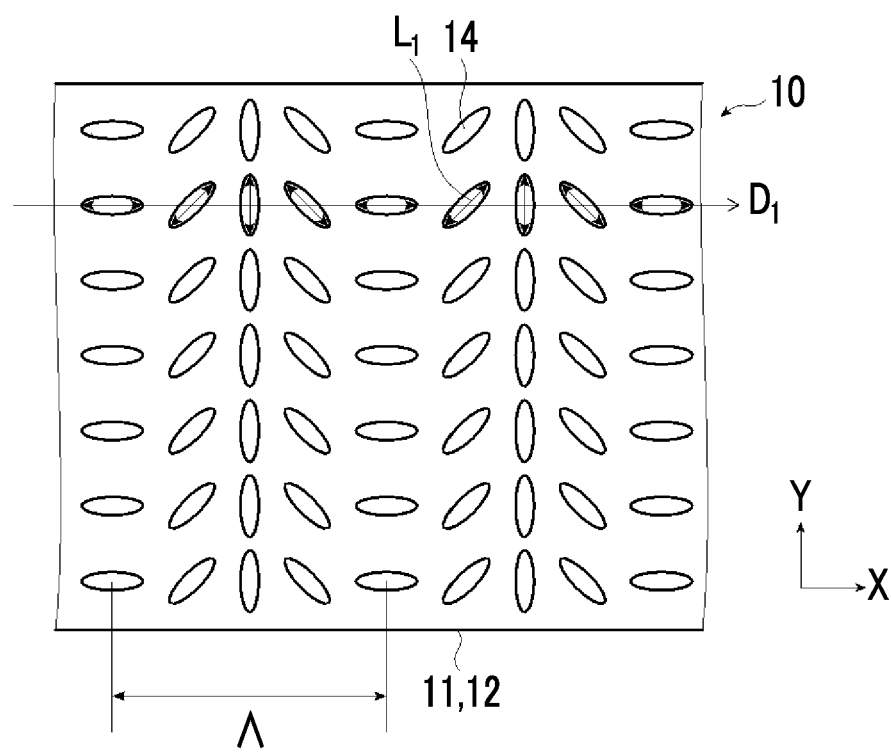
FIG. 3 is a schematic diagram of an X-Y plane of the cholesteric liquid crystal layer A.
Figure 4:
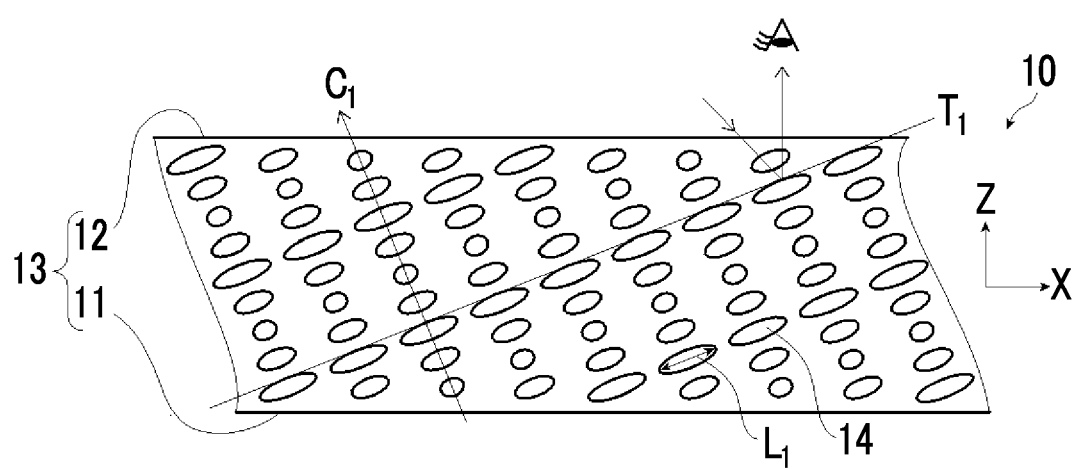
FIG. 4 is a schematic diagram of an X-Z plane of the cholesteric liquid crystal layer A.

FIG. 3 and FIG. 4 show schematic diagrams conceptually showing an alignment state of a liquid crystal compound in the cholesteric liquid crystal layer A.

FIG. 3 is a schematic diagram showing an in-plane alignment state of a liquid crystal compound in a main surface 11 and a main surface 12 of a cholesteric liquid crystal layer A10 having a pair of main surfaces 13 consisting of the main surface 11 and the main surface 12. In addition, FIG. 4 is a schematic cross-sectional diagram showing a state of a cholesteric liquid crystalline phase in a cross-section perpendicular to the main surface 11 and the main surface 12. Hereinafter, the description will be given with the main surface 11 and the main surface 12 of the cholesteric liquid crystal layer A10 being an X-Y plane, and a cross-section perpendicular to the X-Y plane being an X-Z plane. That is, FIG. 3 corresponds to a schematic diagram of the X-Y plane of the cholesteric liquid crystal layer A10, and FIG. 4 corresponds to a schematic diagram of the X-Z plane of the cholesteric liquid crystal layer A10.

It should be noted that, in the following, an aspect of a rod-like liquid crystal compound as the liquid crystal compound will be described as an example.

As shown in FIG. 3, in the X-Y plane of the cholesteric liquid crystal layer A10, a liquid crystal compound 14 is arranged along a plurality of parallel arrangement axes $D_1$ in the X-Y plane, and in the respective arrangement axes $D_1$, the direction of a molecular axis $L_1$ of the liquid crystal compound 14 changes while continuously rotating in one in-plane direction along the arrangement axis $D_1$. That is, the cholesteric liquid crystal layer A10 has a liquid crystal alignment pattern in which a direction of a molecular axis derived from the liquid crystal compound changes while continuously rotating along at least one in-plane direction on two main surfaces thereof.

Here, for the sake of explanation, it is assumed that the arrangement axis $D_1$ faces in an X direction. In addition, in a Y direction, the liquid crystal compounds 14 having the same direction of the molecular axis $L_1$ are aligned at equal intervals.

That is, the cholesteric liquid crystal layer A10 satisfies the above-mentioned condition 1 (The cholesteric liquid crystal layer A has a liquid crystal alignment pattern in which a direction of a molecular axis derived from the liquid crystal compound changes while continuously rotating along at least one in-plane direction).

It should be noted that the phrase "the direction of the molecular axis $L_1$ of the liquid crystal compound 14 changes while continuously rotating in one in-plane direction along the arrangement axis $D_1$" means that an angle formed by the molecular axis $L_1$ of the liquid crystal compound 14 and the arrangement axis $D_1$ varies depending on the position in an arrangement axis $D_1$ direction, and therefore the angle formed by the molecular axis $L_1$ and the arrangement axis $D_1$ along the arrangement axis $D_1$ gradually changes from $\theta_1$ to $\theta_1+180°$ or from $\theta_1$ to $\theta_1-180°$. That is, in the plurality of liquid crystal compounds 14 arranged along the arrangement axis $D_1$, the molecular axis $L_1$ changes while rotating by a constant angle along the arrangement axis $D_1$ as shown in FIG. 3.

In addition, in the present specification, in a case where the liquid crystal compound 14 is a rod-like liquid crystal compound, the molecular axis $L_1$ of the liquid crystal compound 14 is intended to be a molecular major axis of the rod-like liquid crystal compound. On the other hand, in a case where the liquid crystal compound 14 is a disk-like liquid crystal compound, the molecular axis $L_1$ of the liquid crystal compound 14 is intended to be an axis parallel to the direction normal to the disc plane of the disk-like liquid crystal compound.

In addition, one period $\Lambda$ is preferably 1 μm or less and more preferably 0.5 μm or less in a case where the length that the direction of the molecular axis $L_1$ of the liquid crystal compound 14 rotates by 180° on the X-Y plane of the cholesteric liquid crystal layer A10 is defined as the one period $\Lambda$, as shown in FIG. 3.

By setting the one period $\Lambda$ to 1 μm or less, the arrangement direction of the bright and dark lines can be more easily tilted with respect to the normal line of the main surface of the cholesteric liquid crystal layer. In other words, the angle formed by the arrangement direction of the bright and dark lines and the normal line of the main surface of the cholesteric liquid crystal layer can be made larger.

The one period $\Lambda$ is preferably in the above range on both main surfaces of main surface 11 and main surface 12 of the cholesteric liquid crystal layer A10.

The one period $\Lambda$ corresponds to an interval between the bright line and the bright line or an interval between the dark line and the dark line derived from the cholesteric liquid crystalline phase, as observed by a scanning electron microscope, in an in-plane direction. The above-mentioned value of one period $\Lambda$ is a value calculated and averaged by measuring the above-mentioned intervals in the in-plane direction bright and dark lines in the scanning electron microscope at 10 points on both main surfaces of the cholesteric liquid crystal layer.

FIG. 4 shows a schematic diagram of an X-Z plane of the cholesteric liquid crystal layer A10. It should be noted that FIG. 4 is a cross-sectional view in a case where the cholesteric liquid crystal layer A10 is cut along a line along the X-axis direction of FIG. 3. That is, FIG. 4 is a cross-sectional view in a case where the cholesteric liquid crystal layer A10 is cut along the direction in which the above-mentioned liquid crystal alignment pattern extends and perpendicular to the main surface.

In the X-Z plane of the cholesteric liquid crystal layer A10 shown in FIG. 4, the liquid crystal compound 14 is aligned with its molecular axis $L_1$ tilted with respect to the main surface 11 and the main surface 12 (X-Y plane).

That is, the cholesteric liquid crystal layer A10 satisfies the condition 2 (The molecular axis of the liquid crystal compound is tilted with respect to the main surface of the cholesteric liquid crystal layer A on both main surfaces of the cholesteric liquid crystal layer A).

The average angle (average tilt angle) $\theta_2$ (not shown) formed by the molecular axis $L_1$ of the liquid crystal compound 14 and the main plane 11 and the main plane 12 (X-Y plane) is not particularly limited, and is often 5° to 80°. Above all, the average angle (average tilt angle) $\theta_2$ is preferably 10° or more, more preferably 15° or more, and still more preferably 20° or more, from the viewpoint that it is easy to form a cholesteric liquid crystal layer in which the arrangement direction of bright portion and dark portion, which will be described later, is tilted by 31° or more with respect to the normal line of the main surface. The average angle $\theta_2$ can be measured by observing the X-Z plane of the cholesteric liquid crystal layer A10 by a polarization microscope. Above all, in the X-Z plane of the cholesteric liquid crystal layer A10, the molecular axis $L_1$ of the liquid crystal compound 14 is preferably tilt-aligned in the same direction with respect to the main surface 11 and the main surface 12 (X-Y plane), and the molecular axis $L_1$ of the liquid crystal compound 14 is more preferably tilt-aligned in the same direction over the entire cholesteric liquid crystal layer A10.

The average angle is a value obtained by measuring angles formed by the molecular axis $L_1$ of the liquid crystal compound 14 and the main surface 11 and the main surface 12 at any 5 or more points in the cross-sectional polarization microscope observation of the cholesteric liquid crystal layer, and then arithmetically averaging the measured values.

As shown in FIG. 4, in the cholesteric liquid crystal layer A10, a helical axis $C_1$ derived from the cholesteric liquid crystalline phase is tilted at a predetermined angle with respect to the main surface 11 and the main surface 12 (X-Y plane) in a case where the molecular axis $L_1$ has the above-described alignment. That is, a reflecting surface $T_1$ of the cholesteric liquid crystal layer A10 (a plane which is orthogonal to the helical axis $C_1$ and in which liquid crystal molecules having the same azimuthal angle are present) is tilted in a substantially constant direction with respect to the main surface 11 and the main surface 12 (X-Y plane).

The phrase "liquid crystal molecules having the same azimuthal angle" refers to liquid crystal molecules in which the alignment directions of the molecular axes are the same as each other in a case of being projected on the main surface 11 and the main surface 12 (X-Y plane).

Figure 5:
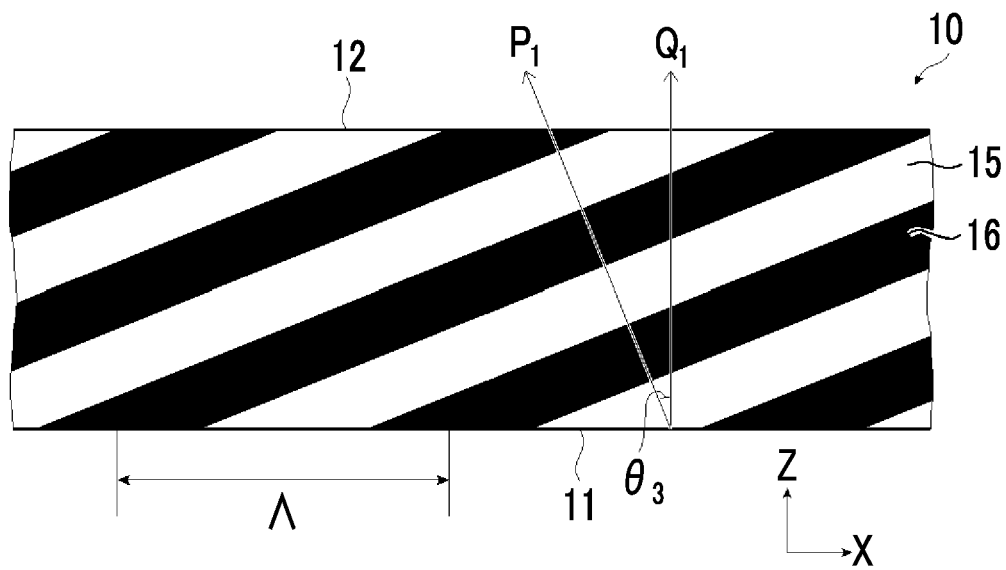
FIG. 5 is a schematic diagram in a case where the X-Z plane of the cholesteric liquid crystal layer A is observed by a scanning electron microscope (SEM).

In a case where the X-Z plane of the cholesteric liquid crystal layer A10 shown in FIG. 4 is observed by a scanning electron microscope, a stripe pattern is observed in which an arrangement direction $P_1$ in which bright portions 15 and dark portions 16 are alternately arranged as shown in FIG. 5 is tilted at a predetermined angle $\theta_3$ with respect to the normal line $Q_1$ of the main surface 11 and the main surface 12 (X-Y plane).

That is, the cholesteric liquid crystal layer A10 satisfies the condition 3 (The arrangement direction of bright portion and dark portion derived from the cholesteric liquid crystalline phase is tilted with respect to a normal line of a main surface of the cholesteric liquid crystal layer A, in a cross-section perpendicular to the main surface of the cholesteric liquid crystal layer A observed by a scanning electron microscope).

In the cholesteric liquid crystal layer A10, the angle $\theta_3$ is not particularly limited and is often 5° to 80°. Above all, the angle $\theta_3$ is preferably 10° or more, more preferably 15° or more, and still more preferably 20° or more, from the viewpoint that it is easy to form a cholesteric liquid crystal layer in which the arrangement direction of bright portion and dark portion, which will be described later, is tilted by 31° or more with respect to the normal line of the main surface.

In the cholesteric liquid crystal layer A10, it is preferable that the molecular axis $L_1$ of the liquid crystal compound 14 is substantially orthogonal to the arrangement direction $P_1$ in which the bright portions 15 and the dark portions 16 are alternately arranged. The angle formed by the molecular axis $L_1$ and the arrangement direction $P_1$ is preferably 80° to 90° and more preferably 85° to 90°.

[Suitable Aspect of Step X]

The method for producing the cholesteric liquid crystal layer A10 is not particularly limited, and the step X preferably includes the following step X1 and step X2.

Step X1: a step of forming a composition layer satisfying the following condition 4, the following condition 5, or the following condition 6 on a substrate, using a liquid crystal composition containing a liquid crystal compound and a chiral agent Step X2: a step of subjecting the composition layer to a treatment for cholesterically aligning the liquid crystal compound in the composition layer to form a cholesteric liquid crystal layer A Condition 4: At least a part of the liquid crystal compound in the composition layer is tilt-aligned with respect to the substrate surface.

Condition 5: The liquid crystal compound is aligned such that a tilt angle of the liquid crystal compound in the composition layer continuously changes along a thickness direction.

Condition 6: At least a part of the liquid crystal compound in the composition layer is vertically aligned with respect to the substrate surface.

<<Mechanism of Action of Step X1>>

Figure 6:
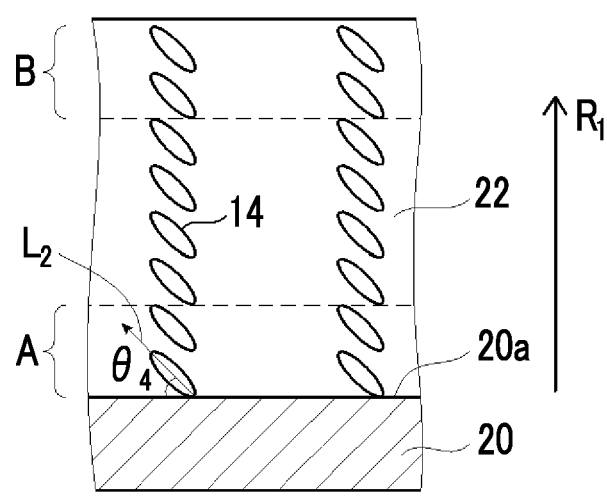
FIG. 6 is a schematic cross-sectional diagram for describing an example of an embodiment of a composition layer that satisfies a condition 1.

First, FIG. 6 shows a schematic cross-sectional diagram of the composition layer obtained by the step X1. The composition layer shown in FIG. 6 is an example of an embodiment of the composition layer satisfying the condition 4. In the following, an aspect in a case where the liquid crystal compound is a rod-like liquid crystal compound will be described as an example. That is, the liquid crystal compound 14 in FIG. 6 is a rod-like liquid crystal compound.

As shown in FIG. 6, the liquid crystal compound 14 in a composition layer 22 disposed on a substrate 20 is tilt-aligned with respect to a substrate surface 20a. In other words, in the composition layer 22, the liquid crystal compound 14 is aligned in a certain direction (uniaxial direction) such that a molecular axis $L_2$ derived from the liquid crystal compound 14 forms a predetermined angle $\theta_4$ with respect to the substrate surface 20a.

In the present specification, in a case where the liquid crystal compound 14 is a rod-like liquid crystal compound, the molecular axis $L_2$ of the liquid crystal compound 14 is intended to be a molecular major axis of the rod-like liquid crystal compound. On the other hand, in a case where the liquid crystal compound 14 is a disk-like liquid crystal compound, the molecular axis $L_2$ of the liquid crystal compound 14 is intended to be an axis parallel to the direction normal to the disc plane of the disk-like liquid crystal compound.

FIG. 6 shows an embodiment in which the liquid crystal compound 14 is aligned over the entire area of the composition layer 22 in a thickness direction $R_1$ such that the molecular axis $L_2$ derived from the liquid crystal compound 14 forms a predetermined angle $\theta 4$ with respect to the substrate surface 20a, but the composition layer satisfying the condition 1 obtained by the step X1 may be sufficient such that a part of the liquid crystal compound is tilt-aligned; and it is preferable that, in at least one of the substrate 20-side surface of the composition layer 22 (corresponding to region A in FIG. 1) or the surface of the composition layer 22 opposite to the substrate 20 (corresponding to region B in FIG. 1), the liquid crystal compound 14 is aligned such that the molecular axis $L_2$ derived from the liquid crystal compound 14 forms a predetermined angle $\theta_4$ with respect to the substrate surface 20a, and it is more preferable that the liquid crystal compound 14 is tilt-aligned on the substrate 20-side surface of the composition layer 22 such that the molecular axis $L_2$ derived from the liquid crystal compound 14 forms a predetermined angle $\theta_4$ with respect to the substrate surface 20a. In at least one of the region A or the region B, in a case where the liquid crystal compound 14 is aligned such that the molecular axis $L_2$ derived from the liquid crystal compound 14 forms a predetermined angle $\theta_4$ with respect to the substrate surface 20a, and then in a case where the liquid crystal compound 14 is brought into a state of a cholesteric liquid crystalline phase in the subsequent step X2, the cholesteric alignment and the tilt of the molecular axis $L_2$ of the liquid crystal compound 14 in the other region can be induced by an alignment regulating force based on the aligned liquid crystal compound 14 in the region A and/or the region B.

In addition, although not shown, the composition layer satisfying the above-mentioned condition 2 corresponds to the composition layer 22 shown in FIG. 6 in which the liquid crystal compound 14 is hybrid-aligned with respect to the substrate surface 20a. That is, the composition layer satisfying the above-mentioned condition 2 corresponds to an aspect in which, in the composition layer 22 shown in FIG. 6, an angle $\theta_5$ (tilt angle $\theta_5$) formed by the molecular axis of the liquid crystal compound 14 and the substrate surface 20a continuously changes in a thickness direction.

The angles $\theta_4$ and $\theta_5$ are not particularly limited unless they are 0° in the entire composition layer. In other words, it does not prevent that the angles $\theta_4$ and $\theta_5$ are 0° in a partial region of the composition layer. The angles $\theta_4$ and $\theta_5$ are, for example, 0° to 90°. Above all, the angles $\theta_4$ and $\theta_5$ are preferably 3° to 90°, more preferably 10° to 90°, and still more preferably 20° to 80° on the substrate-side surface of the composition layer. In addition, the angles $\theta_4$ and $\theta_5$ are preferably 0° to 50° and more preferably 0° to 30° on the surface of the composition layer opposite to the substrate.

In addition, although not shown, the composition layer satisfying the above-mentioned condition 3 corresponds to the composition layer 22 shown in FIG. 6 in which the molecular axis of the liquid crystal compound 14 is vertically aligned with respect to the substrate surface 20a. In other words, in a case where the liquid crystal compound 14 is a rod-like liquid crystal compound, the composition layer satisfying the above-mentioned condition 3 corresponds to an aspect in which the angle $\theta_4$ is 90° in the above description of FIG. 1. In addition, in a case where the liquid crystal compound 14 is a disk-like liquid crystal compound, the composition layer satisfying the above-mentioned condition 3 corresponds to one in which the disc plane of the liquid crystal compound 14 is aligned parallel to the substrate surface 20a.

The composition layer obtained by the step X1 is preferably a composition layer satisfying the condition 4 or the condition 5.

<<Mechanism of Action of Step X2>>

After obtaining the composition layer satisfying the condition 4, the condition 5, or the condition 6 by the step X1, the liquid crystal compound in the composition layer is cholesterically aligned in the step X2 (in other words, the liquid crystal compound is brought into a cholesteric liquid crystalline phase) to form a cholesteric liquid crystal layer A.

A specific example of the treatment for cholesteric alignment of the liquid crystal compound in the composition layer will be described in detail later, and a method of increasing an absolute value of a weighted average helical twisting power of a chiral agent in the composition layer can be mentioned.

The materials (a liquid crystal compound and a chiral agent) in the liquid crystal composition described above will be described in detail later.

The chiral agent may be used alone or in combination of two or more thereof.

As described above, in the method for producing a cholesteric liquid crystal layer according to the embodiment of the present invention, it is preferable to have the step X1, the step X2, and the step Y.

As will be described in detail later, a treatment of irradiating the cholesteric liquid crystal layer A with light and a treatment of giving a change of temperature to the cholesteric liquid crystal layer A can be mentioned as the treatment of increasing or decreasing the helical pitch of the cholesteric liquid crystalline phase in the step Y.

In addition, as will be described in detail later, a treatment of irradiating the composition layer with light and a treatment of giving a change of temperature to the composition layer can be mentioned as the treatment in a case of forming the cholesteric liquid crystal layer A in the step X2.

[Specific example of method for producing cholesteric liquid crystal layer]

Hereinafter, a specific procedure of the method for producing a cholesteric liquid crystal layer according to the embodiment of the present invention will be described in detail.

In the following description, the following first embodiment to fourth embodiment will be described separately from one another.

<First embodiment> An aspect in which a light irradiation treatment is carried out in the step X2 and a light irradiation treatment is carried out in the step Y.

<Second embodiment> An aspect in which a light irradiation treatment is carried out in the step X2 and a temperature change treatment is carried out in the step Y.

<Third embodiment> An aspect in which a temperature change treatment is carried out in the step X2 and a light irradiation treatment is carried out in the step Y.

<Fourth embodiment> An aspect in which a temperature change treatment is carried out in the step X2 and a temperature change treatment is carried out in the step Y.

One of the suitable aspects of the specific procedure of the method for producing a cholesteric liquid crystal layer according to the embodiment of the present invention may be, for example, a method in which a liquid crystal composition contains two or more chiral agents, absolute values of weighted average helical twisting power of the chiral agents in the composition layer are increased in the step X2 and absolute values of weighted average helical twisting power of the chiral agents in the cholesteric liquid crystal layer A are increased or decreased in the step Y.

First Embodiment

The first embodiment of the method for producing a cholesteric liquid crystal layer according to the embodiment of the present invention includes the following step X1A, step X2A, and step YA.

Step X1A: a step of forming a composition layer satisfying the above-mentioned condition 4, the above-mentioned condition 5, or the above-mentioned condition 6 on a substrate, using a liquid crystal composition containing a liquid crystal compound and a photosensitive chiral agent whose helical twisting power changes upon irradiation with light Step X2A: a step of irradiating the composition layer with light to cholesterically align a liquid crystal compound in the composition layer to form a cholesteric liquid crystal layer A Step YA: a step of irradiating the cholesteric liquid crystal layer A obtained by the step X2A with light to carry out a treatment of increasing or decreasing a helical pitch of a cholesteric liquid crystalline phase in the cholesteric liquid crystal layer A to increase or decrease a specific tilt angle Hereinafter, each step will be described in detail.

• Step X1A

The step X1A is a step of forming a composition layer satisfying the above-mentioned condition 4, the above-mentioned condition 5, or the above-mentioned condition 6 on a substrate, using a liquid crystal composition containing a liquid crystal compound and a photosensitive chiral agent whose helical twisting power changes upon irradiation with light.

A composition layer satisfying the above-mentioned condition 4, the above-mentioned condition 5, or the above-mentioned condition 6 can be formed by carrying out the present step X1A. The formed composition layer contains a photosensitive chiral agent whose helical twisting power changes upon irradiation with light.

Hereinafter, first, the materials and members used in the present step will be described in detail, and then the procedure of the step will be described in detail.

•• Liquid Crystal Compound

The liquid crystal composition contains a liquid crystal compound.

The type of the liquid crystal compound is not particularly limited, and any known liquid crystal compound can be used. Generally, the liquid crystal compound can be classified into a rod-like type (rod-like liquid crystal compound) and a disk-like type (discotic liquid crystal compound and disk-like liquid crystal compound) according to the shape thereof. Further, the rod-like type and the disk-like type are each classified into a low molecular weight type and a high molecular weight type. The high molecular weight generally refers to having a polymerization degree of 100 or more (Polymer Physics-Phase Transition Dynamics, Masao Doi, page 2, Iwanami Shoten, 1992). Any liquid crystal compound can be used in the present invention. In addition, two or more liquid crystal compounds may be used in combination.

The liquid crystal compound preferably has at least one or more polymerizable groups.

The type of the polymerizable group is not particularly limited, and is preferably a functional group capable of an addition polymerization reaction and more preferably a polymerizable ethylenic unsaturated group or a cyclic polymerizable group. More specifically, the polymerizable group is preferably a (meth)acryloyl group, a vinyl group, a styryl group, an allyl group, an epoxy group, or an oxetane group, and more preferably a (meth)acryloyl group.

•• Chiral Agent

The liquid crystal composition contains a photosensitive chiral agent whose helical twisting power changes upon irradiation with light (hereinafter, also simply referred to as "photosensitive chiral agent").

The photosensitive chiral agent may be liquid crystalline or non-liquid crystalline. In addition, the photosensitive chiral agent may be a chiral agent containing an asymmetric carbon atom, or may be an axially asymmetric compound or planarly asymmetric compound containing no asymmetric carbon atom.

Examples of the photosensitive chiral agent include a chiral agent whose helical twisting power decreases upon irradiation with light and a chiral agent whose helical twisting power increases upon irradiation with light.

The photosensitive chiral agent may be, for example, a so-called photoreactive chiral agent. The photoreactive chiral agent is a compound that has a chiral site and a photoreactive site that undergoes a structural change upon irradiation with light and that greatly changes a twisting power of a liquid crystal compound according to an irradiation amount, for example.

Examples of the photoreactive site that undergoes a structural change upon irradiation with light include photochromic compounds (Kingo Uchida and Masahiro Irie, "Chemical Industry", Vol. 64, p. 640, 1999; and Kingo Uchida and Masahiro Irie, "Fine Chemicals", Vol. 28(9), p. 15, 1999). In addition, the structural change means decomposition, addition reaction, isomerization, racemization, [2+2] photocyclization, dimerization reaction, or the like occurred upon irradiation of a photoreactive site with light, and the structural change may be irreversible. In addition, the chiral site corresponds to the asymmetric carbon described in Chemistry of Liquid Crystals, No. 22, Hiroyuki Nohira, Chemical Reviews, p. 73, 1994.

Examples of the photoreactive chiral agent include photoreactive chiral agents described in paragraphs [0044] to [0047] of JP2001-159709A, optically active compounds described in paragraphs [0019] to [0043] of JP2002-179669A, optically active compounds described in paragraphs [0020] to [0044] of JP2002-179633A, optically active compounds described in paragraphs [0016] to [0040] of JP2002-179670A, optically active compounds described in paragraphs [0017] to [0050] of JP2002-179668A, optically active compounds described in paragraphs [0018] to [0044] of JP2002-180051A, optically active compounds described and optically active isosorbide derivatives in paragraphs [0016] to [0055] of JP2002-338575A, optically active compounds described in paragraphs [0023] to [0032] of JP2002-080478A, photoreactive chiral agents described in paragraphs [0019] to [0029] of JP2002-080851A, optically active compounds described in paragraphs [0022] to [0049] of JP2002-179681A, optically active compounds described in paragraphs [0015] to [0044] of JP2002-302487A, optically active polyesters described in paragraphs [0015] to [0050] of JP2002-338668A, binaphthol derivatives described in paragraphs [0019] to [0041] of JP2003-055315A, optically active fulgide compounds described in paragraphs [0008] to [0043] of JP2003-073381A, optically active isosorbide derivatives described in paragraphs [0015] to [0057] of JP2003-306490A, optically active isosorbide derivatives described in paragraphs [0015] to [0041] of JP2003-306491A, optically active isosorbide derivatives described in paragraphs [0015] to [0049] of JP2003-313187A, optically active isomannide derivatives described in paragraphs [0015] to [0057] of JP2003-313188A, optically active isosorbide derivatives described in paragraphs [0015] to [0049] of JP2003-313189A, optically active polyesters/amides described in paragraphs [0015] to [0052] of JP2003-313292A, optically active compounds described in paragraphs [0012] to [0053] of WO2018/194157A, and optically active compounds described in paragraphs [0020] to [0049] of JP2002-179682A.

The photosensitive chiral agent preferably has a double bond exhibiting a photoisomerization reaction or a photodimerization reaction in a molecule thereof, from the viewpoint that a rate of change of a helical twisting power upon irradiation with light is more excellent.

The chiral agent containing a double bond exhibiting a photoisomerization reaction or a photodimerization reaction is specifically preferably a chiral agent containing a partial structure selected from the group consisting of cinnamoyl, stilbene, chalcone, azobenzene, and azomethine; and more preferably a chiral agent containing a partial structure selected from the group consisting of cinnamoyl, stilbene, and chalcone, from the viewpoint that the absorption of visible light is small.

Above all, the double bond exhibiting a photoisomerization reaction or a photodimerization reaction preferably has a cis structure, from the viewpoint that an initial helical twisting power (helical twisting power before light irradiation) is low and a rate of change of a helical twisting power upon irradiation with light is more excellent. That is, for example, in a case of a chiral agent containing stilbene as a partial structure, a chiral agent containing cis-stilbene as a partial structure is preferable, in a case of a chiral agent containing chalcone as a partial structure, a chiral agent containing cis-chalcone as a partial structure is preferable; and in a case of a chiral agent containing cinnamoyl as a partial structure, a chiral agent containing cis-cinnamoyl as a partial structure is preferable.

In addition, from the viewpoint that a rate of change of a helical twisting power is more excellent, the photosensitive chiral agent preferably contains a partial structure selected from the group consisting of an isosorbide partial structure (a partial structure derived from isosorbide), an isomannide partial structure (a partial structure derived from isomannide), and a binaphthyl partial structure, and more preferably a binaphthyl partial structure. In the present specification, the binaphthyl partial structure, the isosorbide partial structure, and the isomannide partial structure are intended to have the following structures, respectively.

The portion of the binaphthyl partial structure in which a solid Line and a broken line are parallel to each other represents a single bond or a double bond. The case where the portion where a solid line and a broken line are parallel to each other is a single bond, and the case where the portion where a solid line and a broken line are parallel to each other is a double bond each have the same definition as the definition in General Formula (I) which will be described later. In addition, the following binaphthyl partial structure may have a configuration further condensed with another ring structure. In the structure shown below, * represents a bonding position.

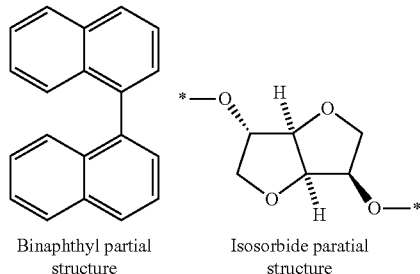

Binaphthyl partial structure

Isosorbide paratial structure

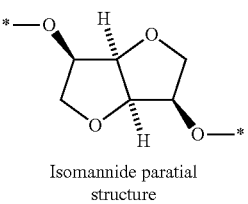

Isomannide paratial structure

The photosensitive chiral agent may have a polymerizable group. The type of the polymerizable group is not particularly limited and is preferably a functional group capable of an addition polymerization reaction, more preferably a polymerizable ethylenic unsaturated group or a cyclic polymerizable group, and still more preferably a (meth)acryloyl group, a vinyl group, a styryl group, or an allyl group.

Examples of the photosensitive chiral agent include compounds represented by General Formula (1).

In addition, the photosensitive chiral agent may be a photochromic chiral agent whose helical twisting power decreases (or increases) upon irradiation with light having a specific wavelength and whose helical twisting power conversely increases (or decreases) upon irradiation with light having a different wavelength than the specific wavelength or upon heating. For example, a chiral agent having a photochromic site such as azobenzene, azomethine, diarylethene, spiropyran, or flugide in a molecule thereof corresponds to the photochromic chiral agent.

Further, as will be described in detail later, the photosensitive chiral agent may be a photosensitive chiral agent whose helical twisting power begins to increase (or decrease) upon irradiation with light and whose helical twisting power decreases (or increases) upon continuous irradiation with light (hereinafter, also referred to as "specific photosensitive chiral agent"). That is, the photosensitive chiral agent may be a photosensitive chiral agent whose helical twisting power increases upon irradiation with light up to a predetermined light irradiation amount and whose helical twisting power decreases upon irradiation with light in a light irradiation amount beyond the predetermined light irradiation amount. For example, a case where $-CR^E=CR^E-$ represented by $Z^1$ in General Formula (2) has a cis structure in General Formula (1) which will be described later corresponds to the specific photosensitive chiral agent.

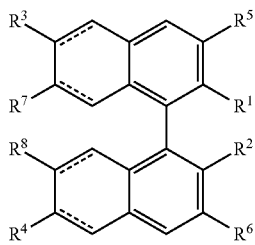

(1)

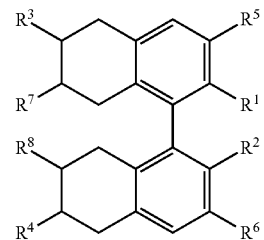

(1-2)

In General Formula (1), the portion where a solid line and a broken line are parallel to each other represents a single bond or a double bond. $R^1$ to $R^8$ each independently represent a hydrogen atom or a monovalent substituent. However, at least one of $R^1, R^2, \ldots,$ or $R^8$ represents a monovalent substituent represented by General Formula (2). $R^1$ and $R^2$ may be bonded to each other to form a ring structure.

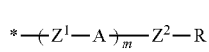

(2)

In General Formula (2), A represents an aromatic or aliphatic hydrocarbon ring group having 5 to 10 ring members, which may have a substituent, or an aromatic or aliphatic heterocyclic group having 5 to 10 ring members, which may have a substituent. $Z^1$ represents $—CR^E{=}CR^E—$. $R^E$ represents a hydrogen atom or a substituent. $Z^2$ represents a single bond or a divalent linking group. m represents an integer of 0 to 5. R represents a hydrogen atom or a monovalent substituent. * represents a bonding position. In General Formula (2), in a case where m is an integer of 2 or more, a plurality of $Z^1$'s and a plurality of A's may be respectively the same or different from each other.

In General Formula (1), the portion where a solid line and a broken line are parallel to each other represents a single bond or a double bond. For example, in a case where the portion where a solid line and a broken line are parallel to each other is a double bond, the compound represented by General Formula (1) corresponds to a compound represented by General Formula (1-1); and in a case where the portion where a solid line and a broken line are parallel to each other is a single bond, the compound represented by General Formula (1) corresponds to a compound represented by General Formula (1-2).

Above all, the compound represented by General Formula (1) is preferably a compound represented by General Formula (1-1).

$R^1$ to $R^8$ in General Formula (1-1) and General Formula (1-2) each have the same definition as $R^1$ to $R^8$ in General Formula (1).

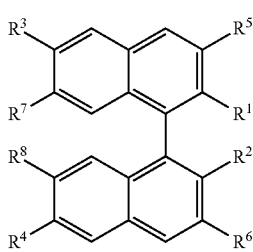

(1-1)

In General Formula (1), $R^1$ to $R^8$ each independently represent a hydrogen atom or a monovalent substituent.

The monovalent substituent represented by $R^1$ to $R^8$ is not particularly limited, and examples thereof include the groups exemplified as the Substituent T. However, at least one of $R^1, R^2, \ldots,$ or $R^8$ represents a monovalent substituent represented by General Formula (2) which will be described later.

In General Formula (2), in a case where m is an integer of 2 or more, a plurality of $Z^1$'s and a plurality of A's may be respectively the same or different from each other.

Above all, in General Formula (1), it is preferable that both $R^1$ and $R^2$ represent a substituent represented by General Formula (2), or both $R^3$ and $R^4$ represent a substituent represented by General Formula (2), or both $R^5$ and $R^6$ represent a substituent represented by General Formula (2), and it is more preferable that both $R^1$ and $R^2$ represent a substituent represented by General Formula (2), or both $R^3$ and $R^4$ represent a substituent represented by General Formula (2).

$R^1$ and $R^2$ may be bonded to each other to form a ring structure.

In a case where $R^1$ and $R^2$ are bonded to each other to form a ring structure, the ring is not particularly limited and may be either an aromatic ring or a non-aromatic ring, among which a non-aromatic ring is preferable.

In a case where $R^1$ and $R^2$ are linked to each other to form a ring, a group to which $R^1$ and $R^2$ are linked to each other is, for example, preferably a *-$L^{S1}$-divalent aromatic hydrocarbon ring group-$L^{S2}$-* or *-$L^{S3}$-divalent aliphatic hydrocarbon group-$L^{S4}$-*. * represents a bonding position to a binaphthyl partial structure in General Formula (1).

The aromatic hydrocarbon ring group is not particularly limited, and examples thereof include the same aromatic hydrocarbon ring group represented by A in General Formula (2) which will be described later. Above all, a benzene ring group is preferable.

The aliphatic hydrocarbon group is not particularly limited, and examples thereof include a linear or branched alkylene group having 1 to 6 carbon atoms.

$L^{S1}$ and $L^{S2}$ each independently represent a single bond or a divalent linking group.

The divalent linking group represented by $L^{S1}$ and $L^{S2}$ is not particularly limited, and examples thereof include a divalent aliphatic hydrocarbon group (which may be linear, branched, or cyclic and preferably has 1 to 20 carbon atoms, and which includes, for example, an alkylene group, an alkenylene group, and an alkynylene group), $—O—$, $—S—$, $—SO_2—$, $—NR^D—$, $—CO—$, $—N{=}N—$, $—CH{=}N—$, and a group formed by combining two or more of these groups (which includes, for example, $—CO—NH—$, $—CO—S—$, $—CH_2O—$, and $—COO—$). Here, $R^D$ represents a hydrogen atom or an alkyl group (preferably having 1 to 10 carbon atoms).

The hydrogen atom in the divalent linking group may be substituted with another substituent such as a halogen atom.

$L^{S1}$ and $L^{S2}$ are each preferably a single bond, a divalent aliphatic hydrocarbon group, —O—, —CO—, —CO—NH—, or —COO—.

$L^{S3}$ and $L^{S4}$ each independently represent a single bond or a divalent linking group.

The divalent linking group represented by $L^{S3}$ and $L^{S4}$ is not particularly limited, and examples thereof include —O—, —S—, —SO$_2$—, —NR$^D$—, —CO—, —N═N—, —CH═N—, and a group formed by combining two or more of these groups (which includes, for example, —CO—NH—, —CO—S—, and —COO—). Here, $R^D$ represents a hydrogen atom or an alkyl group (preferably having 1 to 10 carbon atoms).

The hydrogen atom in the divalent linking group may be substituted with another substituent such as a halogen atom.

$L^{S3}$ and $L^{S4}$ are each preferably a single bond, —O—, —CO—, —CO—NH—, or —COO—.

General Formula (2) will be described below.

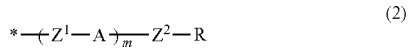

$$*-(Z^1-A)_{\overline{m}}-Z^2-R \quad (2)$$

In General Formula (2), A represents an aromatic or aliphatic hydrocarbon ring group having 5 to 10 ring members, which may have a substituent, or an aromatic or aliphatic heterocyclic group having 5 to 10 ring members, which may have a substituent.

$Z^1$ represents —CR$^E$═CR$^E$—. $R^E$ represents a hydrogen atom or a substituent.

$Z^2$ represents a single bond or a divalent linking group.

m represents an integer of 0 to 5. R represents a hydrogen atom or a monovalent substituent.

In General Formula (2), the aromatic hydrocarbon ring constituting the aromatic hydrocarbon ring group having 5 to 10 ring members represented by A may have either a monocyclic structure or a polycyclic structure. In a case where the aromatic hydrocarbon ring has a polycyclic structure, it is preferable that at least one of the rings contained in the polycyclic structure is a 5- or higher membered ring.

The number of ring members in the aromatic hydrocarbon ring is preferably 6 to 10.

Specific examples of the aromatic hydrocarbon ring include a benzene ring and a naphthalene ring, among which a benzene ring is more preferable.

In General Formula (2), the aliphatic hydrocarbon ring constituting the aliphatic hydrocarbon ring group having 5 to 10 ring members represented by A may have either a monocyclic structure or a polycyclic structure. In a case where the aliphatic hydrocarbon ring has a polycyclic structure, it is preferable that at least one of the rings contained in the polycyclic structure is a 5- or higher membered ring.

The number of ring members in the aliphatic hydrocarbon ring is preferably 5 or 6.

Specific examples of the aliphatic hydrocarbon ring include a cyclopentane ring, a cyclohexane ring, a cycloheptane ring, a cyclooctane ring, a norbornene ring, and an adamantane ring. Of these, a cyclopentane ring or a cyclohexane ring is preferable.

In General Formula (2), the aromatic or aliphatic hydrocarbon ring group having 5 to 10 ring members represented by A may have a substituent. The substituent is not particularly limited, and examples thereof include the groups exemplified as the Substituent T.

In General Formula (2), the aromatic heterocyclic ring constituting the aromatic heterocyclic group having 5 to 10 ring members represented by A may have either a monocyclic structure or a polycyclic structure. In a case where the aromatic heterocyclic ring has a polycyclic structure, it is preferable that at least one of the rings contained in the polycyclic structure is a 5- or higher membered ring.

Examples of the hetero atom contained in the aromatic heterocyclic ring include a nitrogen atom, an oxygen atom, and a sulfur atom. The number of heteroatoms contained in the aromatic heterocyclic ring is, for example, 1 to 3, preferably 1 or 2.

The number of ring members in the aromatic heterocyclic ring is preferably 6.

Specific examples of the aromatic heterocyclic ring include a pyridine ring, a pyridazine ring, a pyrimidine ring, a pyrazine ring, a triazine ring, a thiophene ring, a thiazole ring, an imidazole ring, and a coumarin ring.

In General Formula (2), the aliphatic heterocyclic ring constituting the aliphatic heterocyclic group having 5 to 10 ring members represented by A may have either a monocyclic structure or a polycyclic structure. In a case where the aliphatic heterocyclic ring has a polycyclic structure, it is preferable that at least one of the rings contained in the polycyclic structure is a 5- or higher membered ring.

Examples of the heteroatom contained in the aliphatic heterocyclic ring include a nitrogen atom, an oxygen atom, and a sulfur atom. The number of heteroatoms contained in the aliphatic heterocyclic ring is, for example, 1 to 3, preferably 1 or 2.

The number of ring members of the aliphatic heterocyclic ring is preferably 5 or 6.

Specific examples of the aliphatic heterocyclic ring include an oxolane ring, an oxane ring, a piperidine ring, and a piperazine ring. The aliphatic heterocyclic ring may be one in which —CH$_2$— constituting the ring is substituted with —CO—, and examples thereof include a phthalimide ring.

In General Formula (2), the aromatic or aliphatic heterocyclic group having 5 to 10 ring members represented by A may have a substituent. The substituent is not particularly limited, and examples thereof include the groups exemplified as the Substituent T.

In General Formula (2), $Z^1$ represents —CR$^E$═CR$^E$—. $R^E$ represents a hydrogen atom or a substituent. Examples of the substituent represented by $R^E$ include the groups exemplified as the Substituent T.

In General Formula (2), the divalent linking group represented by $Z^2$ is not particularly limited and examples thereof include a divalent aliphatic hydrocarbon group (which may be linear, branched, or cyclic and preferably has 1 to 20 carbon atoms, and which includes, for example, an alkylene group, an alkenylene group, and an alkynylene group), —O—, —S—, —SO$_2$—, —NR$^D$—, —CO—, —CH═N—, and a group formed by combining two or more of these groups (which includes, for example, —CO—NH—, —CO—S—, —CH$_2$O—, and —COO—). Here, $R^D$ represents a hydrogen atom or an alkyl group (preferably having 1 to 10 carbon atoms).

The hydrogen atom in the divalent linking group may be substituted with another substituent (examples of which include the groups exemplified as the Substituent T) such as a halogen atom.

Above all, the divalent linking group represented by $Z^2$ is preferably —O—, —CO—, —CO—NH—, or —COO—.

In General Formula (2), the divalent linking group —CR$^E$═CR$^E$— represented by $Z^1$ may have a cis structure (cis configuration) or a trans structure (trans configuration).

That is, for example, in a case where $Z^1$ represents —$CR^E$=$CR^E$— and m represents 1 in General Formula (2), the positional relationship between the group represented by "-A-$Z^2$—R" and the bonding position represented by "—*" is not particularly limited; and the group represented by "-A-$Z^2$—R" and the bonding position represented by "—*" may be arranged in a trans configuration at "—$CR^E$=$CR^E$—" (the group represented by "-A-$Z^2$—R" and the bonding position represented by "—*" are located on the opposite side with respect to the double bond) or may be arranged in a cis configuration at "—$CR^E$=$CR^E$—" (the group represented by "-A-$Z^2$—R" and the bonding position represented by "—*" are located on the same side with respect to the double bond).

Above all, the divalent linking group —$CR^E$=$CR^E$— represented by $Z^1$ preferably has a cis structure, from the viewpoint that an initial helical twisting power (helical twisting power before light irradiation) is low and a rate of change of a helical twisting power upon irradiation with light is more excellent.

In a case where the divalent linking group —$CR^E$=$CR^E$— represented by $Z^1$ has a cis structure, the compound represented by General Formula (1) can increase the helical twisting power thereof by changing the cis structure into a trans structure of the —$CR^E$=$CR^E$—, which is a photoisomerizable double bond, by irradiation with light. After changing into a trans structure, in a case where the irradiation amount is further increased, the site of the divalent linking group —$CR^E$=$CR^E$— can be cyclized by a photodimerization reaction ([2+2] photocyclization reaction) to decrease a helical twisting power thereof. The compound represented by General Formula (1) corresponds to a specific photosensitive chiral agent in a case where it has the above structure.

In General Formula (2), m is preferably 1 to 3, more preferably 1 or 2, and still more preferably 1.

In General Formula (2), the monovalent substituent represented by R is not particularly limited, and examples thereof include the groups exemplified as the Substituent T (among which an alkyl group is preferable).

From the viewpoint that an amount of increase in the helical twisting power after exposure to light is more excellent, General Formula (1) is more preferably such that $R^1$ and $R^2$ are bonded to each other to form a ring structure, $R^3$ and $R^4$ each represent a substituent represented by General Formula (2), m represents 1, $Z^1$ represents —$CR^E$=$CR^E$—, and the positional relationship between the group represented by "-A-$Z^2$—R" and the bonding position represented by "—*" is a cis configuration.

In addition, General Formula (1) is preferably a compound represented by General Formula (1-1) from the viewpoint that an amount of increase in the helical twisting power after exposure to light is more excellent.

Only one type of chiral agent may be used or two or more types of chiral agents may be used in the liquid crystal composition.

Above all, the absolute value of the weighted average helical twisting power of the chiral agent in the composition layer formed of the liquid crystal composition is not particularly limited and is preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint that a predetermined composition layer is easily formed.

In a case where two or more chiral agents are contained in the composition layer, the weighted average helical twisting power of the chiral agent is a total value obtained by dividing a product of the helical twisting power of each chiral agent contained in the composition layer and the concentration (% by mass) of each chiral agent contained in the composition layer with respect to the liquid crystal compound by a total concentration (% by mass) of the chiral agents with respect to the liquid crystal compound. The weighted average helical twisting power is represented by Expression (A), for example, in a case where two chiral agents (chiral agent X and chiral agent Y) are used in combination.

Expression (A) Weighted average helical twisting power ($\mu m^{-1}$)=(helical twisting power ($\mu m^{-1}$) of chiral agent X×concentration (% by mass) of chiral agent X with respect to liquid crystal compound+helical twisting power ($\mu m^{-1}$) of chiral agent Y×concentration (% by mass) of chiral agent Y with respect to liquid crystal compound)/(concentration (% by mass) of chiral agent X with respect to liquid crystal compound+concentration (% by mass) of chiral agent Y with respect to liquid crystal compound)

However, in Expression (A), in a case where the helical direction of the chiral agent is dextrorotatory, the helical twisting power has a positive value. In addition, in a case where the helical direction of the chiral agent is levorotatory, the helical twisting power has a negative value. That is, for example, in a case of a chiral agent having a helical twisting power of 10 $\mu m^{-1}$, the helical twisting power is expressed as 10 $\mu m^{-1}$ in a case where the helical direction of the helix induced by the chiral agent is dextrorotatory. On the other hand, in a case where the helical direction of the helix induced by the chiral agent is levorotatory, the helical twisting power is expressed as −10 $\mu m^{-1}$.

In a case where the absolute value of the weighted average helical twisting power of the chiral agent in the composition layer is zero, a composition layer showing a liquid crystal phase selected from the group consisting of a nematic liquid crystal phase and a smectic liquid crystal phase is formed on the substrate.

From the viewpoint that the step X2A and the step YA can be easily carried out, it is preferable that the absolute value of the weighted average helical twisting power of two or more chiral agents contained in the liquid crystal composition increases during the step X2A and increases or decreases during the step YA.

In a case where the absolute value of the weighted average helical twisting power behaves as described above, the cholesteric liquid crystal layer A is formed during the step X2A, and therefore the helical pitch of the cholesteric liquid crystalline phase in the cholesteric liquid crystal layer A can be increased or decreased during the step YA.

From the viewpoint that such behavior is achieved, it is preferable that the liquid crystal composition contains two photosensitive chiral agents, as will be described in detail later.

From the viewpoint that the step X2A and the step YA can be easily carried out, the liquid crystal composition preferably contains a right-handed helix inducing chiral agent whose helical twisting power changes upon irradiation with light (hereinafter, also simply referred to as "photosensitive right-handed helix inducing chiral agent") and a left-handed helix inducing chiral agent whose helical twisting power changes upon irradiation with light (hereinafter, also simply referred to as "photosensitive left-handed helix inducing chiral agent").

The right-handed helix inducing chiral agent is a chiral agent in which the helical direction of the helix induced by the chiral agent is dextrorotatory, and the left-handed helix inducing chiral agent is a chiral agent in which the helical direction of the helix induced by the chiral agent is levorotatory.

Above all, it is preferable that the liquid crystal composition contains a photosensitive right-handed helix inducing chiral agent and a photosensitive left-handed helix inducing chiral agent, and the absolute value of the weighted average helical twisting power of the photosensitive right-handed helix inducing chiral agent and the photosensitive left-handed helix inducing chiral agent in a composition layer formed of the liquid crystal composition is 0.0 to 1.9 $\mu m^{-1}$.

In addition, in the step YA which will be described later, in a case where the treatment of increasing the helical pitch of the cholesteric liquid crystalline phase in the cholesteric liquid crystal layer A obtained by the step X2A is carried out to increase the specific tilt angle, it is preferable that both the photosensitive right-handed helix inducing chiral agent and the photosensitive left-handed helix inducing chiral agent are chiral agents whose helical twisting power decreases upon irradiation with light, or both the photosensitive right-handed helix inducing chiral agent and the photosensitive left-handed helix inducing chiral agent are chiral agents whose helical twisting power increases upon irradiation with light.

Figure 7A:
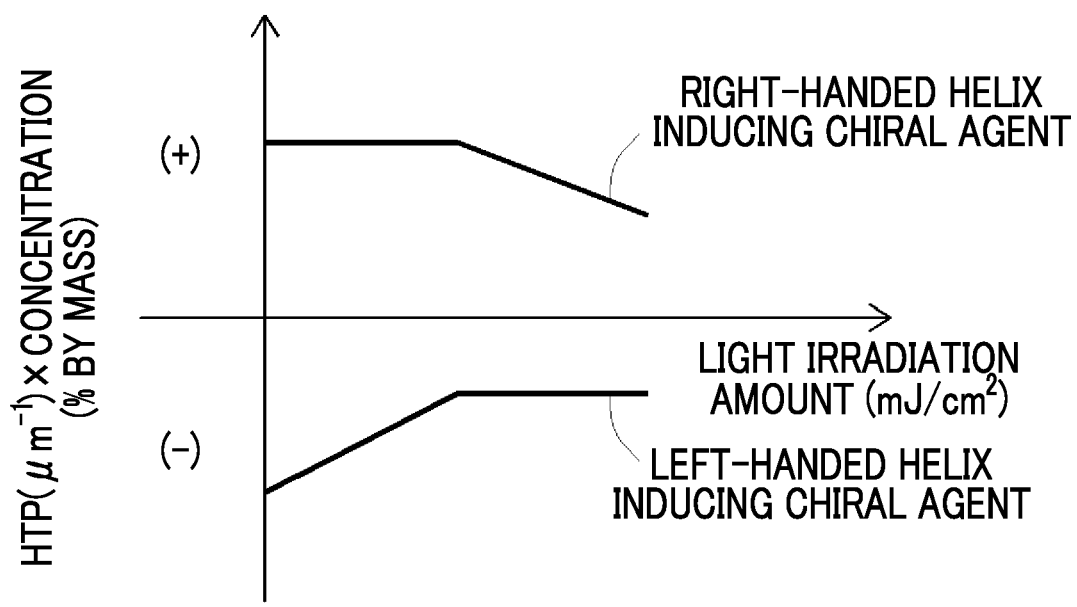
FIG. 7A is a diagram showing an example of a combination of chiral agents, and is a schematic diagram of a graph plotting a relationship between a helical twisting power (HTP) ($\mu m^{-1}$)×a concentration (% by mass) and a light irradiation amount ($mJ/cm^2$) for each chiral agent.
Figure 7B:
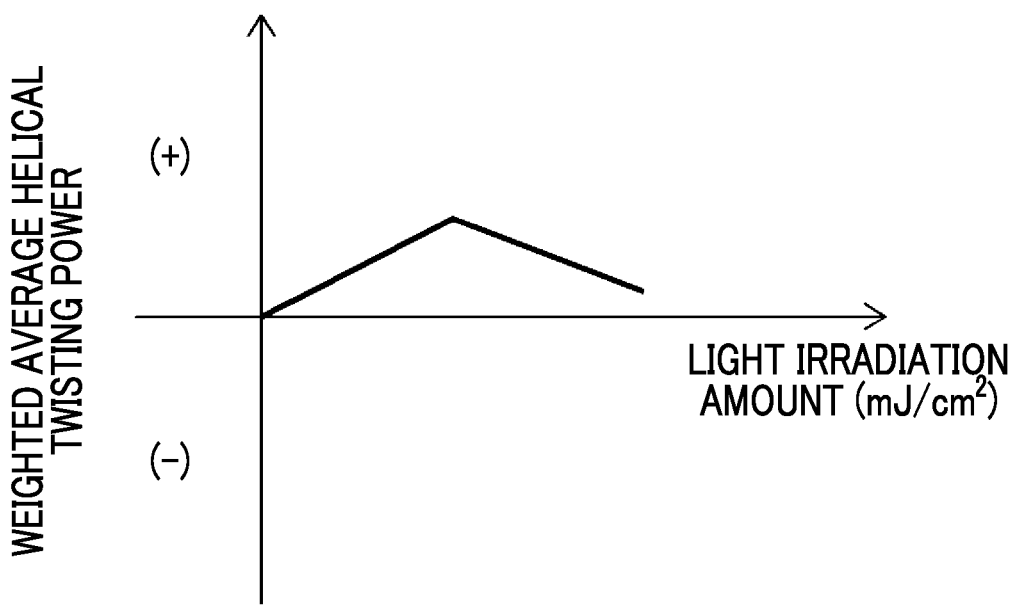
FIG. 7B is a schematic diagram showing a weighted average helical twisting power obtained from the combination of chiral agents shown in FIG. 7A.

As will be described in detail later, for example, in a case where both the photosensitive right-handed helix inducing chiral agent and the photosensitive left-handed helix inducing chiral agent are chiral agents whose helical twisting power decreases upon irradiation with light, upon light irradiation in the step X2A, the helical twisting power of one of the photosensitive right-handed helix inducing chiral agent and the photosensitive left-handed helix inducing chiral agent decreases and the absolute value of the weighted average helical twisting power increases, so that the cholesteric liquid crystal layer A is formed, and upon light irradiation in the step YA, the helical twisting power of the other of the photosensitive right-handed helix inducing chiral agent and the photosensitive left-handed helix inducing chiral agent decreases and the absolute value of the weighted average helical twisting power decreases, so that the helical pitch of the cholesteric liquid crystalline phase of the cholesteric liquid crystal layer A is increased, and therefore the specific tilt angle is increased. As an example of the above aspect, FIG. 7A and FIG. 7B show the weighted average helical twisting power in a case where the photosensitive right-handed helix inducing chiral agent whose helical twisting power decreases upon irradiation with light and the photosensitive left-handed helix inducing chiral agent whose helical twisting power decreases upon irradiation with light are combined.

Figure 8A:
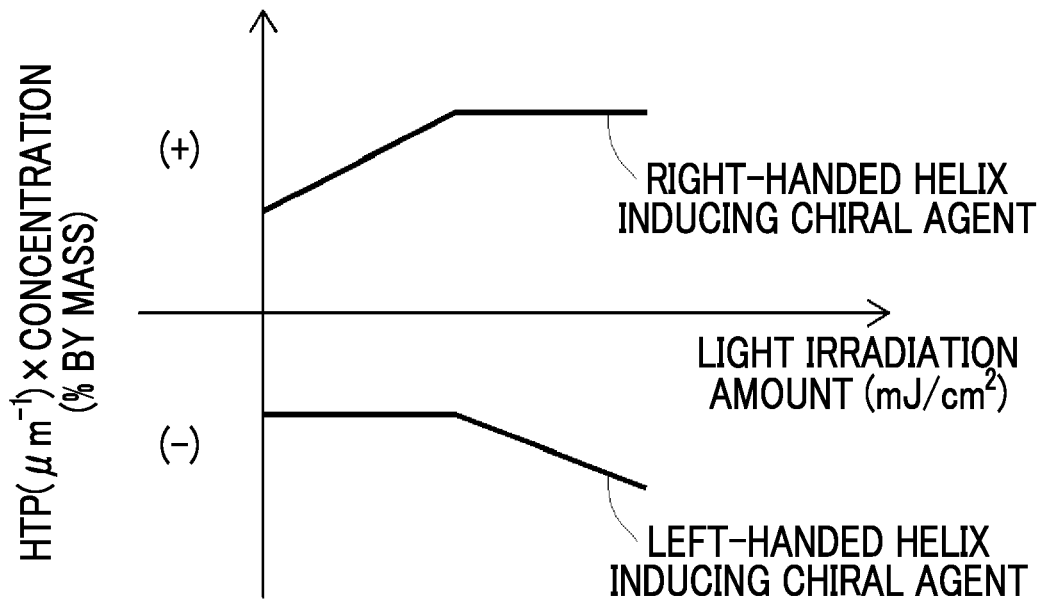
FIG. 8A is a diagram showing an example of a combination of chiral agents, and is a schematic diagram of a graph plotting a relationship between a helical twisting power (HTP) ($\mu m^{-1}$)×a concentration (% by mass) and a light irradiation amount ($mJ/cm^2$) for each chiral agent.
Figure 8B:
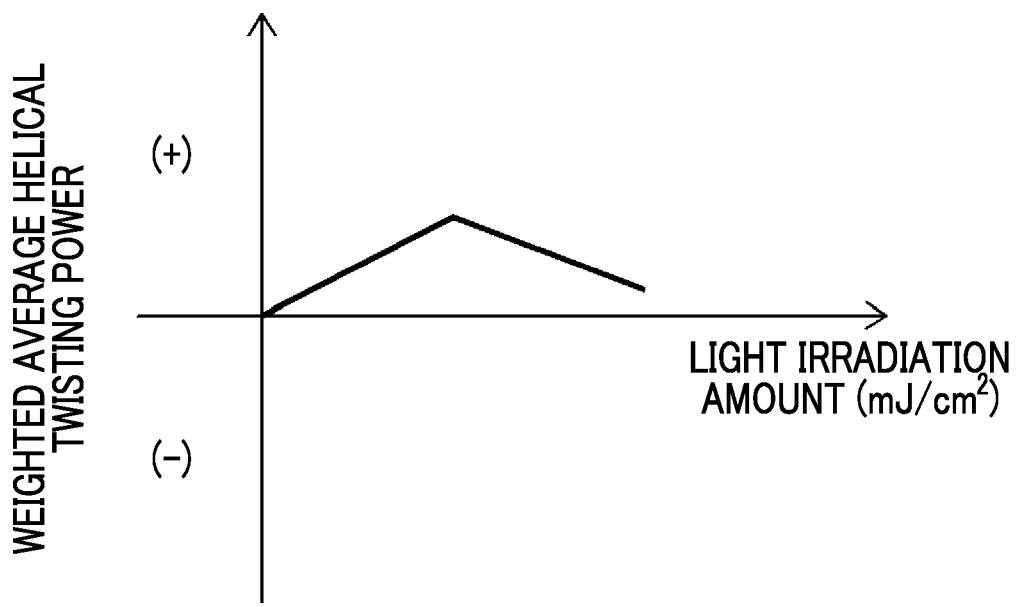
FIG. 8B is a schematic diagram showing a weighted average helical twisting power obtained from the combination of chiral agents shown in FIG. 8A.

In addition, for example, in a case where both the photosensitive right-handed helix inducing chiral agent and the photosensitive left-handed helix inducing chiral agent are chiral agents whose helical twisting power increases upon irradiation with light, upon light irradiation in the step X2A, the helical twisting power of one of the photosensitive right-handed helix inducing chiral agent and the photosensitive left-handed helix inducing chiral agent increases and the absolute value of the weighted average helical twisting power increases, so that the cholesteric liquid crystal layer A is formed, and upon light irradiation in the step YA, the helical twisting power of the other of the photosensitive right-handed helix inducing chiral agent and the photosensitive left-handed helix inducing chiral agent increases and the absolute value of the weighted average helical twisting power decreases, so that the helical pitch of the cholesteric liquid crystalline phase of the cholesteric liquid crystal layer A is increased, and therefore the specific tilt angle is increased. As an example of the above aspect, FIG. 8A and FIG. 8B show the weighted average helical twisting power in a case where the photosensitive right-handed helix inducing chiral agent whose helical twisting power increases upon irradiation with light and the photosensitive left-handed helix inducing chiral agent whose helical twisting power increases upon irradiation with light are combined.

In addition, in the step YA which will be described later, in a case where the treatment of decreasing the helical pitch of the cholesteric liquid crystalline phase in the cholesteric liquid crystal layer A obtained by the step X2A is carried out to decrease the specific tilt angle, it is preferable that one of the photosensitive right-handed helix inducing chiral agent and the photosensitive left-handed helix inducing chiral agent is a chiral agent whose helical twisting power decreases upon irradiation with light, and the other of the photosensitive right-handed helix inducing chiral agent and the photosensitive left-handed helix inducing chiral agent is a chiral agent whose helical twisting power increases upon irradiation with light.

Figure 9A:
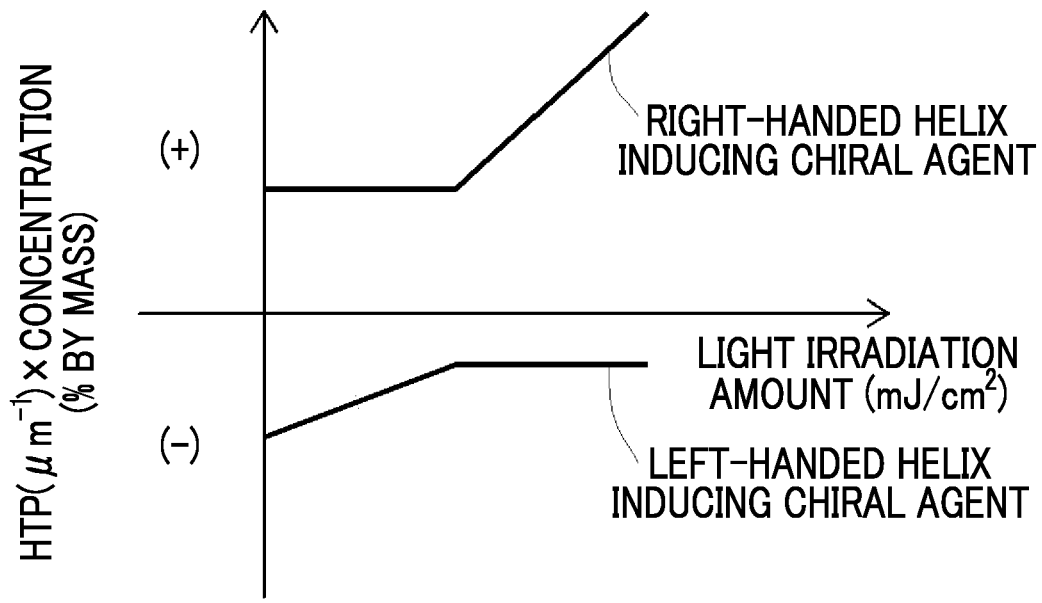
FIG. 9A is a diagram showing an example of a combination of chiral agents, and is a schematic diagram of a graph plotting a relationship between a helical twisting power (HTP) ($\mu m^{-1}$)×a concentration (% by mass) and a light irradiation amount ($mJ/cm^2$) for each chiral agent.
Figure 9B:
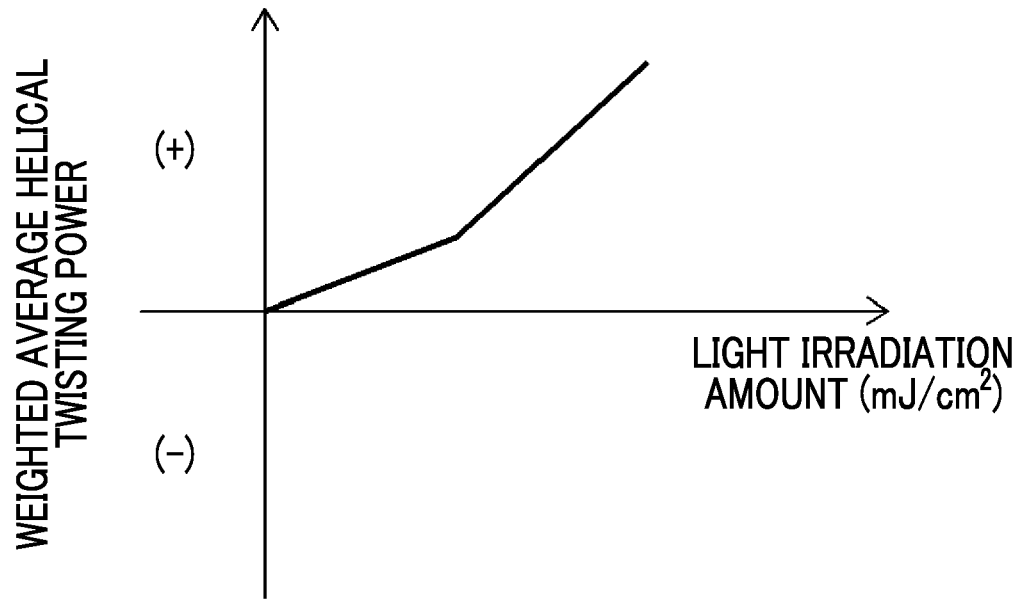
FIG. 9B is a schematic diagram showing a weighted average helical twisting power obtained from the combination of chiral agents shown in FIG. 9A.

As will be described in detail later, for example, in a case where one of the photosensitive right-handed helix inducing chiral agent and the photosensitive left-handed helix inducing chiral agent is a chiral agent whose helical twisting power decreases upon irradiation with light and the other one is a chiral agent whose helical twisting power increases upon irradiation with light, upon light irradiation in the step X2A, the helical twisting power of one of the photosensitive right-handed helix inducing chiral agent and the photosensitive left-handed helix inducing chiral agent decreases and the absolute value of the weighted average helical twisting power increases, so that the cholesteric liquid crystal layer A is formed, and upon light irradiation in the step YA, the helical twisting power of the other of the photosensitive right-handed helix inducing chiral agent and the photosensitive left-handed helix inducing chiral agent increases and the absolute value of the weighted average helical twisting power further increases, so that the helical pitch of the cholesteric liquid crystalline phase of the cholesteric liquid crystal layer A is decreased, and therefore the specific tilt angle is decreased. As an example of the above aspect, FIG. 9A and FIG. 9B show the weighted average helical twisting power in a case where the photosensitive right-handed helix inducing chiral agent whose helical twisting power increases upon irradiation with light and the photosensitive left-handed helix inducing chiral agent whose helical twisting power decreases upon irradiation with light are combined.

In addition, from the viewpoint that the step X2A and the step YA can be easily carried out, it is preferable that the photosensitive right-handed helix inducing chiral agent and the photosensitive left-handed helix inducing chiral agent are each exposed to light having different wavelengths. All of the examples of the combination of the photosensitive right-handed helix inducing chiral agent and the photosensitive left-handed helix inducing chiral agent shown in FIG. 7A, FIG. 8A, and FIG. 9A correspond to the aspect in which the photosensitive right-handed helix inducing chiral agent and the photosensitive left-handed helix inducing chiral agent are each exposed to light having different wavelengths.

In a case of the above aspect, irradiation with light having different wavelengths can be applied in a case where the light irradiation is carried out in the step X2A and the step YA which will be described later. That is, it is possible to configure an aspect in which the wavelength of the light for the light irradiation treatment in the step X2A and the wavelength of the light for the light irradiation treatment in the step YA are different from each other.

The aspect in which the liquid crystal composition contains two photosensitive chiral agents has been described above, but the aspect is not limited as long as the step X2 and the step YA can be carried out.

For example, an aspect in which the specific photosensitive chiral agent or the photochromic chiral agent described above is used can be mentioned.

More specifically, the liquid crystal composition may have an aspect containing a specific photosensitive chiral agent or a photochromic chiral agent in which the helical direction of the induced helix is one of dextrorotatory and levorotatory, and a chiral agent in which the helical direction of the induced helix is the other of dextrorotatory and levorotatory and whose helical twisting power does not change upon irradiation with light (hereinafter, also simply referred to as "non-photosensitive chiral agent").

That is, the liquid crystal composition may have an aspect containing a specific photosensitive chiral agent or a photochromic chiral agent in which the helical direction of the induced helix is one of dextrorotatory and levorotatory and a non-photosensitive chiral agent in which the helical direction of the induced helix is the other of dextrorotatory and levorotatory, in which the absolute value of the weighted average helical twisting power of the specific photosensitive chiral agent or the photochromic chiral agent and the non-photosensitive chiral agent in the liquid crystal composition is 0.0 to 1.9 µm$^{-1}$ (preferably 0.0 to 1.5 µm$^{-1}$).

In a case of the above aspect, upon light irradiation in the step X2A, the helical twisting power of the specific photosensitive chiral agent or the photochromic chiral agent increases (or decreases), and the absolute value of the weighted average helical twisting power increases, so that the cholesteric liquid crystal layer A is formed, and upon light irradiation in the step YA, the helical twisting power of the specific photosensitive chiral agent or the photochromic chiral agent conversely decreases (or increases), and the absolute value of the weighted average helical twisting power decreases, so that the helical pitch of the cholesteric liquid crystalline phase of the cholesteric liquid crystal layer A increases, and therefore the specific tilt angle increases.

In a case where the specific photosensitive chiral agent is used, it is possible to carry out light irradiation with the same wavelength as the wavelength of the light for the light irradiation treatment in the step X2A and the wavelength of the light for the light irradiation treatment in the step Y.

Figure 10A:
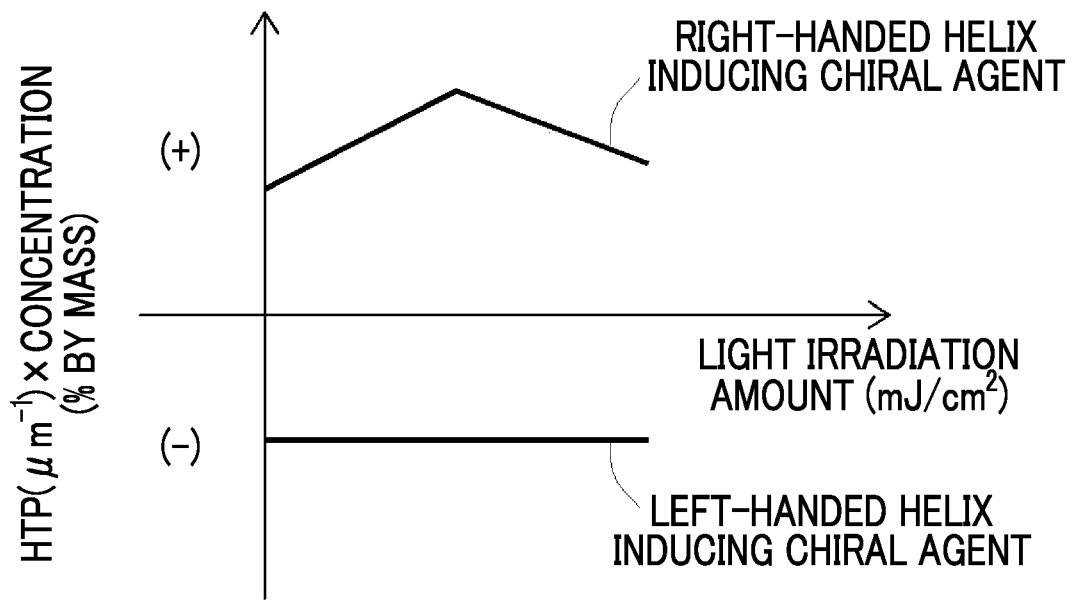
FIG. 10A is a diagram showing an example of a combination of chiral agents, and is a schematic diagram of a graph plotting a relationship between a helical twisting power (HTP) ($\mu m^{-1}$)×a concentration (% by mass) and a light irradiation amount ($mJ/cm^2$) for each chiral agent.
Figure 10B:
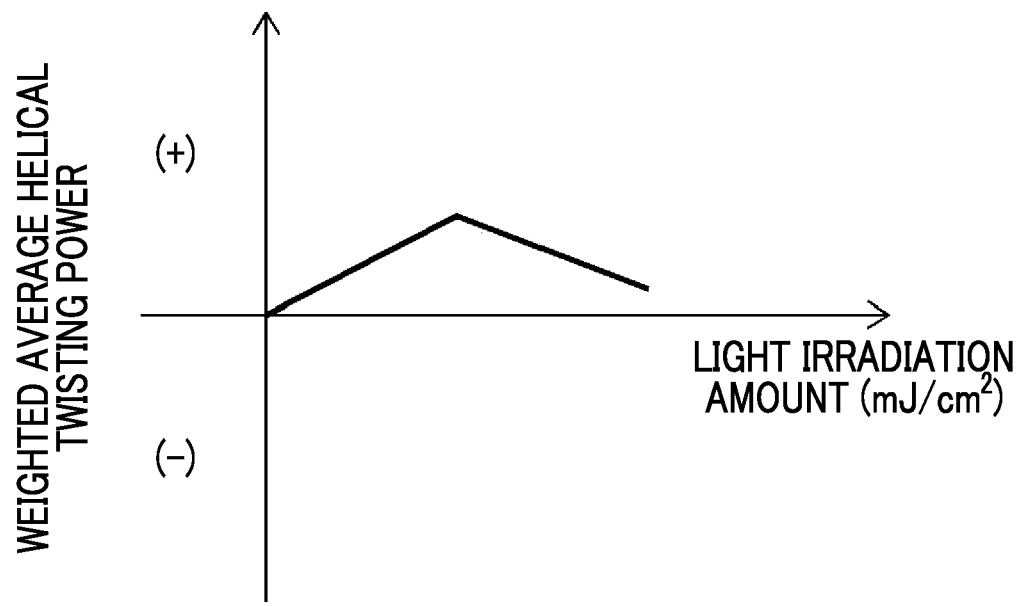
FIG. 10B is a schematic diagram showing a weighted average helical twisting power obtained from the combination of chiral agents shown in FIG. 10A.

As an example of the above aspect, FIG. 10A and FIG. 10B shows the weighted average helical twisting power in a case where the specific photosensitive chiral agent or the photochromic chiral agent in which the helical direction of the induced helix is dextrorotatory and the non-photosensitive chiral agent in which the helical direction of the induced helix is levorotatory are combined.

Although the combination of the specific photosensitive chiral agent or the photochromic chiral agent and the non-photosensitive chiral agent has been described above, a combination of the specific photosensitive chiral agent or the photochromic chiral agent and the photosensitive chiral agent may be used.

In a case of the combination of the specific photosensitive chiral agent and the photosensitive chiral agent, preferred is an aspect in which a specific photosensitive chiral agent in which the helical direction of the induced helix is one of dextrorotatory and levorotatory, and a chiral agent in which the helical direction of the induced helix is the other of dextrorotatory and levorotatory and whose helical twisting power decreases upon irradiation with light are combined.

Figure 11A:
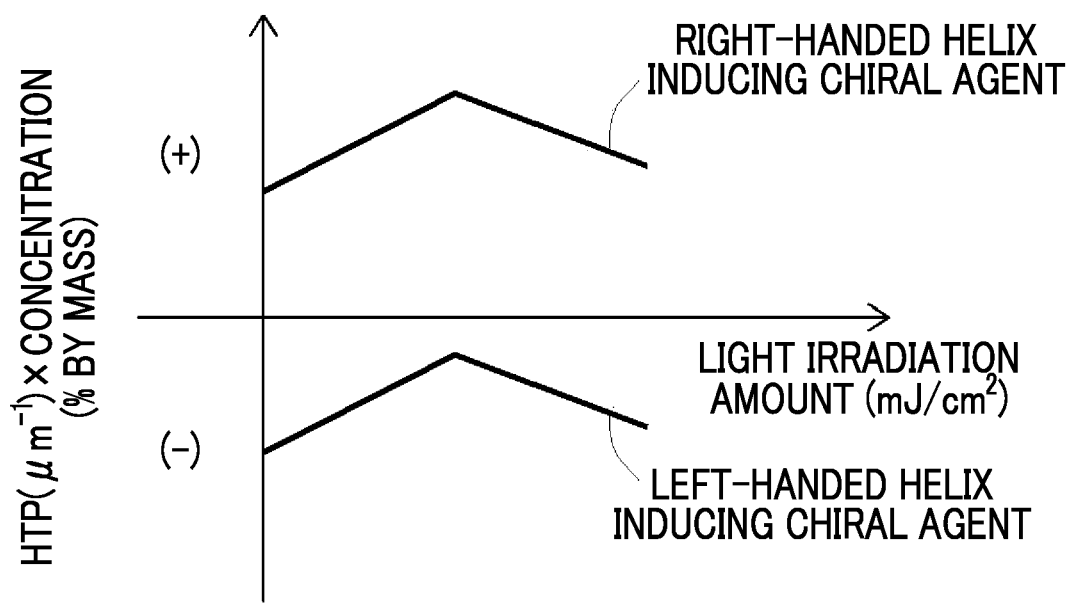
FIG. 11A is a diagram showing an example of a combination of chiral agents, and is a schematic diagram of a graph plotting a relationship between a helical twisting power (HTP) ($\mu m^{-1}$)×a concentration (% by mass) and a light irradiation amount ($mJ/cm^2$) for each chiral agent.
Figure 11B:
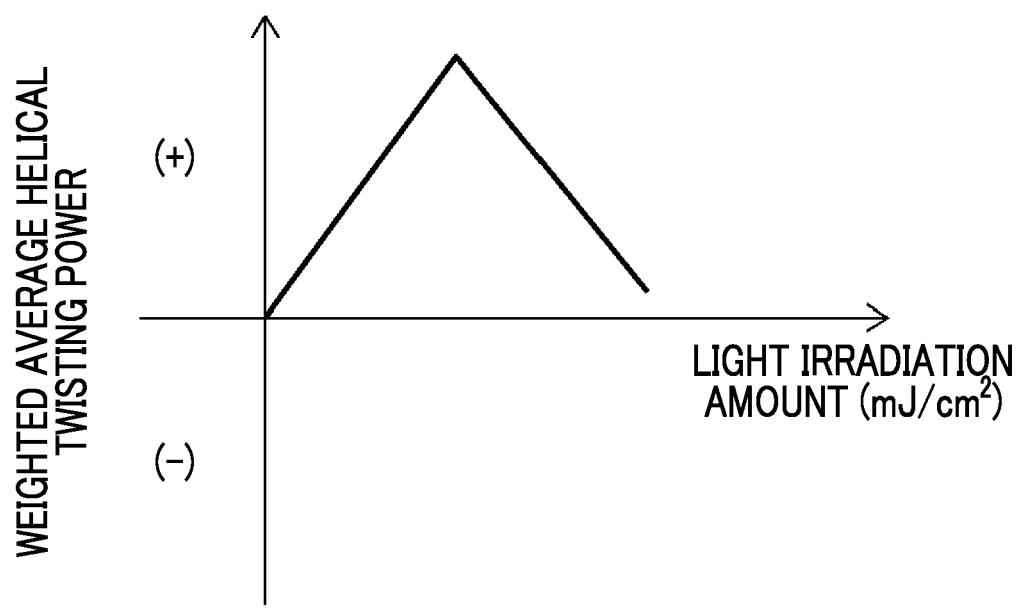
FIG. 11B is a schematic diagram showing a weighted average helical twisting power obtained from the combination of chiral agents shown in FIG. 11A.

In a case of the combination of the photochromic chiral agent and the photosensitive chiral agent, preferred is an aspect in which a photochromic chiral agent in which the helical direction of the induced helix is one of dextrorotatory and levorotatory, and a chiral agent in which the helical direction of the induced helix is the other of dextrorotatory and levorotatory and which shows a helical twisting power change opposite to that of the photochromic chiral agent are combined. That is, in a case where the photosensitive chiral agent is exposed to light in the step X2A, it is preferable to use a photosensitive chiral agent that shows a change opposite to the helical twisting power change shown by the photochromic chiral agent in the step X2A. In a case where the photosensitive chiral agent is exposed to light in the step YA, it is preferable to use a photosensitive chiral agent that shows a change opposite to the helical twisting power change shown by the photochromic chiral agent in the step YA. FIG. 11A and FIG. 11B show an example of the combination of a photochromic chiral agent and a photosensitive chiral agent and the weighted average helical twisting power thereof.

Figure 12A:
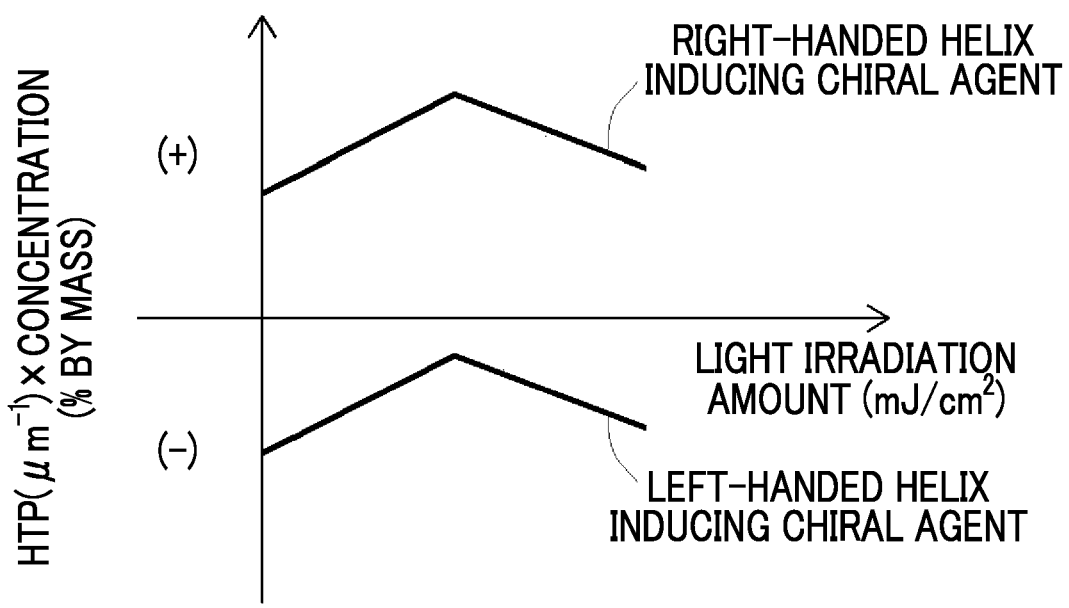
FIG. 12A is a diagram showing an example of a combination of chiral agents, and is a schematic diagram of a graph plotting a relationship between a helical twisting power (HTP) ($\mu m^{-1}$)×a concentration (% by mass) and a light irradiation amount ($mJ/cm^2$) for each chiral agent.
Figure 12B:
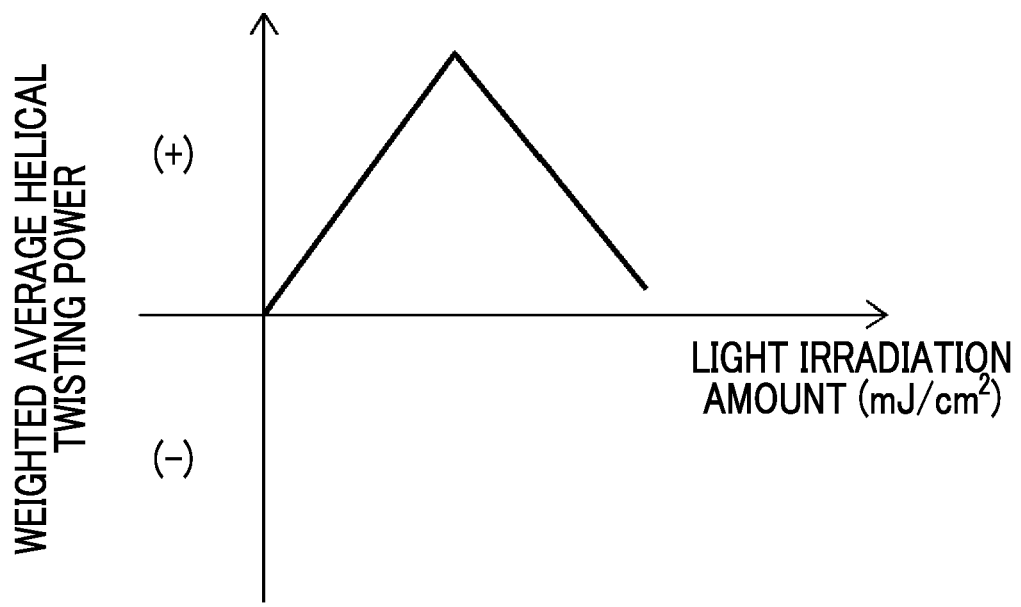
FIG. 12B is a schematic diagram showing a weighted average helical twisting power obtained from the combination of chiral agents shown in FIG. 12A.

In addition, a specific photosensitive chiral agent or a photochromic chiral agent that induces a right-handed helix and a specific photosensitive chiral agent or a photochromic chiral agent that induces a left-handed helix may be combined. In this case, it is preferable that, in the step X2A, the helical twisting power of one chiral agent increases and the helical twisting power of the other chiral agent decreases, and in the step YA, the helical twisting power of one chiral agent decreases and the helical twisting power of the other chiral agent increases. FIG. 12A and FIG. 12B show an example of the combination of a photochromic chiral agent and a specific photosensitive chiral agent and the weighted average helical twisting power thereof.

The helical twisting power (HTP) of the chiral agent is a factor indicating the helical alignment ability expressed by Expression (B).

$$HTP = 1/\text{length (unit: } \mu\text{m) of helical} \quad \text{Expression (B)}$$
$$\text{pitch} \times \text{concentration (\% by mass) of chiral agent}$$
$$\text{with respect to liquid crystal compound) } [\mu\text{m}^{-1}]$$

The length of the helical pitch refers to a length of pitch P (=the period of the helix) of a helical structure of a cholesteric liquid crystalline phase and can be measured by the method described in Handbook of Liquid Crystals (published by Maruzen Co., Ltd.), p. 196.

In addition, the helical twisting power (HTP) of the chiral agent is also represented as Expression (C).

$$HTP = \quad \text{Expression (C)}$$
$$\text{(average refractive index of liquid crystal compound)/}$$
$$\text{\{concentration (\% by mass) of chiral agent}$$

-continued with respect to liquid crystal compound) ×

(central reflection wavelength (nm))} [µm⁻¹]

The total content of the chiral agent in the liquid crystal composition (the total content of all chiral agents in the liquid crystal composition) is preferably 2.0% by mass or more and more preferably 3.0% by mass or more with respect to the total mass of the liquid crystal compound. In addition, from the viewpoint of suppressing the haze of the cholesteric liquid crystal layer, the upper limit of the total content of the chiral agent in the liquid crystal composition is preferably 18.0% by mass or less, more preferably 15.0% by mass or less, and still more preferably 12.0% by mass or less with respect to the total mass of the liquid crystal compound.

In a case where two or more chiral agents are contained in the liquid crystal composition, it is preferable that the concentration of the chiral agent is adjusted such that the absolute value of the weighted average helical twisting power is within a predetermined range (0.0 to 1.5 µm⁻¹) as described above.

The liquid crystal composition may contain components other than the liquid crystal compound and the chiral agent described above.

•• Polymerization Initiator

The liquid crystal composition may contain a polymerization initiator. In particular, in a case where the liquid crystal compound has a polymerizable group, the liquid crystal composition preferably contains a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the liquid crystal composition (the total amount of polymerization initiators in a case where a plurality of polymerization initiators are contained) is not particularly limited, and is preferably 0.1% to 20% by mass and more preferably 1.0% to 8.0% by mass with respect to the total mass of the liquid crystal compound.

•• Surfactant

The liquid crystal composition preferably contains a surfactant that can be unevenly distributed on the substrate-side surface of the composition layer and/or the surface of the composition layer opposite to the substrate.

The surfactant is not particularly limited, and examples thereof include a fluorine-based surfactant, a boronic acid compound, and an ionic surfactant. Above all, the liquid crystal composition preferably contains a fluorine-based surfactant.

The surfactant may be used alone or in combination of two or more thereof.

The content of the surfactant in the liquid crystal composition (the total amount of surfactants in a case where a plurality of surfactants are contained) is not particularly limited, and is preferably 0.01% to 10% by mass, more preferably 0.01% to 5.0% by mass, and still more preferably 0.01% to 2.0% by mass with respect to the total mass of the liquid crystal compound.

•• Solvent

The liquid crystal composition may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate.

The solvent may be used alone or in combination of two or more thereof.

•• Other Additives

The liquid crystal composition may contain other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a dispersant, and a coloring material such as a dye or a pigment.

•• Suitable Aspect of Liquid Crystal Composition

In the liquid crystal composition, it is preferable that one or more of the compounds constituting the liquid crystal composition are compounds having a plurality of polymerizable groups (polyfunctional compounds). Further, the total content of the compounds having a plurality of polymerizable groups in the liquid crystal composition is preferably 80% by mass or more with respect to the total solid content in the liquid crystal composition. The solid content is a component that forms the cholesteric liquid crystal layer and does not contain a solvent.

Making 80% by mass or more of the total solid content in the liquid crystal composition to be a compound having a plurality of polymerizable groups is preferable from the viewpoint that the structure of the cholesteric liquid crystalline phase can be firmly fixed to impart the durability.

The compound having a plurality of polymerizable groups is a compound having two or more immobilizable groups in one molecule. In the present invention, the polyfunctional compound contained in the liquid crystal composition may or may not have liquid crystallinity.

•• Substrate

The substrate is a plate that supports a composition layer formed from the liquid crystal composition. Above all, a transparent substrate is preferable. The transparent substrate is intended to refer to a substrate having a visible light transmittance of 60% or more and preferably has a visible light transmittance of 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited and is preferably 10 to 200 μm and more preferably 20 to 100 μm from the viewpoint of thinning and handleability.

The thickness is intended to refer to an average thickness, and is obtained by measuring thicknesses at any five places of the substrate and arithmetically averaging the measured values. Regarding the method of measuring the thickness, the same applies to the thickness of the cholesteric liquid crystal layer which will be described later.

In addition, the substrate preferably has a rubbing alignment film having a pretilt angle, an alignment film containing a uniaxially aligned or hybrid-aligned liquid crystal compound, or a liquid crystal layer formed of a disk-like compound, on the surface of the substrate. By using the above substrate, the molecular axis derived from the liquid crystal compound is likely to be aligned so as to be tilted with respect to the normal line of the main surface of the composition layer, in a case where the cholesteric liquid crystalline phase in the step X2A is formed.

• Procedure of Step X1A

The step X1A preferably includes the following step X1A-1 and the following step X1A-2.

Step X1A-1: a step of bringing a liquid crystal composition into contact with a substrate to form a coating film on the substrate.

Step X1A-2: a step of heating the coating film to form a composition layer satisfying the condition 4, the condition 5, or the condition 6

In the step X1A-1, the above-mentioned liquid crystal composition is first applied onto a substrate. The coating method is not particularly limited, and examples thereof include a wire bar coating method, an extrusion coating method, a direct gravure coating method, a reverse gravure coating method, and a die-coating method. The substrate may be subjected to a known rubbing treatment prior to application of the liquid crystal composition.

If necessary, a treatment of drying the coating film applied onto the substrate may be carried out after application of the liquid crystal composition. The solvent can be removed from the coating film by carrying out the drying treatment.

The thickness of the coating film is not particularly limited and is preferably 0.1 to 20 μm, more preferably 0.2 to 15 μm, and still more preferably 0.5 to 10 μm.

The liquid crystal phase transition temperature of the liquid crystal composition is preferably in a range of 10° C. to 250° C. and more preferably in a range of 10° C. to 150° C., from the viewpoint of manufacturing suitability.

As to preferred heating conditions in the step X1A-2, it is preferable to heat the composition layer at 40° C. to 100° C. (preferably 60° C. to 100° C.) for 0.5 to 5 minutes (preferably 0.5 to 2 minutes).

In a case where the composition layer is heated, it is preferable not to heat the composition layer to a temperature at which the liquid crystal compound becomes an isotropic phase (Iso). In a case where the composition layer is heated above the temperature at which the liquid crystal compound becomes an isotropic phase, the number of defects in the tilt-aligned liquid crystal phase or the hybrid-aligned liquid crystal phase increases, which is not preferable.

A composition layer satisfying the condition 4, the condition 5, or the condition 6 can be obtained by the step X1A-2.

In order to align the liquid crystal compound in a tilt alignment (see FIG. 6), hybrid alignment, or vertical alignment, it is effective to give a pretilt angle to an interface, and specifically, the following method can be mentioned.

(1) A substrate on which a rubbing alignment film having a pretilt angle or an alignment film containing a uniaxially aligned or hybrid-aligned liquid crystal compound is disposed on the surface thereof is used.

(2) A surfactant (for example, an ionic surfactant or a fluorine-based surfactant) that is unevenly distributed on the air interface and/or the substrate interface and is capable of controlling the alignment of the liquid crystal compound is added to the liquid crystal composition.

(3) A liquid crystal compound having a large pretilt angle at the interface is added to the liquid crystal composition.

As described above, the absolute value of the weighted average helical twisting power of the chiral agent in the composition layer formed of the liquid crystal composition is preferably 0.0 to 1.9 $\mu m^{-1}$. A further suitable range of the absolute value of the weighted average helical twisting power is as described above.

The alignment of the liquid crystal compound in the composition layer is preferably a nematic alignment (preferably a nematic hybrid alignment) or a smectic alignment.

• Step X2A

The step X2A is a step of irradiating the composition layer with light to cholesterically align a liquid crystal compound in the composition layer to form a cholesteric liquid crystal layer A.

The composition layer contains a photosensitive chiral agent whose helical twisting power changes upon irradiation with light. Therefore, the helical twisting power of the photosensitive chiral agent can be changed to cholesterically align the liquid crystal compound by irradiating the composition layer with light to which the photosensitive chiral agent is exposed.

Hereinafter, a case where a chiral agent A and a chiral agent B having the following characteristics are contained in the composition layer will be described as an example.

Figure 13:
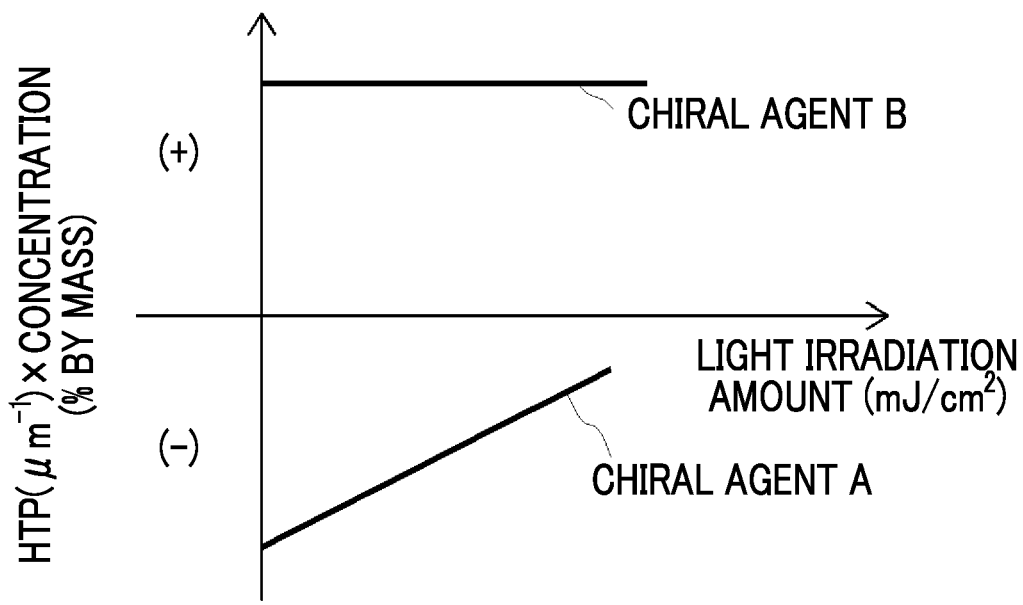
FIG. 13 is a schematic diagram of a graph plotting a relationship between a helical twisting power (HTP) ($\mu m^{-1}$)×a concentration (% by mass) and a light irradiation amount ($mJ/cm^2$) for each of chiral agent A and chiral agent B.

As shown in FIG. 13, the chiral agent A is a chiral agent that corresponds to a photosensitive chiral agent, has a left-handed (−) helical twisting power, and exhibits a decrease in the helical twisting power upon irradiation with light.

In addition, as shown in FIG. 13, the chiral agent B is a chiral agent which has a right-handed (+) helical twisting power opposite to that of the chiral agent A, and exhibits no change in the helical twisting power upon irradiation with light. Here, the "helical twisting power ($\mu m^{-1}$) of chiral agent A×concentration (% by mass) of chiral agent A" and the "helical twisting power ($\mu m^{-1}$) of chiral agent B×concentration (% by mass) of chiral agent B" at the time of no light irradiation are equal. In addition, in FIG. 13, with regard to the "helical twisting power ($\mu m^{-1}$) of chiral agent×concentration (% by mass) of chiral agent" on the vertical axis, the helical twisting power increases as the value deviates from zero.

Figure 14:
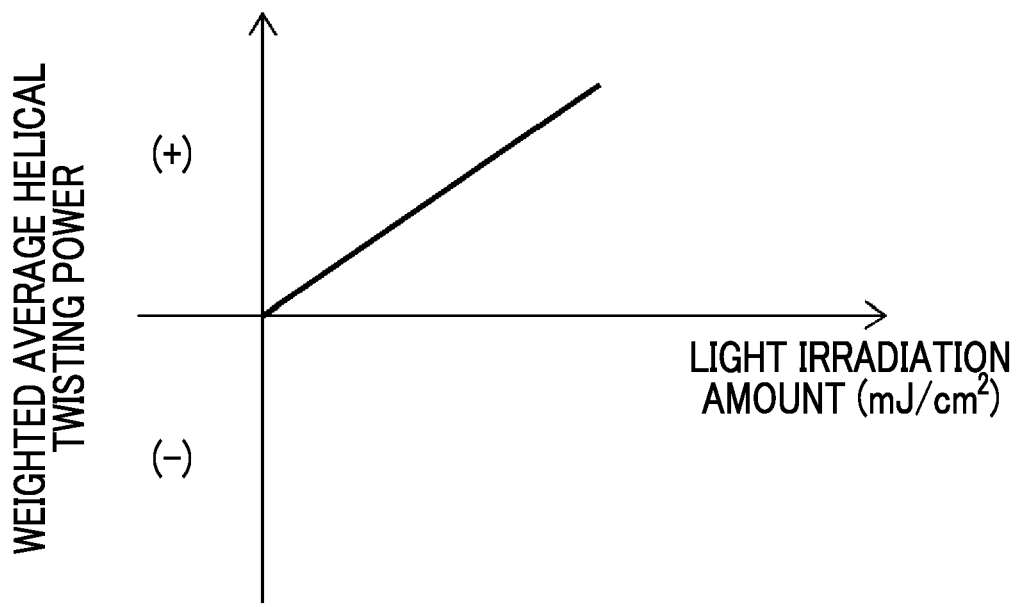
FIG. 14 is a schematic diagram of a graph plotting the relationship between a weighted average helical twisting power ($\mu m^{-1}$) and a light irradiation amount ($mJ/cm^2$) in a system in which chiral agent A and chiral agent B are used in combination.

In a case where the composition layer contains the chiral agent A and the chiral agent B, the helical twisting power that induces the helix of the liquid crystal compound corresponds to the weighted average helical twisting power of the chiral agent A and the chiral agent B. As a result, in a system in which the chiral agent A and the chiral agent B are used in combination, as shown in FIG. 14, it is considered that a larger irradiation amount leads to an increase in helical twisting power that induces the helix of the liquid crystal compound in the direction (+) of the helix induced by the chiral agent B (which corresponds to chiral agent Y).

In the light irradiation treatment of the step X2A, the absolute value of the weighted average helical twisting power of the chiral agent in the composition layer is not particularly limited as long as the liquid crystal compound can be cholesterically aligned. For example, it is preferably 10.0 $\mu m^{-1}$ or more, more preferably 10.0 to 200.0 $\mu m^{-1}$, and still more preferably 20.0 to 200.0 $\mu m^{-1}$.

That is, in the step X1A, the helical twisting power of the chiral agent in the composition layer is offset to almost zero, and therefore the liquid crystal compound in the composition layer can be aligned into tilt alignment (see FIG. 6), hybrid alignment, or vertical alignment. Next, the light irradiation treatment in the step X2A is used as a trigger to change the helical twisting power of the chiral agent such that the weighted average helical twisting power of the chiral agent in the composition layer is increased either in the right-handed direction (+) or in the left-handed direction (−), whereby the cholesteric liquid crystal layer A can be obtained.

The case where a chiral agent whose helical twisting power does not change upon irradiation with light is used as the chiral agent B has been described above, but in a case of using a chiral agent whose helical twisting power changes upon irradiation with light, which is different from the chiral agent A, the cholesteric liquid crystal layer A is formed in the same manner as described above even upon irradiation with light having a wavelength to which the chiral agent A is exposed and the chiral agent B is not exposed.

In addition, as the combination of the chiral agents contained in the liquid crystal composition, there are a combination of the specific photosensitive chiral agent or the photochromic chiral agent and the non-photosensitive chiral agent, a combination of the specific photosensitive chiral agent or the photochromic chiral agent and the photosensitive chiral agent, and a combination of the specific photosensitive chiral agent or the photochromic chiral agent and the specific photosensitive chiral agent or the photochromic chiral agent, as described above. The absolute value of the weighted average helical twisting power of the chiral agent can be increased in the same manner as described above to form the cholesteric liquid crystal layer A by decreasing the absolute value of the weighted average helical twisting power (preferably 0.0 to 1.9 $\mu m^{-1}$) of the chiral agent in the composition layer formed from the liquid crystal composition, and carrying out the light irradiation such that the helical twisting power of only one chiral agent changes as described above.

The irradiation intensity of the light irradiation in the step X2A is not particularly limited and can be appropriately determined based on the helical twisting power of the photosensitive chiral agent.

In general, the irradiation intensity of light irradiation in the step X2A is preferably about 0.1 to 200 mW/cm². In addition, the time for light irradiation is not particularly limited and may be appropriately determined from the viewpoint of both sufficient strength and productivity of the obtained layer.

In addition, the temperature of the composition layer at the time of light irradiation is, for example, 0° C. to 100° C. and preferably 10° C. to 60° C.

The light used for the light irradiation is not particularly limited as long as it is an actinic ray or radiation that changes the helical twisting power of the photosensitive chiral agent, which refers to, for example, an emission line spectrum of a mercury lamp, far ultraviolet rays represented by an excimer laser, extreme ultraviolet rays (EUV light), X-rays, ultraviolet rays, and electron beams (EB). Among them, an ultraviolet ray is preferable.

⊇ Step YA

The step YA is a step of irradiating the cholesteric liquid crystal layer A obtained by the step X2A with light to carry out a treatment of increasing or decreasing a helical pitch of a cholesteric liquid crystalline phase in the cholesteric liquid crystal layer A to increase or decrease a specific tilt angle.

As described above, increasing the helical pitch increases the specific tilt angle, and decreasing the helical pitch decreases the specific tilt angle.

The increase and decrease of the helical pitch can be achieved by the photosensitive chiral agent contained in the liquid crystal composition.

Hereinafter, an example of a case in which the helical pitch is increased will be described. Here, a case where the liquid crystal composition contains a photosensitive right-handed helix inducing chiral agent whose helical twisting power decreases upon irradiation with light (hereinafter, also simply referred to as "specific right-handed chiral agent D"), and a photosensitive left-handed helix inducing chiral agent whose helical twisting power decreases upon irradiation with light (hereinafter, also simply referred to as "specific left-handed chiral agent D") will be described as an example.

It is assumed that the specific right-handed chiral agent D and the specific left-handed chiral agent D are each exposed to light having different wavelengths.

In a case where the liquid crystal composition contains the specific right-handed chiral agent D and the specific left-handed chiral agent D, first, upon irradiation of the composition layer with light to which only one of the specific right-handed chiral agent D and the specific left-handed chiral agent D is exposed, in the above-mentioned step X2A, the helical twisting power of the exposed chiral agent decreases, the absolute value of the weighted average helical twisting power increases (see FIG. 7A and FIG. 7B), and therefore the cholesteric liquid crystal layer A is formed.

Next, upon irradiation of the cholesteric liquid crystal layer A with light to which the other of the specific right-handed chiral agent D and the specific left-handed chiral agent D is exposed, the helical twisting power of the exposed chiral agent decreases, and the absolute value of the weighted average helical twisting power decreases (see FIG. 7A and FIG. 7B). Therefore, the helical pitch of the cholesteric liquid crystalline phase of the cholesteric liquid crystal layer A is increased, and the specific tilt angle is increased.

Next, an example of a case in which the helical pitch is decreased will be described. Here, a case where the liquid crystal composition contains a photosensitive right-handed helix inducing chiral agent whose helical twisting power decreases upon irradiation with light (hereinafter, also simply referred to as "specific right-handed chiral agent D"), and a photosensitive left-handed helix inducing chiral agent whose helical twisting power increases upon irradiation with light (hereinafter, also simply referred to as "specific left-handed chiral agent I") will be described as an example.

It is assumed that the specific right-handed chiral agent D and the specific left-handed chiral agent I are each exposed to light having different wavelengths.

In a case where the liquid crystal composition contains the specific right-handed chiral agent D and the specific left-handed chiral agent I, first, upon irradiation of the composition layer with light to which only one of the specific right-handed chiral agent D and the specific left-handed chiral agent I is exposed, in the above-mentioned step X2A, the helical twisting power of the exposed chiral agent changes, the absolute value of the weighted average helical twisting power increases (see FIG. 9A and FIG. 9B), and therefore the cholesteric liquid crystal layer A is formed.

Next, upon irradiation of the cholesteric liquid crystal layer A with light to which the other of the specific right-handed chiral agent D and the specific left-handed chiral agent I is exposed, the helical twisting power of the exposed chiral agent changes, and the absolute value of the weighted average helical twisting power further increases (see FIG. 9A and FIG. 9B). Therefore, the helical pitch of the cholesteric liquid crystalline phase of the cholesteric liquid crystal layer A is decreased, and the specific tilt angle is decreased.

In addition, as described above, as the combination of the chiral agents contained in the liquid crystal composition, there are a combination of the specific photosensitive chiral agent or the photochromic chiral agent and the non-photosensitive chiral agent, a combination of the specific photosensitive chiral agent or the photochromic chiral agent and the photosensitive chiral agent, and a combination of the specific photosensitive chiral agent or the photochromic chiral agent and the specific photosensitive chiral agent or the photochromic chiral agent. The absolute value of the weighted average helical twisting power of the chiral agent can be decreased in the same manner as described above to increase the helical pitch of the cholesteric liquid crystalline phase of the cholesteric liquid crystal layer A and to increase the specific tilt angle by decreasing the absolute value of the weighted average helical twisting power (preferably 0.0 to 1.9 µm$^{-1}$) of the chiral agent in the composition layer formed from the liquid crystal composition, and carrying out the light irradiation such that the helical twisting power of the specific photosensitive chiral agent changes.

For example, in a case of a combination of the specific photosensitive chiral agent and the non-photosensitive chiral agent, the composition layer is irradiated with light to which the specific photosensitive chiral agent is exposed in the step X2A to increase the helical twisting power of the specific photosensitive chiral agent and to increase the absolute value of the weighted average helical twisting power, whereby the cholesteric liquid crystal layer A is formed. Next, in the step YA, the cholesteric liquid crystal layer A is irradiated with light to which the specific photosensitive chiral agent is exposed to decrease the helical twisting power of the specific photosensitive chiral agent and to decrease the absolute value of the weighted average helical twisting power, whereby the helical pitch of the cholesteric liquid crystalline phase of the cholesteric liquid crystal layer A is increased and the specific tilt angle is increased.

Second Embodiment

The second embodiment of the method for producing a cholesteric liquid crystal layer according to the embodiment of the present invention includes, for example, a second embodiment-1 having the following step X1B, step X2B, and step YB, and a second embodiment-2 having the following step X1B', step X2B', and step YB'.

<<Second Embodiment-1>>

The second embodiment-1 of the method for producing a cholesteric liquid crystal layer according to the embodiment of the present invention has the following step X1B, step X2B, and step YB.

Step 1B: a step of forming a composition layer satisfying the above-mentioned condition 4, the above-mentioned condition 5, or the above-mentioned condition 6 on a substrate by using a liquid crystal composition containing a liquid crystal compound, a photosensitive chiral agent whose helical twisting power changes upon irradiation with light, and a temperature-sensitive chiral agent whose helical twisting power changes upon a change of temperature (hereinafter, also simply referred to as "temperature-sensitive chiral agent")

Step X2B: a step of irradiating the composition layer with light to cholesterically align a liquid crystal compound in the composition layer to form a cholesteric liquid crystal layer A Step YB: a step of subjecting the cholesteric liquid crystal layer A obtained by the step X2B to a change of temperature to carry out a treatment of increasing or decreasing a helical pitch of a cholesteric liquid crystalline phase in the cholesteric liquid crystal layer A to increase or decrease a specific tilt angle Hereinafter, each step will be described in detail.

• Step X1B

The step X1B is a step of forming a composition layer satisfying the above-mentioned condition 4, the above-mentioned condition 5, or the above-mentioned condition 6 on a substrate by using a liquid crystal composition containing a liquid crystal compound, a photosensitive chiral agent whose helical twisting power changes upon irradiation with light, and a chiral agent whose helical twisting power changes upon a change of temperature (hereinafter, also simply referred to as "temperature-sensitive chiral agent").

In the step X1B, the materials and members used are the same as in the step X1A, except that a temperature-sensitive chiral agent is further used.

•• Temperature-Sensitive Chiral Agent

Examples of the temperature-sensitive chiral agent include compounds that induce a helix of a liquid crystal compound and whose helical twisting power changes upon cooling or heating.

The temperature-sensitive chiral agent may be a temperature-sensitive chiral agent whose helical twisting power increases upon a change of temperature, or may be a temperature-sensitive chiral agent whose helical twisting power decreases upon a change of temperature.

In addition, the upper limit of the cooling or heating temperature in the step YB is usually about ±150° C. (in other words, a chiral agent whose helical twisting power changes upon cooling or heating within ±150° C. is preferable). Above all, a chiral agent whose helical twisting power changes upon cooling is preferable.

The temperature-sensitive chiral agent may be liquid crystalline or non-liquid crystalline.

The temperature-sensitive chiral agent preferably contains a partial structure selected from the group consisting of an isosorbide partial structure (a partial structure derived from isosorbide), an isomannide partial structure (a partial structure derived from isomannide), and a binaphthyl partial structure, from the viewpoint that the difference in helical twisting power after a change of temperature is large.

The absolute value of the weighted average helical twisting power of the chiral agent in the composition layer formed of the liquid crystal composition is not particularly limited and is, for example, preferably 0.0 to 1.9 more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint that a composition layer is easily formed.

The liquid crystal composition preferably contains a photosensitive chiral agent in which the helical direction of the induced helix is one of dextrorotatory and levorotatory, and a temperature-sensitive chiral agent in which the helical direction of the induced helix is the other of dextrorotatory and levorotatory.

In addition, in the step YB which will be described later, in a case where the treatment of increasing the helical pitch of the cholesteric liquid crystalline phase in the cholesteric liquid crystal layer A obtained by the step X2B is carried out to increase the specific tilt angle, it is preferable that the photosensitive chiral agent is a chiral agent whose helical twisting power increases upon irradiation with light, and the temperature-sensitive chiral agent is a chiral agent whose helical twisting power increases upon a change of temperature.

In addition, in the step YB which will be described later, in a case where the treatment of decreasing the helical pitch of the cholesteric liquid crystalline phase in the cholesteric liquid crystal layer A obtained by the step X2B is carried out to decrease the specific tilt angle, it is preferable that the photosensitive chiral agent is a chiral agent whose helical twisting power increases upon irradiation with light, and the temperature-sensitive chiral agent is a chiral agent whose helical twisting power decreases upon a change of temperature.

The procedure of the step X1B is the same as the procedure of the step X1A described above, and therefore the description thereof will be omitted.

• Step X2B

The step X2B is a step of irradiating the composition layer with light to cholesterically align a liquid crystal compound in the composition layer to form a cholesteric liquid crystal layer A.

The composition layer contains a photosensitive chiral agent. Therefore, the helical twisting power of the photosensitive chiral agent can be changed to cholesterically align the liquid crystal compound by irradiating the composition layer with light to which the photosensitive chiral agent is exposed.

More specifically, by irradiating the composition layer with light to which the photosensitive chiral agent is exposed, the absolute value of the weighted average helical twisting power of the chiral agent in the composition layer is increased in the same manner as in the case described with reference to FIG. 14, and therefore the cholesteric liquid crystal layer A is formed in the same manner as in the step X2A.

The procedure of the step X2B is the same as the procedure of the step X2A, and therefore the description thereof will be omitted.

• Step YB

The step YB is a step of subjecting the cholesteric liquid crystal layer A obtained by the step X2A to a change of temperature to carry out a treatment of increasing or decreasing a helical pitch of a cholesteric liquid crystalline phase in the cholesteric liquid crystal layer A to increase or decrease a specific tilt angle.

The increase and decrease of the helical pitch can be achieved by the temperature-sensitive chiral agent contained in the liquid crystal composition. For example, in a case where the helical twisting power of the temperature-sensitive chiral agent changes due to a change of temperature and therefore the absolute value of the weighted average helical twisting power of the chiral agent in the cholesteric liquid crystal layer A decreases, the helical pitch of the cholesteric liquid crystalline phase increases and then the specific tilt angle increases. In addition, in a case where the helical twisting power of the temperature-sensitive chiral agent changes due to a change of temperature and therefore the absolute value of the weighted average helical twisting power of the chiral agent in the cholesteric liquid crystal layer A increases, the helical pitch of the cholesteric liquid crystalline phase decreases and then the specific tilt angle decreases.

Examples of the treatment of giving a change of temperature to the cholesteric liquid crystal layer A include a method of subjecting the cholesteric liquid crystal layer A to a cooling treatment or a heat treatment.

In a case of cooling the cholesteric liquid crystal layer A, it is preferable to cool the cholesteric liquid crystal layer A such that the temperature of the cholesteric liquid crystal layer A is lowered by 30° C. or more. Above all, from the viewpoint that the above effect is more excellent, it is preferable to cool the cholesteric liquid crystal layer A such that the temperature of the cholesteric liquid crystal layer A is lowered by 40° C. or more, and it is more preferable to cool the cholesteric liquid crystal layer A such that the temperature of the cholesteric liquid crystal layer A is lowered by 50° C. or more. The upper limit value of the reduced temperature range of the cooling treatment is not particularly limited, and is usually about 150° C.

In other words, the cooling treatment is intended to cool the cholesteric liquid crystal layer A so as to be T-30° C. or lower in a case where the temperature of the cholesteric liquid crystal layer A is defined as T° C.

The cooling method is not particularly limited and may be, for example, a method in which a substrate on which the composition layer is disposed is allowed to stand in an atmosphere of a predetermined temperature.

In a case of heating the cholesteric liquid crystal layer A, it is preferable to heat the cholesteric liquid crystal layer A such that the temperature of the cholesteric liquid crystal layer A rises by 30° C. or more. Above all, from the viewpoint that the above effect is more excellent, it is preferable to heat the cholesteric liquid crystal layer A such that the temperature of the cholesteric liquid crystal layer A rises by 40° C. or more, and it is more preferable to heat the cholesteric liquid crystal layer A such that the temperature of the cholesteric liquid crystal layer A rises by 50° C. or more. The upper limit value of the temperature rise range of the heat treatment is not particularly limited, and is usually about 150° C.

<<Second Embodiment-2>>

In addition, the second embodiment-2 of the method for producing a cholesteric liquid crystal layer according to the embodiment of the present invention has the following step X1B', step X2B', and step YB'.

Step 1B': a step of forming a composition layer satisfying the above-mentioned condition 4, the above-mentioned condition 5, or the above-mentioned condition 6 on a substrate by using a liquid crystal composition containing a liquid crystal compound and a photochromic chiral agent Step X2B': a step of irradiating the composition layer with light to cholesterically align a liquid crystal compound in the composition layer to form a cholesteric liquid crystal layer A Step YB': a step of heating the cholesteric liquid crystal layer A obtained by the step X2B to carry out a treatment of increasing or decreasing a helical pitch of a cholesteric liquid crystalline phase in the cholesteric liquid crystal layer A to increase or decrease a specific tilt angle Hereinafter, each step will be described in detail.

• Step X1B

The step X1B is a step of forming a composition layer satisfying the above-mentioned condition 4, the above-mentioned condition 5, or the above-mentioned condition 6 on a substrate by using a liquid crystal composition containing a liquid crystal compound and a photochromic chiral agent.

In the step X1B, the materials and members used are the same as in the step X1A, except that a photochromic chiral agent is further used.

•• Photochromic Chiral Agent

A chiral agent in which a helical twisting power decreases (or increases) due to light and then the helical twisting power increases (or decreases) due to heating can be used as the photochromic chiral agent. Examples of such a photochromic chiral agent include a chiral agent having a photochromic site such as azobenzene, azomethine, diarylethene, spiropyran, or flugide in a molecule thereof. The upper limit of the heating temperature in the step YB is usually about 150° C. (in other words, a photochromic chiral agent whose helical twisting power changes upon heating within 150° C. is preferable).

The liquid crystal composition preferably contains a photosensitive chiral agent or a non-photosensitive chiral agent in addition to the photochromic chiral agent.

In a case where the liquid crystal composition contains a photosensitive chiral agent in addition to the photochromic chiral agent, above all, it is preferable to contain a photochromic chiral agent in which the helical direction of the induced helix is one of dextrorotatory and levorotatory, and a photosensitive chiral agent in which the helical direction of the induced helix is the other of dextrorotatory and levorotatory. In a case where the photosensitive chiral agent is exposed to light in the step X2B', it is preferable to use a photosensitive chiral agent that shows a change opposite to the helical twisting power change shown by the photochromic chiral agent in the step X2B'. In a case where the photosensitive chiral agent is exposed to light in the step YB', it is preferable to use a photosensitive chiral agent that shows a change opposite to the helical twisting power change shown by the photochromic chiral agent in the step YB'.

In addition, it is also preferable that the liquid crystal composition contains a specific photosensitive chiral agent or another photochromic chiral agent in addition to the photochromic chiral agent. Above all, the liquid crystal composition of the above aspect preferably contains a photochromic chiral agent in which the helical direction of the induced helix is one of dextrorotatory and levorotatory, and a specific photosensitive chiral agent in which the helical direction of the induced helix is the other of dextrorotatory and levorotatory or another photochromic chiral agent. In the above aspect, it is preferable that, in the step X2B', the helical twisting power of one chiral agent increases and the helical twisting power of the other chiral agent decreases, and in the step YB', the helical twisting power of one chiral agent decreases and the helical twisting power of the other chiral agent increases.

The absolute value of the weighted average helical twisting power of the chiral agent in the composition layer formed of the liquid crystal composition is not particularly limited and is, for example, preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint that a composition layer is easily formed.

The procedure of the step X1B' is the same as the procedure of the step X1A described above, and therefore the description thereof will be omitted.

• Step X2B'

The step X2B is a step of irradiating the composition layer with light to cholesterically align a liquid crystal compound in the composition layer to form a cholesteric liquid crystal layer A.

The composition layer contains a photochromic chiral agent. Therefore, the helical twisting power of the photochromic chiral agent can be changed to cholesterically align the liquid crystal compound by irradiating the composition layer with light to which the photochromic chiral agent is exposed.

More specifically, by irradiating the composition layer with light to which the photochromic chiral agent is exposed, the absolute value of the weighted average helical twisting power of the chiral agent in the composition layer is increased in the same manner as in the case described with reference to FIG. 14, and therefore the cholesteric liquid crystal layer A is formed in the same manner as in the step X2A.

The procedure of the step X2B' is the same as the procedure of the step X2A, and therefore the description thereof will be omitted.

• Step YB'

The step YB' is a step of heating the cholesteric liquid crystal layer A obtained by the step X2A to carry out a treatment of increasing or decreasing a helical pitch of a cholesteric liquid crystalline phase in the cholesteric liquid crystal layer A to increase or decrease a specific tilt angle.

The increase and decrease of the helical pitch can be achieved by the photochromic chiral agent contained in the liquid crystal composition. For example, in a case where the helical twisting power of the photochromic chiral agent changes due to heating and therefore the absolute value of the weighted average helical twisting power of the chiral agent in the cholesteric liquid crystal layer A decreases, the helical pitch of the cholesteric liquid crystalline phase increases and then the specific tilt angle increases. In addition, in a case where the helical twisting power of the photochromic chiral agent changes due to heating and therefore the absolute value of the weighted average helical twisting power of the chiral agent in the cholesteric liquid crystal layer A increases, the helical pitch of the cholesteric liquid crystalline phase decreases and then the specific tilt angle decreases.

In a case of heating the cholesteric liquid crystal layer A, it is preferable to heat the cholesteric liquid crystal layer A such that the temperature of the cholesteric liquid crystal layer A rises by 30° C. or more. Above all, from the viewpoint that the above effect is more excellent, it is preferable to heat the cholesteric liquid crystal layer A such that the temperature of the cholesteric liquid crystal layer A rises by 40° C. or more, and it is more preferable to heat the cholesteric liquid crystal layer A such that the temperature of the cholesteric liquid crystal layer A rises by 50° C. or more. The upper limit value of the temperature rise range of the heat treatment is not particularly limited, and is usually about 150° C.

Third Embodiment

The third embodiment of the method for producing a cholesteric liquid crystal layer according to the embodiment of the present invention has the following step X1C, step X2C, and step YC.

Step X1C: a step of forming a composition layer satisfying the above-mentioned condition 4, the above-mentioned condition 5, or the above-mentioned condition 6 on a substrate by using a liquid crystal composition containing a liquid crystal compound, a photosensitive chiral agent, and a temperature-sensitive chiral agent Step X2C: a step of giving a change of temperature to the composition layer to cholesterically align a liquid crystal compound in the composition layer to form a cholesteric liquid crystal layer A Step YC: a step of irradiating the cholesteric liquid crystal layer A obtained by the step X2C with light to carry out a treatment of increasing or decreasing a helical pitch of a cholesteric liquid crystalline phase in the cholesteric liquid crystal layer A to increase or decrease a specific tilt angle It differs in that, in the second embodiment described above, the composition layer is irradiated with light and the cholesteric liquid crystal layer A is subjected to a change of temperature, whereas in the third embodiment, the composition layer is subjected to a change of temperature and the cholesteric liquid crystal layer A is irradiated with light.

• Step X1C

The step X1C is a step of forming a composition layer satisfying the above-mentioned condition 4, the above-mentioned condition 5, or the above-mentioned condition 6 on a substrate by using a liquid crystal composition containing a liquid crystal compound, a photosensitive chiral agent, and a temperature-sensitive chiral agent.

The materials and members used in the step X1C are the same as those in the step X1B, and therefore the description thereof will be omitted.

The absolute value of the weighted average helical twisting power of the chiral agent in the composition layer formed of the liquid crystal composition is not particularly limited and is, for example, preferably 0.0 to 1.9 more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint that a composition layer is easily formed.

The liquid crystal composition preferably contains a photosensitive chiral agent in which the helical direction of the induced helix is one of dextrorotatory and levorotatory, and a temperature-sensitive chiral agent in which the helical direction of the induced helix is the other of dextrorotatory and levorotatory.

In addition, in the step YC which will be described later, in a case where the treatment of increasing the helical pitch of the cholesteric liquid crystalline phase in the cholesteric liquid crystal layer A obtained by the step X2C is carried out to increase the specific tilt angle, it is preferable that the photosensitive chiral agent is a chiral agent whose helical twisting power increases upon irradiation with light, and the temperature-sensitive chiral agent is a chiral agent whose helical twisting power increases upon a change of temperature.

In addition, in the step YC which will be described later, in a case where the treatment of decreasing the helical pitch of the cholesteric liquid crystalline phase in the cholesteric liquid crystal layer A obtained by the step X2C is carried out to decrease the specific tilt angle, it is preferable that the photosensitive chiral agent is a chiral agent whose helical twisting power decreases upon irradiation with light, and the temperature-sensitive chiral agent is a chiral agent whose helical twisting power increases upon a change of temperature.

• Step X2C

The step X2C is a step of giving a change of temperature to the composition layer to cholesterically align a liquid crystal compound in the composition layer to form a cholesteric liquid crystal layer A.

The composition layer contains a temperature-sensitive chiral agent. Therefore, the helical twisting power of the temperature-sensitive chiral agent can be changed to cholesterically align the liquid crystal compound by giving a change of temperature to the composition layer.

More specifically, by giving a change of temperature to the composition layer, the absolute value of the weighted average helical twisting power of the chiral agent in the composition layer is increased in the same manner as in the case described with reference to FIG. 14, and therefore the cholesteric liquid crystal layer A is formed in the same manner as in the step X2A.

The procedure of the treatment of giving a change of temperature in the step X2C is the same as the procedure of the step YB, and therefore the description thereof will be omitted.

• Step YC

The step YC is a step of irradiating the cholesteric liquid crystal layer A obtained by the step X2C with light to carry out a treatment of increasing or decreasing a helical pitch of a cholesteric liquid crystalline phase in the cholesteric liquid crystal layer A to increase or decrease a specific tilt angle.

The increase and decrease of the helical pitch can be achieved by the photosensitive chiral agent contained in the liquid crystal composition. For example, in a case where the helical twisting power of the photosensitive chiral agent changes due to light irradiation and therefore the absolute value of the weighted average helical twisting power of the chiral agent in the cholesteric liquid crystal layer A decreases, the helical pitch of the cholesteric liquid crystalline phase increases and then the specific tilt angle increases. In addition, in a case where the helical twisting power of the photosensitive chiral agent changes due to light irradiation and therefore the absolute value of the weighted average helical twisting power of the chiral agent in the cholesteric liquid crystal layer A increases, the helical pitch of the cholesteric liquid crystalline phase decreases and then the specific tilt angle decreases.

The procedure of the step YC is the same as the procedure of the step X2A, and therefore the description thereof will be omitted.

Fourth Embodiment

The fourth embodiment of the method for producing a cholesteric liquid crystal layer according to the embodiment of the present invention has the following step X1D, step X2D, and step YD.

Step X1D: a step of forming a composition layer satisfying the above-mentioned condition 4, the above-mentioned condition 5, or the above-mentioned condition 6 on a substrate by using a liquid crystal composition containing a liquid crystal compound and a temperature-sensitive chiral agent Step X2D: a step of giving a change of temperature to the composition layer to cholesterically align a liquid crystal compound in the composition layer to form a cholesteric liquid crystal layer A Step YD: a step of subjecting the cholesteric liquid crystal layer A obtained by the step X2D to a change of temperature to carry out a treatment of increasing or decreasing a helical pitch of a cholesteric liquid crystalline phase in the cholesteric liquid crystal layer A to increase or decrease a specific tilt angle

• Step X1D

The step X1D is a step of forming a composition layer satisfying the above-mentioned condition 4, the above-mentioned condition 5, or the above-mentioned condition 6 on a substrate by using a liquid crystal composition containing a liquid crystal compound and a temperature-sensitive chiral agent.

The liquid crystal composition preferably contains a right-handed helix inducing chiral agent whose helical twisting power changes upon a change of temperature and a left-handed helix inducing chiral agent whose helical twisting power changes upon a change of temperature.

The procedure of the step X1D is the same as the procedure of the step X1A described above, and therefore the description thereof will be omitted.

• Step X2D

The step X2D is a step of giving a change of temperature to the composition layer to cholesterically align a liquid crystal compound in the composition layer to form a cholesteric liquid crystal layer A.

The procedure of the step X2D is the same as the procedure of the step X2C described above, and therefore the description thereof will be omitted.

• Step YD

The step YD is a step of subjecting the cholesteric liquid crystal layer A obtained by the step X2D to a change of temperature to carry out a treatment of increasing or decreasing a helical pitch of a cholesteric liquid crystalline phase in the cholesteric liquid crystal layer A to increase or decrease a specific tilt angle.

The procedure of the step YD is the same as the procedure of the step X2C described above, and therefore the description thereof will be omitted.

In the second embodiment and the third embodiment, two types of chiral agents, a photosensitive chiral agent and a temperature-sensitive chiral agent, are used, but a chiral agent whose helical twisting power changes upon irradiation with light and whose helical twisting power changes upon a change of temperature may be used instead of the photosensitive chiral agent and the temperature-sensitive chiral agent.

Other Steps in Embodiments 1 to 4

The method for producing a cholesteric liquid crystal layer according to the embodiment of the present invention may include steps other than those described above.

For example, in a case where the liquid crystal compound has a polymerizable group, it is preferable to carry out a curing treatment on the cholesteric liquid crystal layer. The cholesteric liquid crystal layer obtained by carrying out the curing treatment corresponds to a layer formed by fixing a cholesteric liquid crystalline phase.

Here, with regard to the state where the cholesteric liquid crystalline phase is "immobilized", the most typical and preferred aspect is a state in which the alignment of a liquid crystal compound brought into a cholesteric liquid crystalline phase is maintained. The state where the cholesteric liquid crystalline phase is "immobilized" is not limited thereto, and specifically, it refers to a state in which, in a temperature range of usually 0° C. to 50° C. or in a temperature range of −30° C. to 70° C. under more severe conditions, the layer has no fluidity and an immobilized alignment morphology can be maintained stably without causing a change in the alignment morphology due to an external field or an external force. In the present invention, as will be described later, it is preferable to fix the alignment state of a cholesteric liquid crystalline phase by a curing reaction proceeding upon irradiation with ultraviolet rays.

The method of the curing treatment is not particularly limited, and examples thereof include a photo curing treatment and a thermal curing treatment. Among them, a light irradiation treatment is preferable, and an ultraviolet irradiation treatment is more preferable.

For ultraviolet irradiation, a light source such as an ultraviolet lamp is used.

The irradiation energy amount of ultraviolet rays is not particularly limited and is generally preferably about 100 to 800 mJ/cm$^2$. The irradiation time of the ultraviolet rays is not particularly limited and may be determined as appropriate from the viewpoint of both sufficient strength and productivity of the obtained layer.

In addition, a step of heating the cholesteric liquid crystal layer A may be carried out between the step X1A and the step YA of the first embodiment, between the step X1B and the step YB of the second embodiment-1, and between the step X1B' and the step YB' of the second embodiment-2, between the step X1C and the step YC of the third embodiment, and between the step X1D and the step YD of the fourth embodiment.

The heating conditions are not particularly limited, and the heating temperature is preferably 50° C. to 150° C. and more preferably 70° C. to 130° C. The heating time is preferably 1 to 1,000 seconds and more preferably 10 to 100 seconds.

In addition, if necessary, a step of heating the cholesteric liquid crystal layer may be carried out after the step YA of the first embodiment, after the step YB of the second embodiment-1, after the step YB' of the second embodiment-2, after the step YC of the third embodiment, and after the step YD of the fourth embodiment. A curing treatment may be carried out after this heat treatment.

The heating conditions are not particularly limited, and the heating temperature is preferably 50° C. to 150° C. and more preferably 70° C. to 130° C. The heating time is preferably 1 to 1,000 seconds and more preferably 10 to 100 seconds.

[Cholesteric Liquid Crystal Layer]

A suitable aspect of the cholesteric liquid crystal layer obtained by the above-mentioned production method may be, for example, the above-mentioned cholesteric liquid crystal layer having a specific tilt angle of 31° or more.

More specifically, one of the suitable aspects of the cholesteric liquid crystal layer according to the embodiment of the present invention may be, for example, a cholesteric liquid crystal layer (hereinafter, also referred to as "specific CL liquid crystal layer") in which a liquid crystal compound is aligned into a state of a cholesteric liquid crystalline phase, the cholesteric liquid crystal layer has a liquid crystal alignment pattern in which a direction of a molecular axis derived from the liquid crystal compound changes while continuously rotating along at least one in-plane direction, the molecular axis of the liquid crystal compound is tilted with respect to a main surface of the cholesteric liquid crystal layer on both main surfaces of the cholesteric liquid crystal layer, and an arrangement direction of bright portion and dark portion derived from the cholesteric liquid crystalline phase is tilted by 31° or more with respect to a normal line of the main surface of the cholesteric liquid crystal layer, in a cross-section perpendicular to the main surface of the cholesteric liquid crystal layer observed by a scanning electron microscope.

The specific CL liquid crystal layer has a higher circular polarization degree of reflected light. The reason why the circular polarization degree of the reflected light of the specific CL liquid crystal layer is high will be described below.

Figure 15:
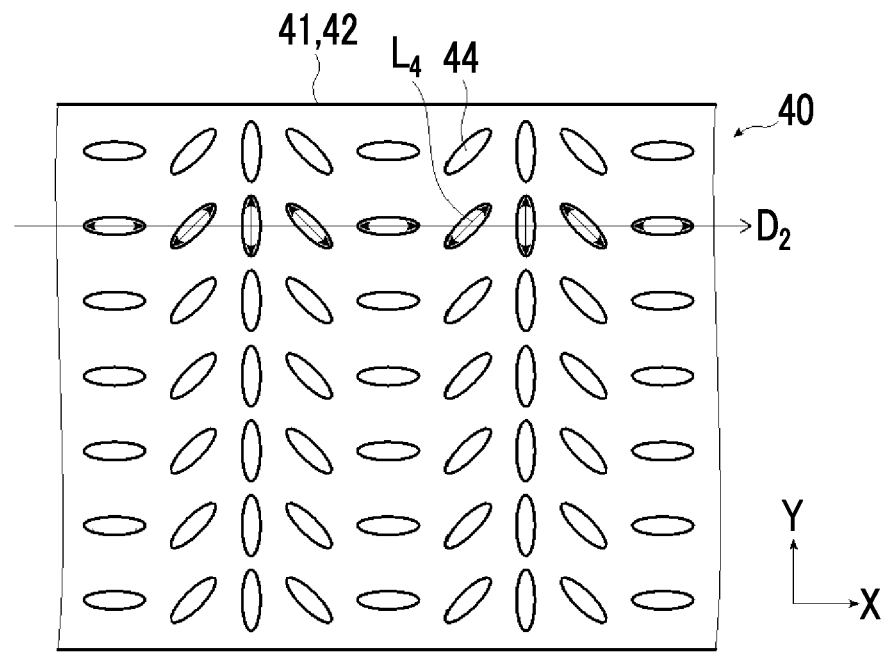
FIG. 15 is a schematic diagram of an X-Y plane of a conventional cholesteric liquid crystal layer.
Figure 16:
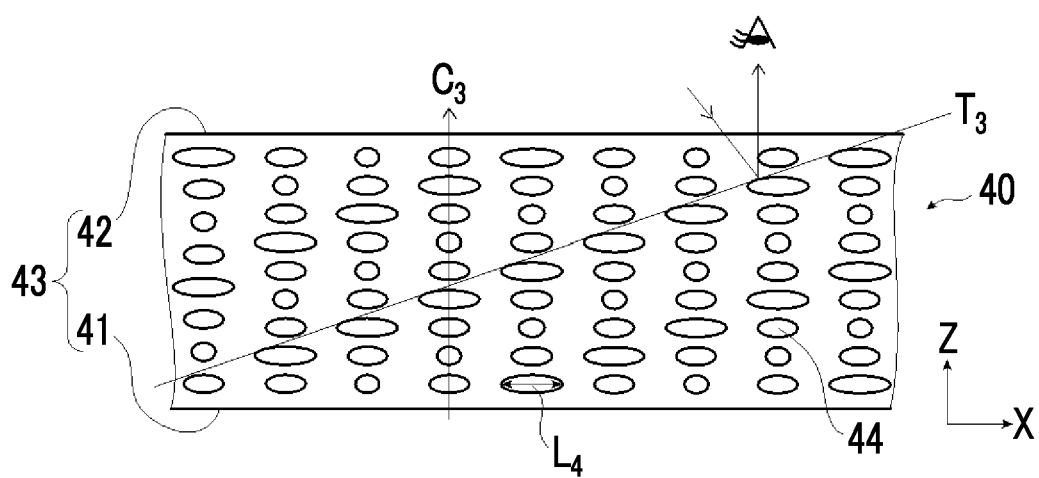
FIG. 16 is a schematic diagram of an X-Z plane of the conventional cholesteric liquid crystal layer.

Here, FIG. 15 and FIG. 16 show schematic diagrams of a conventional cholesteric liquid crystal layer. Specifically, FIG. 15 is a schematic diagram conceptually showing an alignment state of a liquid crystal compound in a main surface 41 and a main surface 42 of a cholesteric liquid crystal layer 40 having a pair of main surfaces 43 consisting of the main surface 41 and the main surface 42. In addition, FIG. 16 shows a state of the cholesteric liquid crystal layer in a cross-section perpendicular to the main surface 43 of the cholesteric liquid crystal layer 40. Hereinafter, the description will be given with the main surface 41 and the main surface 42 of the cholesteric liquid crystal layer 40 being an X-Y plane, and a cross-section perpendicular to the X-Y plane being an X-Z plane. That is, FIG. 15 is a schematic diagram of the cholesteric liquid crystal layer 40 on the X-Y plane, and FIG. 16 is a schematic diagram of the cholesteric liquid crystal layer 40 on the X-Z plane.

As shown in FIG. 15, in the X-Y plane of the cholesteric liquid crystal layer 40, a liquid crystal compound 44 is arranged along a plurality of parallel arrangement axes $D_2$ in the X-Y plane, and in the respective arrangement axes $D_2$, the direction of a molecular axis $L_4$ of the liquid crystal compound 44 changes while continuously rotating in one in-plane direction along the arrangement axis $D_2$. That is, the alignment state of the liquid crystal compound 44 on the X-Y plane of the cholesteric liquid crystal layer 40 is the same as the alignment state of the liquid crystal compound 14 on the X-Y plane of the cholesteric liquid crystal layer A10 shown in FIG. 3.

As shown in FIG. 16, in the X-Z plane of the cholesteric liquid crystal layer 40, the molecular axis $L_4$ of the liquid crystal compound 44 is not tilted with respect to the main surface 41 and the main surface 42 (X-Y plane). In other words, the molecular axis $L_4$ is parallel to the main surface 41 and the main surface 42 (X-Y plane).

The cholesteric liquid crystal layer 40 has the X-Y plane shown in FIG. 4 and the X-Z plane shown in FIG. 16, and therefore the helical axis $C_3$ derived from the cholesteric liquid crystalline phase is perpendicular to the main surface 41 and the main surface 42 (X-Y plane), and the reflecting surface $T_3$ is tilted in a predetermined direction with respect to the main surface 41 and the main surface 42 (X-Y plane). In a case where the X-Z plane of the cholesteric liquid crystal layer 40 is observed by a scanning electron microscope, a stripe pattern is observed in which an arrangement direction in which bright portions and dark portions are alternately arranged is tilted at a predetermined angle with respect to a normal line of the main surface 41 and the main surface 42 (X-Y plane) (not shown).

On the other hand, in the specific CL liquid crystal layer similar to the cholesteric liquid crystal layer A10 shown in FIG. 3 and FIG. 4, the molecular axis $L_1$ is substantially orthogonal to the arrangement direction $P_1$ in which the bright portions 15 and the dark portions 16 observed by scanning electron microscope observation in the X-Z plane are alternately arranged. That is, the direction of the helical axis $C_1$ is substantially parallel to the arrangement direction $P_1$ in which the bright portions 15 and the dark portions 16 are alternately arranged. As a result, the light incident from an oblique direction and the helical axis $C_1$ are more likely to be parallel to each other, and the reflected light on the reflecting surface has a high circular polarization degree. On the other hand, in a case of the cholesteric liquid crystal layer 40, since the helical axis $C_3$ is perpendicular to the main surface 41 and the main surface 42 (X-Y plane), and therefore the angle formed by the incident direction of the light incident from an oblique direction and the direction of the helical axis $C_3$ becomes larger. That is, the incident direction of the light incident from an oblique direction and the direction of the helical axis $C_3$ become more not parallel. Therefore, in the specific CL liquid crystal layer, the circular polarization degree of the reflected light on the reflecting surface is higher than that of the cholesteric liquid crystal layer 40.

The configuration of the specific CL liquid crystal layer has the same configuration as the cholesteric liquid crystal layer A described above except that the tilt angle is a specific angle, and thus the description thereof will be omitted.

For example, a suitable range of an average angle formed by the molecular axis of the liquid crystal compound in the specific CL liquid crystal layer and the main surface of the specific CL liquid crystal layer is the same as the suitable range of the average angle formed by the molecular axis of the liquid crystal compound in the cholesteric liquid crystal layer A and the main surface of the cholesteric liquid crystal layer A.

The specific tilt angle in the specific CL liquid crystal layer is 31° or more, preferably 35° or more, and more preferably 40° or more. The upper limit value of the specific tilt angle is preferably 80° or less and more preferably 70° or less.

The specific CL liquid crystal layer has a liquid crystal alignment pattern in which the direction of the molecular axis of the liquid crystal compound changes while continuously rotating in one in-plane direction along an arrangement axis on both or one of the two main surfaces.

In addition, in the specific CL liquid crystal layer, it is preferable that the direction in which the liquid crystal alignment pattern existing on one main surface 11 extends and the direction in which the liquid crystal alignment pattern existing on the other main surface extends are parallel with each other.

In addition, the specific CL liquid crystal layer may have a configuration in which there are a plurality of regions having different intervals between the lines (bright lines) formed by the bright portions derived from the cholesteric liquid crystalline phase observed by a scanning electron microscope. That is, in each region where the intervals between the bright lines derived from the cholesteric liquid crystalline phase are different from each other, the helical pitch is different from region to region, and therefore a central wavelength λ of selective reflection is also different from region to region. By making the specific CL liquid crystal layer have the above-mentioned configuration, the reflection wavelength range can be further widened. The helical pitch of the specific CL liquid crystal layer may change in an in-plane direction or may change in a film thickness direction.

In a case where the helical pitch of the specific CL liquid crystal layer is changed in an in-plane direction, the specific CL liquid crystal layer preferably has a region in which the helical pitch continuously changes in a certain in-plane direction of the main surface. The region in which the helical pitch changes continuously is intended to refer to a region where a central wavelength of a selected wavelength increases (or decreases) in a certain in-plane direction.

In a case where the helical pitch of the specific CL liquid crystal layer is changed in a film thickness direction, the specific CL liquid crystal layer preferably has a region in which the helical pitch continuously changes in a film thickness direction of the main surface. The region in which the helical pitch changes continuously is intended to refer to a region where a central wavelength of a selected wavelength increases (or decreases) in a film thickness direction.

Figure 17:
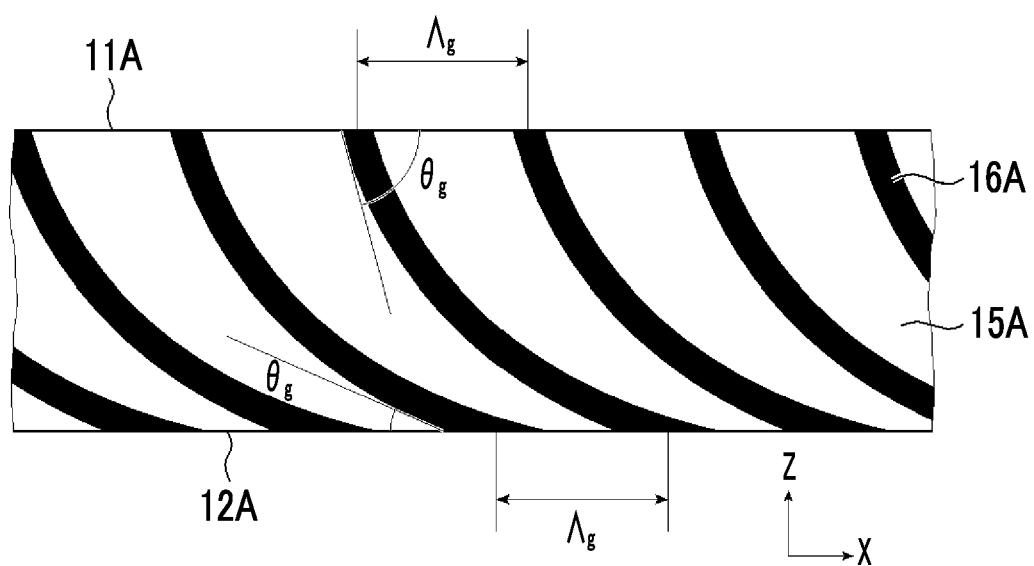
FIG. 17 is a schematic diagram showing a modified example of a specific cholesteric liquid crystal layer, showing a form in which a helical pitch changes in a film thickness direction on an X-Z plane of the specific cholesteric liquid crystal layer.

In a case where the helical pitch of the specific CL liquid crystal layer changes in a film thickness direction, the X-Z plane of the specific CL liquid crystal layer observed by a scanning electron microscope shows, for example, bright and dark lines (bright portions 15A, dark portions 16A) as shown FIG. 17. That is, bright and dark lines having different helical pitches are observed on the main surface 11A side and the main surface 12A side. In FIG. 17, the helical pitch is represented by {a length in which a direction of a molecular axis derived from a liquid crystal compound is rotated by 180° (one period $\Lambda_g$)×2} sin $\theta_g$.

As a method for obtaining the specific CL liquid crystal layer whose helical pitch changes in an in-plane direction or a film thickness direction, for example, there is a method in which the above-mentioned step Y is carried out, and then a curing treatment is carried out without carrying out a heat treatment.

[Use]

The cholesteric liquid crystal layer (including the specific CL liquid crystal layer) is a layer showing selective reflection properties with respect to light in a predetermined wavelength range. The cholesteric liquid crystal layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more cholesteric liquid crystal layers can be used for various purposes. In a film including two or more layers of a cholesteric liquid crystal layer, the senses of circularly polarized light reflected by the cholesteric liquid crystal layers may be the same or opposite to each other depending on the application. In addition, the center wavelengths of selective reflection of the cholesteric liquid crystal layers, which will be described later, may be the same as or different from each other depending on the application.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twisted direction of the helix of the cholesteric liquid crystal. Selective reflection by the cholesteric liquid crystal reflects dextrorotatory circularly polarized light and transmits levorotatory circularly polarized light in a case where the twisted direction (sense) of the helix of the cholesteric liquid crystal is right-handed, whereas it reflects levorotatory circularly polarized light and transmits dextrorotatory circularly polarized light in a case where the sense is left-handed.

For example, a film including a cholesteric liquid crystal layer exhibiting selective reflection properties in the visible light wavelength range (wavelength of 400 to 750 nm) can be used as a screen for projected image display and a half mirror. In addition, by controlling the reflection wavelength range, such a film can be used as a filter that improves the color purity of display light of a color filter or a display (for example, see JP2003-294948A).

In addition, the cholesteric liquid crystal layer can be used for various applications such as a polarizer, a reflective film (reflective layer), an antireflection film, a view angle compensation film, a holography, a security, a sensor, a real image projection minor (front projection, rear projection), a mirror for virtual image projection, a decorative sheet, a heat shield sheet, a light shield sheet, and an alignment film, which are constituent elements of optical elements.

In addition, the above-mentioned cholesteric liquid crystal layer can also be used as a linearly polarized light reflecting member by combining a phase difference plate or a polarizing plate.

Hereinafter, the application as a projected image display member which is a particularly preferred application will be described.

By the above-mentioned function of the cholesteric liquid crystal layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The center wavelength λ of the selective reflection depends on the pitch P of the helical structure (=the period of the helix) in a cholesteric liquid crystalline phase and follows the relationship of the average refractive index n of the cholesteric liquid crystal layer and λ=n×P. Here, the center wavelength λ of the selective reflection of the cholesteric liquid crystal layer means a wavelength at the center position of the reflection peak of a circularly polarized reflection spectrum measured from the normal direction of the cholesteric liquid crystal layer. As can be seen from the above Expression, the center wavelength of the selective reflection can be adjusted by adjusting the pitch of the helical structure. Since the pitch of the cholesteric liquid crystalline phase depends on the type of the chiral agent or the addition concentration thereof, a desired pitch can be obtained by adjusting these factors. As a method for measuring sense or pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a projected image display member capable of displaying full color projected images can be produced by preparing and laminating cholesteric liquid crystal layers having an apparent center wavelength of the selective reflection in the red light wavelength range, the green light wavelength range, and the blue light wavelength range, respectively.

By adjusting the center wavelength of the selective reflection of each cholesteric liquid crystal layer according to the emission wavelength range of the light source used for projection and the aspect of use of the projected image display member, a clear projected image can be displayed with high efficiency of light utilization. In particular, by adjusting the center wavelengths of the selective reflection of the cholesteric liquid crystal layer respectively according to the light emission wavelength range of the light source used for projection or the like, a clear color projected image can be displayed with high efficiency of light utilization.

In addition, for example, in a case where the projected image display member is configured to be transmissive to light in the visible light region, a half mirror that can be used as a combiner for a head-up display can be obtained. The projected image display half mirror can display the image projected from the projector so as to be visible, and in a case where the projected image display half mirror is observed from the same surface side where the image is displayed, the information or scenery on the opposite surface side can be observed at the same time.

In addition, the cholesteric liquid crystal layer can be suitably applied to an optically anisotropic body or a reflective film (reflective layer). In addition, the optically anisotropic body is intended to refer to a substance which has optical anisotropy.

EXAMPLES

Hereinafter, the present invention will be described in more detail with reference to Examples. The materials, the amounts of materials used, the proportions, the treatment details, the treatment procedure, and the like shown in the Examples below may be appropriately modified without departing from the spirit of the present invention. Accordingly, the scope of the present invention should not be limitatively interpreted by Examples described below.

[Synthesis and Evaluation of Chiral Agent]

[Synthesis of Compound CD-A1]

The following compound CD-A1 used was synthesized according to JP2002-338575A.

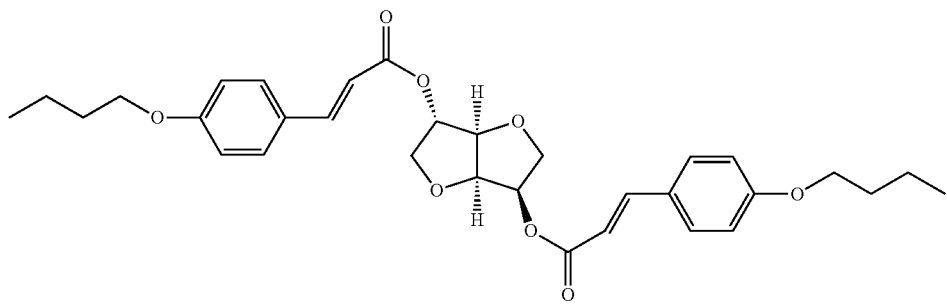

CD-A1

The compound CD-A1 is a chiral agent having a right-handed helical sense and whose helical twisting power decreases upon irradiation with light of 315 nm.

[Synthesis of Compounds CD-A2 and CD-A3]

The compounds CD-A2 and CD-A3 were synthesized in the same manner as in the CD-A1 under general condensation conditions.

The compound CD-A2 is a chiral agent having a left-handed helical sense and whose helical twisting power decreases upon irradiation with light of 315 nm. The compound CD-A3 is a chiral agent having a right-handed helical sense and whose helical twisting power decreases upon irradiation with light of 365 nm.

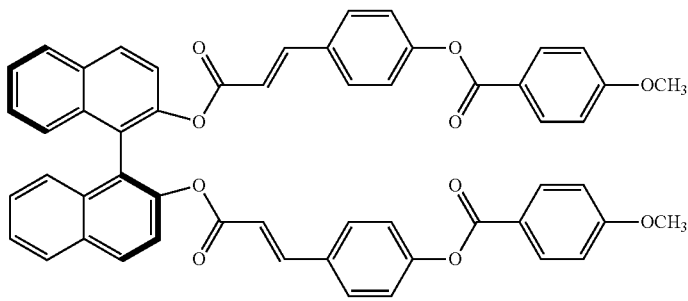

CD-A2

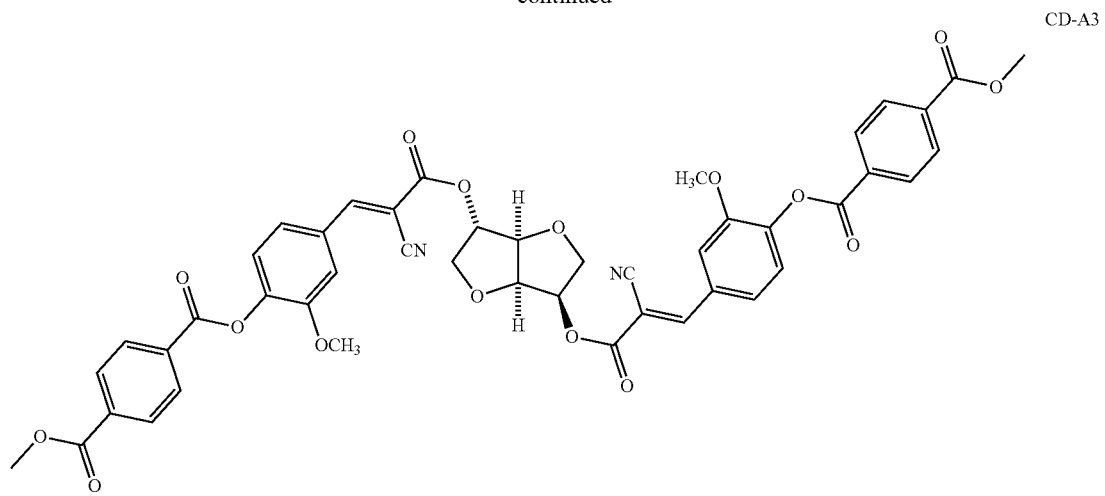

[Synthesis of Compound CD-B1]

The compound CD-B1 was synthesized according to the following scheme.

The compound CD-B1 is a chiral agent having a left-handed helical sense and whose helical twisting power increases and then decreases upon irradiation with light of 315 nm or 365 nm.

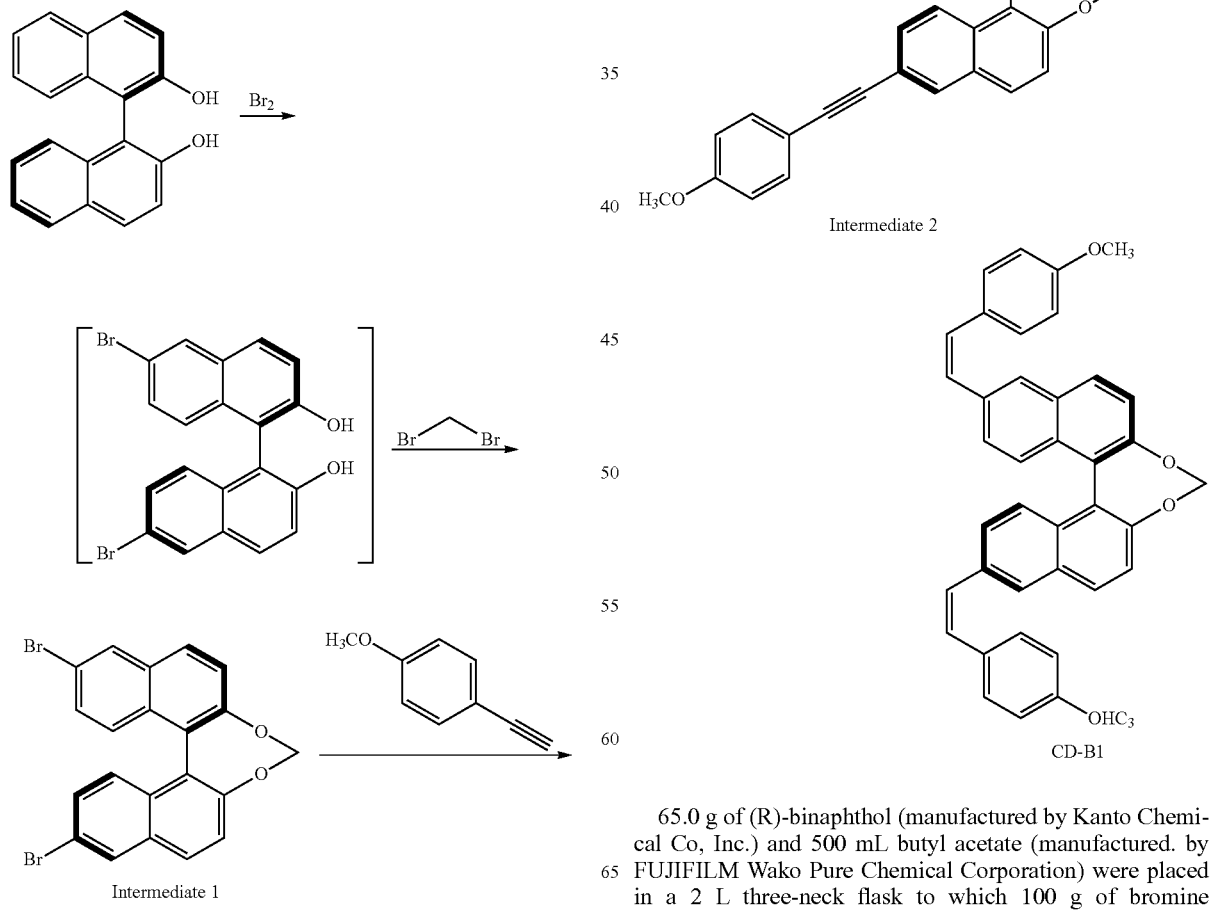

65.0 g of (R)-binaphthol (manufactured by Kanto Chemical Co, Inc.) and 500 mL butyl acetate (manufactured. by FUJIFILM Wako Pure Chemical Corporation) were placed in a 2 L three-neck flask to which 100 g of bromine (manufactured by FUJIFILM Wako Pure Chemical Corporation) was then added dropwise at 0° C., followed by stirring for 5 hours. Subsequently, the obtained reaction solution was washed with aqueous sodium hydrogen sulfite (21.7 g of sodium hydrogen sulfite (manufactured by FUJIFILM Wako Pure Chemical Corporation), 290 mL of water), 325 mL of water, and aqueous sodium hydrogen carbonate (13.0 g of sodium hydrogen carbonate (manufactured by FUJIFILM Wako Pure Chemical Corporation), 300 mL of water) in this order. The washed solution was dried over magnesium sulfate, the solvent was distilled off under reduced pressure, and the resulting residue was transferred to a three-neck flask.

Subsequently, 80.2 g of N,N-dimethylformamide (DMF, manufactured by FUJIFILM Wako Pure Chemical Corporation), 710 g of potassium carbonate (manufactured b FUJIFILM Wako Pure Chemical Corporation), 75.0 g of butyl acetate (manufactured by FUJIFILM Wako Pure Chemical Corporation), and 415 g of dibromomethane (manufactured by FUJIFILM Wako Pure Chemical Corporation) were added to the three-neck. flask which was then stirred at 90° C. for 4 hours. The obtained reaction solution was cooled to room. temperature, and then the solid was filtered off. 170 mL of ethyl acetate manufactured by FUJIFILM Wako Pure Chemical Corporation) and 550 mL of methanol (manufactured by FUJIFILM Wako Pure Chemical Corporation) were added to the solution after filtering the solid, and the resulting solid was collected by filtration. Then, the obtained solid was blast-dried at 40° C. for 12 hours to obtain Intermediate 1 (66.0 g, yield: 75%).

<Synthesis of Intermediate 2>

20.0 g of Intermediate 1, 17.4 g of ethynyl anisole (manufactured by Tokyo Chemical Industry Co., Ltd.), 0.08 g of copper iodide (manufactured by FUJIFILM Wako Pure Chemical Corporation), 0.22 g of triphenylphosphine palladium dichloride (manufactured by Tokyo Chemical Industry Co., Ltd.), 120 mL of triethylamine (manufactured by FUJIFILM Wako Pure Chemical Corporation), and 40 mL of pyridine (manufactured by FUJIFILM Wako Pure Chemical Corporation) were placed in a 500 mL three-neck flask which was then stirred at 90° C. for 3 hours. Subsequently, the obtained reaction solution was cooled to 0° C., 400 mL of methanol (manufactured by FUJIFILM Wako Pure Chemical Corporation) was added, and the resulting solid was collected by filtration. Then, the obtained solid was blast-dried at 40° C. for 12 hours to obtain Intermediate 2 (22.0 g, yield: 90%).

<Synthesis of Compound CD-B1>

20.0 g of Intermediate 2, 10.0 g of Lindlar catalyst (manufactured by Tokyo Chemical Industry Co., Ltd.), 9.2 g of quinoline (manufactured by FUJIFILM Wako Pure Chemical Corporation), and 100 mL of 1,4-dioxane (manufactured by FUJIFILM Wako Pure Chemical Corporation) were placed in a 300 mL three-neck flask which was then purged with hydrogen and stirred at 80° C. for 6 hours. The solid was filtered off by Celite filtration, and the obtained solution was purified by column chromatography and then blast-dried at 40° C. for 12 hours to obtain Compound CD-B1 (18.0 g, yield: 90%).

[Synthesis of Compound CD-B2]

The compound CD-B2 was synthesized in the same manner as in Compound 6 described in "Chemistry Open, 2017, 6, pp. 710 to 720".

The compound CD-B2 is a photochromic chiral agent having a right-handed helical sense and whose helical twisting power decreases upon irradiation with light of 365 nm and then increases upon heating or exposure to visible light.

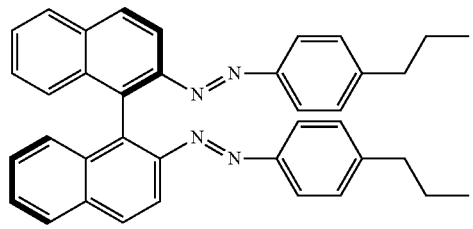

CD-B2

[Evaluation of Helical Twisting Power (HTP) and Light-Dependent Percentage Change Thereof]

<Evaluation of HTP and Light-Dependent Percentage Change Thereof>

The HTP of the compound CD-A1 (HTP here is intended to refer to an HTP in a liquid crystal layer in which a liquid crystal compound is brought into a planar alignment upon heating (90° C.) (a state of cholesteric liquid crystalline phase)) and a rate of change of HTP upon irradiation with light (hereinafter, also referred to as "light-dependent percentage change") were evaluated by the following method.

The liquid crystal compound LC-1, which will be described later, was used for the evaluation of the HTP of the compound CD-A1 and the light-dependent percentage change thereof.

<<Preparation of Sample Solution>>

The liquid crystal compound LC-1 represented by the following structure and the compound CD-A1 were mixed. Then, a solvent was added to the obtained mixture to prepare a sample solution having the following composition.

| | |
|---|---|
| Liquid crystal compound LC-1 represented by the following structure | 100 parts by mass |
| Compound CD-Al | 5 parts by mass |
| Solvent (methyl ethyl ketone (MEK)/cyclohexanone = 90/10 (mass ratio)) added to make a solute concentration of 30% by mass | |

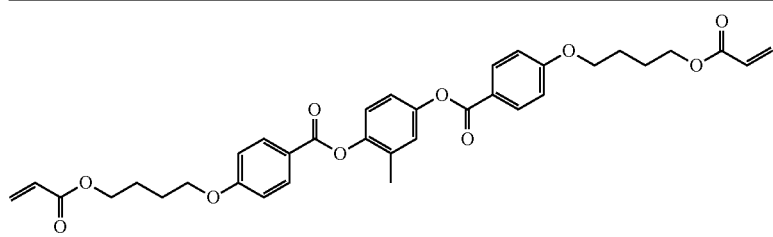

LC-1

<<Preparation of Liquid Crystal Layer 1-1>>

Next, a composition for forming a polyimide alignment film SE-130 (manufactured by Nissan Chemical Corporation) was applied onto a washed glass substrate to form a coating film. The obtained coating film was baked and then subjected to a rubbing treatment to prepare a substrate with an alignment film. 30 µL of the sample solution was applied by spin coating onto the rubbing-treated surface of this alignment film under the conditions of a rotation speed of 1,000 rpm for 10 seconds, followed by aging at 90° C. for 1 minute to form a liquid crystal layer.

<<Calculation of HTP>>

The helical twisting power (HTP) of the obtained liquid crystal layer was measured. Specifically, the central reflection wavelength of the liquid crystal layer was measured using a spectrophotometer (UV-3100, manufactured by Shimadzu Corporation), and the HTP before light irradiation was calculated by Expression (1D).

$$HTP = \frac{\text{(average refractive index of liquid crystal compound)}}{\{\text{content(\% by mass) of chiral agent with respect to liquid crystal compound}\} \times \text{(central reflection wavelength(nm))}} \; [\mu m^{-1}] \quad \text{Expression (1D)}$$

In Expression (1D), the HTP was calculated on the assumption that the "average refractive index of liquid crystal compound" was 1.55.

Next, the liquid crystal layer was UV-irradiated with light of 315 nm from a mercury lamp light source through a 315 nm bandpass filter at an irradiation intensity of 30.0 mW/cm² for a predetermined time of seconds. The central reflection wavelength of the liquid crystal layer after light irradiation was measured using a spectrophotometer (UV-3100, manufactured by Shimadzu Corporation), and the HTP after light irradiation was calculated by Expression (1D).

The HTP was calculated in the same manner for CD-B1. Further, the weighted average helical twisting power in a case of being added at an addition amount ratio (CD-A1: CD-B1=18.6:60.8) in which the helical twisting powers of CD-A1 and CD-B1 before exposure to light are offset to each other was calculated. The results are shown in Table 1.

TABLE 1

| Exposure time to light of 315 nm [s] | 0 | 1 | 5 | 15 | 25 | 35 | 45 | 55 |
|---|---|---|---|---|---|---|---|---|
| CD-A1 | 60.8 | 21.6 | 6.8 | 5.9 | 5.2 | 5.1 | 5.1 | 5.0 |
| CD-B1 | 18.6 | 34.1 | 53.0 | 43.4 | 35.3 | 28.7 | 23.5 | 21.5 |
| Weighted average helical twisting power [µm⁻¹] | 0.0 | 21.0 | 39.0 | 31.8 | 25.8 | 20.8 | 16.8 | 15.3 |

From Table 1 above, the chiral agent CD-A1 has a decrease in helical twisting power (HTP) upon irradiation with light of 315 nm. In addition, the chiral agent CD-B1 has an increase in helical twisting power (HTP) upon irradiation with light of 315 nm and then a decrease in HTP upon further irradiation.

Subsequently, the HTP in a case where the CD-A2 and the CD-A3 were UV-irradiated with light of 365 nm from a mercury lamp light source through a 365 nm bandpass filter at an irradiation intensity of 30.0 mW/cm² for a predetermined time of seconds, and then further UV-irradiated with light of 315 nm from a mercury lamp light source through a 315 nm bandpass filter at an irradiation intensity of 30.0 mW/cm² for a predetermined time of seconds was calculated. The results are shown in Table 2. Further, the weighted average helical twisting power in a case of being added at an addition amount ratio (CD-A2:CD-A3=57.7:77.0) in which the helical twisting powers of CD-A2 and CD-A3 before exposure to light are offset to each other was calculated.

TABLE 2

| Exposure time to light of 365 nm [s] | 0 | 25 | 25 | 25 | 25 |
|---|---|---|---|---|---|
| Exposure time to light of 315 nm [s] | 0 | 0 | 10 | 20 | 25 |
| CD-A2 | 77.0 | 77.0 | 50.1 | 48.0 | 43.7 |
| CD-A3 | 57.7 | 9.9 | 9.9 | 9.8 | 9.7 |
| Weighted average helical twisting power [µm⁻¹] | 0.0 | 27.3 | 15.8 | 15.0 | 13.2 |

From Table 2 above, the chiral agent CD-A2 has no change in HTP upon irradiation with light of 365 nm, but a decrease in HTP upon irradiation with light of 315 nm. In addition, the chiral agent CD-A3 has a decrease in HTP upon irradiation with light of 365 nm, but no change in HTP (substantially no change) upon irradiation with light of 315 nm.

Subsequently, the HTP in a case where the CD-B1 and the CD-B2 were UV-irradiated at room temperature with light of 365 nm from a mercury lamp light source through a 365 nm bandpass filter at an irradiation intensity of 30.0 mW/cm² for a predetermined time of seconds, and then heat-treated at 90° C. was calculated. The results are shown in Table 3. Further, the weighted average helical twisting power in a case of being added at an addition amount ratio (CD-B1: CD-B2=33.3:18.6) in which the helical twisting powers of CD-B1 and CD-B2 before exposure to light are offset to each other was calculated.

TABLE 3

| Exposure time to light of 365 nm [s] | 0 | 4 | 4 |
|---|---|---|---|
| Heating time at 90° C. [min] | 0 | 0 | 5 |
| CD-B1 | 18.6 | 54.5 | 54.5 |
| CD-B2 | 33.3 | 18.6 | 32.8 |
| Weighted average helical twisting power [µm⁻¹] | 0.0 | 28.3 | 23.2 |

From Table 3 above, the chiral agent CD-B1 has an increase in HTP upon irradiation with light of 365 nm, and the chiral agent CD-B2 has a decrease in HTP upon irradiation with light of 365 nm. Further, the chiral agent CD-B2 has an increase in HTP upon heating at 90° C.

[Preparation and Evaluation of Liquid Crystal Composition]

Example 1

<Preparation of Liquid Crystal Composition>

The liquid crystal compound LC-1, the compound CD-A1, and the compound CD-B1 were mixed. Then, a solvent was added to the obtained mixture to prepare a sample solution having the following composition.

| | |
|---|---|
| Liquid crystal compound LC-1 | 100 parts by mass |
| Compound CD-A1 | 2.3 parts by mass |
| Compound CD-B1 | 7.7 parts by mass |
| Surfactant (1) shown below | 0.2 parts by mass |
| Polymerization initiator (diethylthioxanthone, manufactured by Tokyo Chemical Industry Co., Ltd.) | 3.0 parts by mass |
| Solvent (MEK/cyclohexanone = 90/10 (mass ratio)) added to make a solute concentration of 30% by mass | |

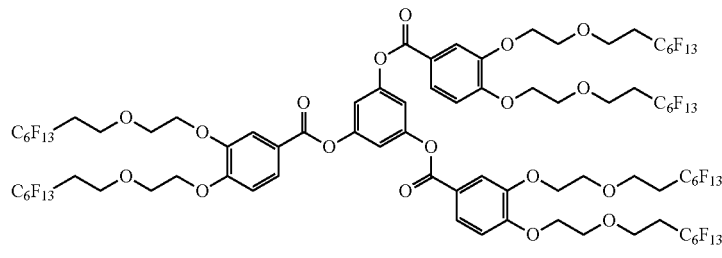

Surfactant (1)

(Preparation of Reflective Layer)

Next, a composition for forming a polyimide alignment film SE-130 (manufactured by Nissan Chemical Corporation) was applied onto a washed glass substrate to form a coating film. The obtained coating film was baked and then subjected to a rubbing treatment to prepare a substrate with an alignment film. 30 μL of the liquid crystal composition was applied by spincoating onto the rubbing-treated surface of this alignment film under the conditions of a rotation speed of 1000 rpm for 10 seconds to form a composition layer which was then dried (aged) at 90° C. for 1 minute to align the liquid crystal compound. At this time, it was confirmed from the polarization microscope image that the liquid crystal phase was a nematic liquid crystal phase in which a helix was not induced (corresponding to the step X1A). As a result of measuring a tilt angle of a molecular axis of a liquid crystal molecule with respect to a substrate surface by a crystal rotation method, it was confirmed that the molecular axis of a liquid crystal molecule was tilted by 5° at the substrate interface and 0° at the air interface (that is, shown as taking a tilt alignment of the condition 4).

Next, the composition layer in which the liquid crystal compound was aligned was irradiated with light of 315 nm at an irradiation intensity of 30 mW/cm$^2$ for 5 seconds to bring into a state of a cholesteric liquid crystalline phase (corresponding to the step X2A).

This was followed by an aging treatment at 90° C. for 1 minute and then irradiation with light of 315 nm at an irradiation intensity of 30 mW/cm$^2$ for 10 seconds to increase a helical pitch (corresponding to the step YA). Subsequently, the composition layer after the aging treatment at 90° C. for 1 minute and then the irradiation with ultraviolet rays was irradiated with ultraviolet rays (light of 365 nm) at an irradiation amount of 500 mJ/cm$^2$ at 40° C. in a nitrogen atmosphere to carry out a curing treatment to obtain a cured film 1.

After the preparation of the step X2A, a cross-sectional SEM measurement of the composition layer in the state of a cholesteric liquid crystal layer (corresponding to the cholesteric liquid crystal layer A) was carried out, and it was confirmed that the tilt angle of the arrangement direction of bright and dark lines with respect to the normal line of the layer main surface was 25°, the length (one period Λ) in which the direction of the molecular axis derived from the liquid crystal compound was rotated by 180° was 303 nm, and the helical pitch X was 256 nm. In addition, the cross-sectional polarization microscope observation confirmed that the tilt angle of the molecular axis of the liquid crystal compound with respect to the layer main surface was 27° on the air interface side and 22° on the substrate interface side. The measurement of the cholesteric liquid crystal layer A was carried out in the state of a cured film. The above-mentioned physical properties of the cholesteric liquid crystal layer A were the same in the uncured state and the cured state. In addition, the tilt angle of the molecular axis of the liquid crystal compound on both main surfaces of the cholesteric liquid crystal layer A was measured by cutting the cholesteric liquid crystal layer A with a microtome and observing the cross-section with a polarization microscope.

In addition, the cross-sectional SEM measurement of the obtained cured film 1 was carried out, and the same evaluation as after the preparation of the step X2A was carried out. That is, the tilt angle of the arrangement direction of bright and dark lines with respect to the normal line of the layer main surface, the length that the direction of the molecular axis derived from the liquid crystal compound rotates by 180° (one period Λ), and the helical pitch λ were examined. In addition, the tilt angle of the molecular axis of the liquid crystal compound with respect to the layer main surface was examined by the cross-sectional polarization microscope observation. In addition, the tilt angle of the molecular axis of the liquid crystal compound on both main surfaces of the cured film was measured by cutting the cholesteric liquid crystal layer A with a microtome and observing the cross-section with a polarization microscope.

Examples 2 to 6 and Comparative Example 1A and Comparative Example 2A

Cured films 2 to 6 and comparative cured films 1A and 2A were obtained in the same manner as in Example 1, except that the exposure times in the step X2A and the step YA were changed.

Table 4 shows the analysis results of the cross-section SEM measurement and the cross-section polarization microscope observation of the cured films prepared in Examples 1 to 6 and Comparative Example 1A and Comparative Example 2A.

In the preparation of the cured film of Example 6, the cross-sectional SEM measurement and the cross-sectional polarization microscope observation of the composition layer in the state of a cholesteric liquid crystal layer (corresponding to the cholesteric liquid crystal layer A) were carried out after the preparation of the step X2A. It was confirmed that the tilt angle of the arrangement direction of bright and dark lines with respect to the normal line of the layer main surface was 26°, the length (one period Λ) in which the direction of the molecular axis derived from the liquid crystal compound rotates 180° was 542 nm, the helical pitch λ was 475 nm, and the tilt angle of the molecular axis of the liquid crystal compound with respect to the layer main surface was 30° on the air interface side and 25° on the substrate interface side. The measurement of the cholesteric liquid crystal layer A was carried out in the state of a cured film. The above-mentioned physical properties of the cholesteric liquid crystal layer A were the same in the uncured state and the cured state.

In Example 6, the helical pitch is decreased in the step YA.

TABLE 4

| Table 4 | Example 1 | Example 2 | Example 3 | Example 4 | Example 5 | Comparative Example 1A | Example 6 | Comparative Example 2A |
|---|---|---|---|---|---|---|---|---|
| Exposure time in step X2A [s] | 5 | 5 | 5 | 5 | 5 | 5 | 1 | 1 |
| Exposure time in step YA [s] | 10 | 20 | 30 | 40 | 50 | 0 | 4 | 0 |
| Helical pitch λ [nm] | 314 | 387 | 481 | 595 | 654 | 256 | 256 | 475 |
| Tilt angle | 31 | 38 | 49 | 68 | 90 | 25 | 14 | 26 |
| One period Λ [nm] | 305 | 315 | 319 | 321 | 327 | 303 | 541 | 542 |
| Tilt angle of molecular axis of liquid crystal compound on air interface side (°) | 31 | 37 | 50 | 69 | 88 | 27 | 15 | 30 |
| Tilt angle of molecular axis of liquid crystal compound on substrate side (°) | 31 | 39 | 47 | 66 | 85 | 22 | 12 | 25 |

In Table 4, from the comparison of Examples 1 to 5 with Comparative Example 1A, it was demonstrated that a high tilt angle can be achieved by adding the step YA of increasing the helical pitch. On the other hand, from the comparison of Example 6 with Comparative Example 2A, it was demonstrated that a low tilt angle can be achieved by adding the step YA of decreasing the helical pitch.

Example 7

A cured film 7 was obtained in the same manner as in Example 2, except that the curing exposure to light was carried out without carrying out an aging treatment, after the step YA. Table 5 shows the analysis results of the cross-sectional SEM measurement and the cross-sectional polarization microscope observation of the cured film.

TABLE 5

| | Example 7 | |
|---|---|---|
| | Substrate interface side | Air interface side |
| Exposure time in step X2A [s] | 5 | |
| Exposure time in step YA [s] | 20 | |
| Helical pitch λ [nm] | 324 | 438 |
| Tilt angle | 31 | 44 |
| One period Λ [nm] | 315 | 315 |
| Tilt angle of molecular axis of liquid crystal compound (°) | 30 | 45 |

It was confirmed that the cured film 7 had pitch gradients having different lengths (one period Λ) in which the direction of the molecular axis derived from the liquid crystal compound is rotated by 180° and different tilt angles on the substrate interface side and the air interface side. That is, it was confirmed that the helical pitch of the cholesteric liquid crystal layer changed in a film thickness direction.

Example 8

<Preparation of Liquid Crystal Composition>

The liquid crystal compound LC-1, the compound CD-A2, and the compound CD-A3 were mixed. Then, a solvent was added to the obtained mixture to prepare a sample solution having the following composition.

| | |
|---|---|
| Liquid crystal compound LC-1 | 100 parts by mass |
| Compound CD-A2 | 4.3 parts by mass |
| Compound CD-A3 | 5.7 parts by mass |
| Surfactant (1) described above | 0.1 parts by mass |
| Polymerization initiator (diethylthioxanthone, manufactured by Tokyo Chemical Industry Co., Ltd.) | 3.0 parts by mass |
| Solvent (MEK/cyclohexanone = 90/10 (mass ratio)) added to make a solute concentration of 30% by mass | |

(Preparation of Reflective Layer)

Next, a composition for forming a polyimide alignment film SE-130 (manufactured by Nissan Chemical Corporation) was applied onto a washed glass substrate to form a coating film. The obtained coating film was baked and then subjected to a rubbing treatment to prepare a substrate with an alignment film. 30 µL of the liquid crystal composition was applied by spincoating onto the rubbing-treated surface of this alignment film under the conditions of a rotation speed of 1000 rpm for 10 seconds to form a composition layer which was then dried (aged) at 90° C. for 1 minute to align the liquid crystal compound. At this time, it was confirmed from the polarization microscope image that the liquid crystal phase was a nematic liquid crystal phase in which a helix was not induced (corresponding to the step X1A). As a result of measuring a tilt angle of a molecular axis of a liquid crystal molecule with respect to a substrate surface by a crystal rotation method, it was confirmed that the molecular axis of a liquid crystal molecule was tilted by 5° at the substrate interface and 0° at the air interface (that is, shown as taking a tilt alignment of the condition 4).

Next, the composition layer in which the liquid crystal compound was aligned was irradiated with light of 365 nm at an irradiation intensity of 30 mW/cm$^2$ for 25 seconds to bring into a state of a cholesteric liquid crystalline phase (corresponding to the step X2A). This was followed by an aging treatment at 90° C. for 1 minute and then irradiation with light of 315 nm at an irradiation intensity of 30 mW/cm$^2$ for 10 seconds to increase a helical pitch (corresponding to the step YA). Subsequently, the composition layer after the aging treatment at 90° C. for 1 minute and then the irradiation with ultraviolet rays was irradiated with ultraviolet rays (light of 365 nm) at an irradiation amount of 500 mJ/cm$^2$ at 40° C. in a nitrogen atmosphere to carry out a curing treatment to obtain a cured film 8.

The cross-sectional SEM measurement and the cross-sectional polarization microscope observation of the composition layer in the state of a cholesteric liquid crystal layer (corresponding to the cholesteric liquid crystal layer A) were carried out after the preparation of the step X2A. It was confirmed that the tilt angle of the arrangement direction of bright and dark lines with respect to the normal line of the layer main surface was 17°, the length (one period Λ) in which the direction of the molecular axis derived from the liquid crystal compound rotates 180° was 619 nm, the helical pitch λ was 366 nm, and the tilt angle of the molecular axis of the liquid crystal compound with respect to the layer main surface was 20° on the air interface side and 15° on the substrate interface side. The measurement of the cholesteric liquid crystal layer A was carried out in the state of a cured film. The above-mentioned physical properties of the cholesteric liquid crystal layer A were the same in the uncured state and the cured state.

In addition, the cross-sectional SEM measurement and the cross-sectional polarization microscope observation of the obtained cured film 8 were carried out. The tilt angle of the arrangement direction of bright and dark lines with respect to the normal line of the layer main surface, the length (one period Λ) in which the direction of the molecular axis derived from the liquid crystal compound is rotated by 180°, the helical pitch λ, and the tilt angle of the molecular axis of the liquid crystal compound with respect to the layer main surface were examined.

Examples 9 and 10, and Comparative Example 3A

Cured films 9 and 10 and comparative cured film 3A were obtained in the same manner as in Example 8, except that the exposure time in the step YA was changed.

Table 6 shows the cross-sectional SEM analysis results of the cured films prepared in Examples 8 to 10 and Comparative Example 3A.

TABLE 6

| | Example 8 | Example 9 | Example 10 | Comparative Example 3A |
|---|---|---|---|---|
| Exposure time in step X2A [s] | 25 | 25 | 25 | 25 |
| Exposure time in step YA [s] | 10 | 20 | 25 | 0 |
| Helical pitch λ [nm] | 633 | 668 | 757 | 366 |
| Tilt angle | 31 | 33 | 37 | 17 |
| One period Λ [nm] | 621 | 621 | 629 | 619 |
| Tilt angle of molecular axis of liquid crystal compound on air interface side (°) | 33 | 35 | 40 | 20 |
| Tilt angle of molecular axis of liquid crystal compound on substrate side (°) | 30 | 32 | 36 | 15 |

In Table 6, from the comparison of Examples 8 to 10 with Comparative Example 3A, it was demonstrated that a high tilt angle can be achieved by adding the step 4 of increasing the helical pitch.

Example 11 and Comparative Example 4A

<Preparation of Liquid Crystal Composition>

The liquid crystal compound LC-1, the compound CD-B1, and the compound CD-B2 were mixed. Then, a solvent was added to the obtained mixture to prepare a sample solution having the following composition.

| | |
|---|---|
| Liquid crystal compound LC-1 | 100 parts by mass |
| Compound CD-B1 | 6.4 parts by mass |
| Compound CD-B2 | 3.6 parts by mass |
| Surfactant (1) described above | 0.1 parts by mass |
| Polymerization initiator (diethylthioxanthone, manufactured by Tokyo Chemical Industry Co., Ltd.) | 3.0 parts by mass |
| Solvent (MEK/cyclohexanone = 90/10 (mass ratio)) added to make a solute concentration of 30% by mass | |

(Preparation of Reflective Layer)

Next, a composition for forming a polyimide alignment film SE-130 (manufactured by Nissan Chemical Corporation) was applied onto a washed glass substrate to form a coating film. The obtained coating film was baked and then subjected to a rubbing treatment to prepare a substrate with an alignment film. 30 µL of the liquid crystal composition was applied by spincoating onto the rubbing-treated surface of this alignment film under the conditions of a rotation speed of 1000 rpm for 10 seconds to form a composition layer which was then dried (aged) at 90° C. for 1 minute to align the liquid crystal compound. At this time, it was confirmed from the polarization microscope image that the liquid crystal phase was a nematic liquid crystal phase in which a helix was not induced (corresponding to the step X1B'). As a result of measuring a tilt angle of a molecular axis of a liquid crystal molecule with respect to a substrate surface by a crystal rotation method, it was confirmed that the molecular axis of a liquid crystal molecule was tilted by 5° at the substrate interface and 0° at the air interface (that is, shown as taking a tilt alignment of the condition 4).

Next, the composition layer in which the liquid crystal compound was aligned was irradiated with light of 365 nm at an irradiation intensity of 30 mW/cm² for 4 seconds to bring into a state of a cholesteric liquid crystalline phase (corresponding to the step X2B'). This was followed by heating from room temperature to 90° C. and a heat treatment at 90° C. for 5 minutes to increase the helical pitch (corresponding to the step YB'). The curing treatment was carried out by irradiation with ultraviolet rays (light of 365 nm) at an irradiation amount of 500 mJ/cm² at 60° C. in a nitrogen atmosphere to obtain a cured film 11.

The cross-sectional SEM measurement and the cross-sectional polarization microscope observation of the composition layer in the state of a cholesteric liquid crystal layer (corresponding to the cholesteric liquid crystal layer A) were carried out after the preparation of the step X2B'. It was confirmed that the tilt angle of the arrangement direction of bright and dark lines with respect to the normal line of the layer main surface was 25°, the length (one period Λ) in which the direction of the molecular axis derived from the liquid crystal compound rotates 180° was 418 nm, the helical pitch λ was 353 nm, and the tilt angle of the molecular axis of the liquid crystal compound with respect to the layer main surface was 28° on the air interface side and 20° on the substrate interface side. The measurement of the cholesteric liquid crystal layer A was carried out in the state of a cured film. The above-mentioned physical properties of the cholesteric liquid crystal layer A were the same in the uncured state and the cured state.

In addition, the cross-sectional SEM measurement and the cross-sectional polarization microscope observation of the obtained cured film 11 were carried out, and the same evaluation as after the preparation of the step X2B' was carried out. That is, the tilt angle of the arrangement direction of bright and dark lines with respect to the normal line of the layer main surface, the length that the direction of the molecular axis derived from the liquid crystal compound rotates by 180° (one period Λ), the helical pitch λ, and the tilt angle of the molecular axis of the liquid crystal compound with respect to the layer main surface were examined.

In addition, a cured film 4A of Comparative Example 4A was prepared in the same manner as in the cured film 11, except that the heat treatment at 90° C. was omitted, and the evaluation was carried out in the same manner as in the cured film 11.

TABLE 7

|  | Example 11 | Comparative Example 4A |
|---|---|---|
| Exposure time in step X2B' [s] | 4 | 4 |
| Heating time at 90° C. in step YB' [s] | 5 | 0 |
| Helical pitch λ [nm] | 431 | 353 |
| Tilt angle | 31 | 25 |
| One period Λ [nm] | 418 | 418 |
| Tilt angle of molecular axis of liquid crystal compound on air interface side (°) | 33 | 28 |
| Tilt angle of molecular axis of liquid crystal compound on substrate side (°) | 30 | 20 |

In Table 7, from the comparison of Example 11 with Comparative Example 4A, it was demonstrated that the step 4 of increasing the helical pitch can achieve a high tilt angle even in the step of applying a change of temperature.

Comparative Example 1B

The pattern interval and the chiral agent amount at the time of interference exposure to light by the method described in "Optics Express 2017, 25, 19298." were adjusted to prepare a cured film C1 in which a helical pitch λ, a tilt angle of an arrangement direction of bright portion and dark portion with respect to a normal line of a layer main surface, and a length (one period Λ) in which a direction of a molecular axis derived from a liquid crystal compound is rotated by 180° are the same as those of Example 1 and a cured film C3 in which such factors are the same as those of Example 3. From the polarization microscope observation of the cross-sectional section, it was confirmed that, in the cured film 1, the molecular axes of the liquid crystal molecules were tilted with respect to the layer plane on both main surfaces of the layer, whereas in the cured films C1 and C3, the molecular axes of the liquid crystal molecules were horizontal to the layer plane.

[Evaluation of Circular Polarization Selectivity]

The cured film 1, the cured film 3, the cured film C1, and the cured film C3 were each bonded to a light guide plate.

Light was incident from an end part of a light guide member, and the reflection intensity at a detection angle of 0° (front) was measured using GENESIA GONIO (manufactured by Genesia Corporation). At this time, the measurement was carried out with a dextrorotatory or levorotatory circularly polarizing plate (dextrorotatory: MCPR-4, levorotatory: MCPL-4, manufactured by MeCan Imaging Inc.) installed between the cholesteric liquid crystal layer and the detector. The circular polarization selectivity was calculated from the following expression, in a case where, of the reflection intensities through the dextrorotatory and levorotatory circularly polarizing plates, a large value is defined as x and a small value is defined as y.

$$(\text{circular polarization selectivity}) = x/(x + y)$$

An LED white light source (STEROPES-LED, manufactured by Admesy Co., Ltd.) was used as the light source.

In a case where the cured film 1 was used, the circular polarization selectivity was 91%, whereas in a case where the cured film $C_1$ was used, the circular polarization selectivity was 71%. In addition, in a case where the cured film 3 was used, the circular polarization selectivity was 87%, whereas in a case where the cured film C3 was used, the circular polarization selectivity was 66%. From this, it was confirmed that the circular polarization selectivity was superior in a case where the molecular axis of the liquid crystal molecule was tilted with respect to the layer plane on both main surfaces of the layer.

That is, it was confirmed that the circular polarization degree of the reflected light was higher.

EXPLANATION OF REFERENCES

10: cholesteric liquid crystal layer A
11, 12: main surface
13: a pair of main surfaces consisting of main surface 11 and main surface 12
14: liquid crystal compound
$L_1$, $L_2$: molecular axis
$D_1$: arrangement axis
Λ: length that direction of molecular axis $L_1$ of liquid crystal compound 14 rotates by 180° (one period length)
$C_1$: helical axis derived from cholesteric liquid crystalline phase
$T_1$: reflecting surface of cholesteric liquid crystal layer A 15: bright portion
16: dark portion
P₁: arrangement direction in which bright portions 15 and dark portions 16 are alternately arranged
$Q_1$: normal line of main surface 11 and main surface 12 (X-Y plane)
$\theta_3$, $\theta_4$: angle
20: substrate
20a: substrate surface
22: composition layer
$R_1$: thickness direction
A, B: region

What is claimed is:

1. A method for producing a cholesteric liquid crystal layer, comprising:
    a step X of forming a cholesteric liquid crystal layer A that satisfies all of conditions 1 to 3 and in which a liquid crystal compound is aligned into a state of a cholesteric liquid crystalline phase; and
    a step Y of carrying out a treatment to increase a helical pitch of the cholesteric liquid crystalline phase in the cholesteric liquid crystal layer A obtained by the step X to increase a tilt angle of an arrangement direction of bright portion and dark portion derived from the cholesteric liquid crystalline phase, as observed in a cross-section perpendicular to a main surface of the cholesteric liquid crystal layer A, with respect to a normal direction of the main surface of the cholesteric liquid crystal layer A,
    condition 1: the cholesteric liquid crystal layer A has a liquid crystal alignment pattern in which a direction of a molecular axis derived from the liquid crystal compound changes while continuously rotating along at least one in-plane direction,
    condition 2: the molecular axis of the liquid crystal compound is tilted with respect to the main surface of the cholesteric liquid crystal layer A on both main surfaces of the cholesteric liquid crystal layer A,
    condition 3: the arrangement direction of bright portion and dark portion derived from the cholesteric liquid crystalline phase is tilted with respect to a normal line of the main surface of the cholesteric liquid crystal layer A, in the cross-section perpendicular to the main surface of the cholesteric liquid crystal layer A observed by a scanning electron microscope.

2. The method for producing a cholesteric liquid crystal layer according to claim 1,
    wherein the cholesteric liquid crystal layer A contains a chiral agent,
    the chiral agent includes any chiral agent selected from the group consisting of a chiral agent whose helical twisting power changes upon irradiation with light and a chiral agent whose helical twisting power changes upon a change of temperature,
    in a case where the chiral agent is the chiral agent whose helical twisting power changes upon irradiation with light, the treatment to increase the helical pitch of the cholesteric liquid crystalline phase is a treatment of irradiating the cholesteric liquid crystal layer A with light, and
    in a case where the chiral agent is the chiral agent whose helical twisting power changes upon a change of temperature, the treatment to increase the helical pitch of the cholesteric liquid crystalline phase is a treatment of subjecting the cholesteric liquid crystal layer A to a change of temperature.

3. The method for producing a cholesteric liquid crystal layer according to claim 1,
    wherein the step X includes:
    a step X1 of forming a composition layer satisfying the following condition 4, the following condition 5, or the following condition 6 on a substrate, using a liquid crystal composition containing a liquid crystal compound and a chiral agent; and
    a step X2 of subjecting the composition layer to a treatment of cholesterically aligning the liquid crystal compound of the composition layer to form the cholesteric liquid crystal layer A,
    condition 4: at least a part of the liquid crystal compound in the composition layer is tilt-aligned with respect to a substrate surface,
    condition 5: the liquid crystal compound is aligned such that a tilt angle of the liquid crystal compound in the composition layer continuously changes along a thickness direction,
    condition 6: at least a part of the liquid crystal compound in the composition layer is vertically aligned with respect to the substrate surface.

4. The method for producing a cholesteric liquid crystal layer according to claim 3,
    wherein, in the composition layer of the step X1, an absolute value of a weighted average helical twisting power of the chiral agent is 0.0 to 1.5 $\mu m^{-1}$.

5. The method for producing a cholesteric liquid crystal layer according to claim 3,
    wherein the liquid crystal composition contains a photosensitive chiral agent whose helical twisting power changes upon irradiation with light,
    the treatment of cholesterically aligning the liquid crystal compound in the step X2 is a treatment of irradiating the composition layer with light, and
    the treatment of increasing the helical pitch of the cholesteric liquid crystalline phase in the step Y is a treatment of irradiating the cholesteric liquid crystal layer A with light.

6. The method for producing a cholesteric liquid crystal layer according to claim 5,
    wherein the liquid crystal composition contains a photosensitive chiral agent whose helical twisting power changes upon irradiation with two types of light, and
    a wavelength of the light of a light irradiation treatment in the step X2 and a wavelength of the light of a light irradiation treatment in the step Y are different from each other.

7. The method for producing a cholesteric liquid crystal layer according to claim 5,
    wherein the liquid crystal composition contains a photosensitive chiral agent whose helical twisting power begins to increase upon irradiation with light and whose helical twisting power decreases upon continuous irradiation with light, and
    a wavelength of the light of a light irradiation treatment in the step X2 and a wavelength of the light of a light irradiation treatment in the step Y are the same as each other.

8. The method for producing a cholesteric liquid crystal layer according to claim 5,
    wherein the photosensitive chiral agent contains a partial structure selected from the group consisting of an isosorbide partial structure, an isomannide partial structure, and a binaphthyl partial structure.

9. The method for producing a cholesteric liquid crystal layer according to claim 5, wherein the photosensitive chiral agent has a double bond exhibiting a photoisomerization reaction or a photodimerization reaction in a molecule thereof.

10. The method for producing a cholesteric liquid crystal layer according to claim 9,
wherein the double bond exhibiting a photoisomerization reaction or a photodimerization reaction has a cis structure.

11. The method for producing a cholesteric liquid crystal layer according to claim 5,
wherein the photosensitive chiral agent contains a partial structure selected from the group consisting of stilbene, chalcone, and cinnamoyl.

12. A method for producing a cholesteric liquid crystal layer, comprising:
a step X of forming a cholesteric liquid crystal layer A that satisfies all of conditions 1 to 3 and in which a liquid crystal compound is aligned into a state of a cholesteric liquid crystalline phase; and
a step Y of carrying out a treatment to increase or decrease a helical pitch of the cholesteric liquid crystalline phase in the cholesteric liquid crystal layer A obtained by the step X to increase or decrease a tilt angle of an arrangement direction of bright portion and dark portion derived from the cholesteric liquid crystalline phase, as observed in a cross-section perpendicular to a main surface of the cholesteric liquid crystal layer A, with respect to a normal direction of the main surface of the cholesteric liquid crystal layer A,
condition 1: the cholesteric liquid crystal layer A has a liquid crystal alignment pattern in which a direction of a molecular axis derived from the liquid crystal compound changes while continuously rotating along at least one in-plane direction,
condition 2: the molecular axis of the liquid crystal compound is tilted with respect to the main surface of the cholesteric liquid crystal layer A on both main surfaces of the cholesteric liquid crystal layer A,
condition 3: the arrangement direction of bright portion and dark portion derived from the cholesteric liquid crystalline phase is tilted with respect to a normal line of the main surface of the cholesteric liquid crystal layer A, in the cross-section perpendicular to the main surface of the cholesteric liquid crystal layer A observed by a scanning electron microscope,
wherein the step X includes:
a step X1 of forming a composition layer satisfying the following condition 4, the following condition 5, or the following condition 6 on a substrate, using a liquid crystal composition containing a liquid crystal compound and a chiral agent; and
a step X2 of subjecting the composition layer to a treatment of cholesterically aligning the liquid crystal compound of the composition layer to form the cholesteric liquid crystal layer A,
condition 4: at least a part of the liquid crystal compound in the composition layer is tilt-aligned with respect to a substrate surface,
condition 5: the liquid crystal compound is aligned such that a tilt angle of the liquid crystal compound in the composition layer continuously changes along a thickness direction,
condition 6: at least a part of the liquid crystal compound in the composition layer is vertically aligned with respect to the substrate surface.

* * * * *